(12) United States Patent
Wyndham et al.

(10) Patent No.: US 11,577,179 B2
(45) Date of Patent: Feb. 14, 2023

(54) CHROMATOGRAPHIC COLUMNS AND SEPARATION DEVICES COMPRISING A SUPERFICIALLY POROUS MATERIAL; AND USE THEREOF FOR SUPERCRITICAL FLUID CHROMATOGRAPHY AND OTHER CHROMATOGRAPHY

(71) Applicant: Waters Technologies Corporation, Milford, MA (US)

(72) Inventors: Kevin D. Wyndham, Upton, MA (US); Jacob N. Fairchild, Upton, MA (US); Pamela C. Iraneta, Brighton, MA (US); Stephen J. Shiner, Holden, MA (US); Darryl W. Brousmiche, Grafton, MA (US); Daniel P. Walsh, Danvers, MA (US)

(73) Assignee: Waters Technologies Corporation, Milford, MA (US)

( * ) Notice: Subject to any disclaimer, the term of this patent is extended or adjusted under 35 U.S.C. 154(b) by 1402 days.

(21) Appl. No.: 14/897,584

(22) PCT Filed: Jun. 10, 2014

(86) PCT No.: PCT/US2014/041765
§ 371 (c)(1),
(2) Date: Dec. 10, 2015

(87) PCT Pub. No.: WO2014/201033
PCT Pub. Date: Dec. 18, 2014

(65) Prior Publication Data
US 2016/0184736 A1 Jun. 30, 2016

Related U.S. Application Data

(60) Provisional application No. 61/833,699, filed on Jun. 11, 2013.

(51) Int. Cl.
*B01D 15/08* (2006.01)
*B01J 20/28* (2006.01)
(Continued)

(52) U.S. Cl.
CPC .......... *B01D 15/08* (2013.01); *B01D 15/305* (2013.01); *B01D 15/322* (2013.01); *B01D 15/40* (2013.01);
(Continued)

(58) Field of Classification Search
None
See application file for complete search history.

(56) References Cited

U.S. PATENT DOCUMENTS

| 4,415,631 | A |   | 11/1983 | Schutijser |              |
|-----------|---|---|---------|------------|--------------|
| 4,835,058 | A | * | 5/1989  | Komiya     | B01J 20/3204 |
|           |   |   |         |            | 210/198.2    |

(Continued)

FOREIGN PATENT DOCUMENTS

| CN | 1608985 A | 4/2005 |
| CN | 1917953 A | 2/2007 |

(Continued)

OTHER PUBLICATIONS

Caroline West et al.: "Characterization and use of hydrophilic interaction liquid chromatography type stationary phases in supercritical fluid chromatography", Journal of Chromatography A, vol. 1250, pp. 182-195, May 9, 2012.

(Continued)

*Primary Examiner* — Kara M Peo
(74) *Attorney, Agent, or Firm* — Womble Bond Dickinson (US) LLP; Deborah M. Vernon

(57) ABSTRACT

The present invention provides methods for performing supercritical fluid chromatography comprising loading a sample to be separated by supercritical fluid chromatogra-
(Continued)

phy onto a stationary phase comprising a spherical, monodisperse, core-shell particulate material comprising a nonporous core and one or more layers of a porous shell material surrounding the core, wherein the particles are sized less than 2 microns; and performing supercritical fluid chromatography to separate the sample.

27 Claims, 1 Drawing Sheet

(51) Int. Cl.
| | |
|---|---|
| B01D 15/32 | (2006.01) |
| B01D 15/40 | (2006.01) |
| B01J 20/286 | (2006.01) |
| B01J 20/283 | (2006.01) |
| B01D 15/30 | (2006.01) |
| B01J 20/32 | (2006.01) |
| C07F 7/12 | (2006.01) |
| C07F 7/18 | (2006.01) |

(52) U.S. Cl.
CPC ....... *B01J 20/283* (2013.01); *B01J 20/28004* (2013.01); *B01J 20/286* (2013.01); *B01J 20/28016* (2013.01); *B01J 20/28057* (2013.01); *B01J 20/28059* (2013.01); *B01J 20/28061* (2013.01); *B01J 20/28069* (2013.01); *B01J 20/28071* (2013.01); *B01J 20/28078* (2013.01); *B01J 20/28083* (2013.01); *B01J 20/28085* (2013.01); *B01J 20/3234* (2013.01); *C07F 7/12* (2013.01); *C07F 7/1804* (2013.01)

(56) References Cited

U.S. PATENT DOCUMENTS

| | | |
|---|---|---|
| 2006/0207923 A1 | 9/2006 | Li |
| 2007/0090052 A1 | 4/2007 | Broske et al. |
| 2007/0189944 A1 | 8/2007 | Kirkland et al. |
| 2010/0272996 A1 | 10/2010 | Holmes et al. |
| 2011/0010520 A1 | 1/2011 | Wang et al. |
| 2011/0226990 A1 | 9/2011 | Glennon et al. |
| 2012/0055860 A1 | 3/2012 | Wyndham |
| 2012/0273404 A1 | 11/2012 | Wyndham et al. |
| 2013/0112605 A1 | 5/2013 | Wyndham et al. |

FOREIGN PATENT DOCUMENTS

| | | | |
|---|---|---|---|
| EP | 0084979 A2 | 8/1983 | |
| JP | 2010533124 A | 10/2010 | |
| JP | 2012509974 A | 4/2012 | |
| JP | 2012533124 A | 12/2012 | |
| WO | WO-2011017418 A1 * | 2/2011 | ........ B01J 20/28057 |
| WO | 2012018596 A2 | 2/2012 | |
| WO | 2012018598 A1 | 2/2012 | |
| WO | WO-2012018596 A2 * | 2/2012 | ............ B01J 20/283 |
| WO | 2013173494 A1 | 11/2013 | |

OTHER PUBLICATIONS

EP Search Opinion and Supplementary Search Report for EP Patent Application No. 14810327.8 dated Apr. 5, 2017.
International Search Report, issued in PCTUS2014/041765, dated Oct. 27, 2014.

\* cited by examiner

CHROMATOGRAPHIC COLUMNS AND SEPARATION DEVICES COMPRISING A SUPERFICIALLY POROUS MATERIAL; AND USE THEREOF FOR SUPERCRITICAL FLUID CHROMATOGRAPHY AND OTHER CHROMATOGRAPHY

CROSS REFERENCE TO RELATED APPLICATIONS

This application is a 35 U.S.C. § 371 National Phase Application of International PCT Patent Application No. PCT/US2014/041765, filed Jun. 10, 2014 which application claims the benefit of priority to U.S. Provisional Patent Application No. 61/833,699, filed Jun. 11, 2013, the contents of each of which are hereby incorporated herein by reference in their entireties.

BACKGROUND OF THE INVENTION

Superficially porous particles (also called pellicular, fused-core, or core-shell particles) were routinely used as chromatographic sorbents in the 1970's. These earlier superficially porous materials had thin porous layers, prepared from the adsorption of silica sols to the surface of ill-defined, polydisperse, nonporous silica cores (>20 µm). The process of spray coating or passing a solution of sols through a bed of particles was commonly used. Kirkland extensively explored the use of superficially porous particles throughout this time and helped develop the Zipax brand of superficially porous materials in the 1970's. A review of Kirkland's career was provided by Unger (*Journal of Chromatography A*, 1060 (2004) 1).

Superficially porous particles have been a very active area of research in the past five years. One prior report that uses a mixed condensation of a tetraalkoxysilane with an organosilane of the type $YSi(OR)_3$ where Y contains an alkyl or aryl group and R is methoxy or ethoxy, has been reported by Unger for both fully porous (EP 84,979 B1, 1996) and superficially porous particles (*Advanced Materials* 1998, 10, 1036). These particles do not have sufficient size (1-2 µm) for effective use in UPLC, nor do they contain chromatographically enhanced pore geometry. Narrow distribution superficially porous particles have been reported by Kirkland (US Application 20070189944) using a Layer-by-Layer approach (LBL)—however these particles are not highly spherical. Other surfactant-templated approaches, can yield low yields of narrow distribution, fully porous particles, however these approaches have not been used to prepare monodisperse, spherical superficially porous particles having chromatographically enhanced pore geometry.

Modern, commercially available superficially porous particles use smaller (<2 µm), monodisperse, spherical, high purity non-porous silica cores. A porous layer is formed, growing these particles to a final diameter between 1.7-2.7 µm. The thickness of the porous layer and pore diameter are optimized to suit a particular application (e.g., small vs. large molecule separations). In order to remove polyelectrolytes, surfactants, or binders (additional reagents added during the synthesis) and to strengthen the particles for use in HPLC or UPLC applications, these materials are calcined (500-1000° C. in air). Additional pore enlargement, acid treatment, rehydroxylation, and bonding steps have been reported.

Evaluation of superficially porous materials (e.g., Journal of Chromatography A, 1217 (2010) 1604-1615; Journal of Chromatography A, 1217 (2010) 1589-1603) indicates improvements in column performance may be achieved using columns packed with these superficially porous materials. While not limited to theory, improvements were noted in van Deemter terms as well as improved thermal conductivity. The University of Cork also has a recent patent application (WO 2010/061367 A2) on superficially porous particles.

Terry A. Berger (LC-GC North America, 2010, vol 28, issue 5) reported on the first use of sub-2 µm fully porous silica columns in supercritical fluid chromatography (SFC).

In a follow-up article, Terry A. Berger (Chromatographia, 2010, 72, 597-602) explored the utility of sub-2 µm fully porous particles in different applications. He found the use of 1.8 µm unbounded silica columns to result in efficient columns (80% of theoretical), quick separations of diverse solute families (including steroids, sulfonamides, profens, nucleic acids and xanthenes), good peak shape, low column head pressures.

In another follow-up article, Terry A. Berger (Journal of Chromatography A, 1218 (2011) 4559-4568) compared the performance of 2.6 µm superficially porous hydrophilic interaction liquid chromatography (HILIC) in supercritical fluid chromatography (SFC) with a 3 µm totally porous silica HILIC column (both 4.6×150 mm), in which the unbounded superficially porous silica (Phenomenex 2.6 µm Kinetex HILIC) and diol bonded fully porous silica (Phenomenex 3 µm Luna HILIC) were compared for efficiency and tailing factors. The 2.6 µm superficially porous silica showed improved efficiency in SFC over the 3 µm silica particles.

Compared to 1.8 µm fully porous silica columns (Agilent 1.8 µm Zorbax RX-Sil, 3×100 mm), a 2.6 µm superficially porous silica column (Phenomenex 2.6 µm Kinetex HILIC, 4.6×150 mm), "produced higher efficiency, with a lower pressure drop, but in longer time." However, in this study, the authors noted that many of the peaks for separations on the 2.6 µm superficially porous silica column (4.6×150 mm) fronted. Dilution of the analytes 20-fold did not improve peak shape—indicating that this was not an issue of overloading the column. "A few solutes did not front, suggesting the fronting was not due to poor packing"

There exists a need for a high performing <2 µm superficially porous column that allows for increased efficiency, good peak shape, and performance on modern, ultraperformance SFC and/or convergence chromatography ($UPC^2$) systems.

Considering the poor peak shape of nonbonded 2.6 µm superficially porous silica columns, it is likely that current limitations in particle, hardware and column packing technology have not allowed for the required improvements in performance. The instant invention allows for improved performance of superficially porous columns in HILIC, normal phase chromatography, supercritical fluid chromatography, carbon dioxide based chromatography, subcritical fluid chromatography, and in solvated gas chromatography. This is realized in higher efficiency isocratic separations, increased peak capacity gradient separations, and improved analyte peak shape.

BRIEF SUMMARY OF THE INVENTION

The invention relates generally to chromatographic materials. The invention relates more particularly, in various embodiments, to chromatographic materials for normal phase chromatography, supercritical fluid chromatography, carbon dioxide based chromatography, subcritical fluid chromatography, and solvated gas chromatography, as well as corresponding apparatuses, kits, methods of manufacture, and methods of use.

In one aspect, the invention provides a separations device having a stationary phase comprising superficially porous silica particles wherein said particles are sized less than 2 microns.

In one aspect, the invention provides a separations device having a stationary phase comprising superficially porous inorganic/organic hybrid particles wherein said particles are sized less than 2 microns.

In one aspect, the invention provides a separations device having a stationary phase comprising a superficially porous particulate material comprising a substantially nonporous core and one or more layers of a porous shell material surrounding the core wherein said particles are sized less than 2 microns.

In certain embodiments, said device is selected from the group consisting of chromatographic columns, thin layer plates, filtration membranes, microfluidic separation devices, sample cleanup devices, solid supports, solid phase extraction devices, microchip separation devices, and microtiter plates.

In a particular embodiment, the separations device is useful for supercritical fluid chromatography.

In another aspect, the invention provides a chromatographic column, comprising
a) a column having a cylindrical interior for accepting a packing material and
b) a packed chromatographic bed comprising superficially porous silica particles, superficially porous inorganic/organic hybrid particles, or a superficially porous particulate material comprising a substantially nonporous core and one or more layers of a porous shell material surrounding the core wherein said particles are sized less than 2 microns.

In another aspect, the invention provides a chromatographic device, comprising
a) an interior channel for accepting a packing material and
b) a packed chromatographic bed comprising superficially porous silica particles, superficially porous inorganic/organic hybrid particles, or a superficially porous particulate material comprising a substantially nonporous core and one or more layers of a porous shell material surrounding the core wherein said particles are sized less than 2 microns.

In another aspect, the invention provides a kit comprising the superficially porous material of the invention, and instructions for use in supercritical fluid chromatography. In certain embodiments, the instructions are for use with a separations device. In certain other embodiments, the separations device is selected from the group consisting of chromatographic columns, thin layer plates, microfluidic separation devices, solid phase extraction devices, filtration membranes, sample cleanup devices and microtiter plates.

In another aspect, the invention provides a method for performing supercritical fluid chromatography comprising the steps of
providing a sample to be separated by supercritical fluid chromatography;
loading the sample onto a stationary phase comprising superficially porous silica particles, superficially porous inorganic/organic hybrid particles, or a superficially porous particulate material comprising a substantially nonporous core and one or more layers of a porous shell material surrounding the core wherein said particles are sized less than 2 microns; and
performing supercritical fluid chromatography to separate said sample.

In still another aspect, the invention provides A method for performing supercritical fluid chromatography comprising the steps of
providing a sample to be separated by supercritical fluid chromatography; loading the sample onto a stationary phase comprising superficially porous silica particles, superficially porous inorganic/organic hybrid particles, or a superficially porous particulate material comprising a substantially nonporous core and one or more layers of a porous shell material surrounding the core; and
performing supercritical fluid chromatography to separate said sample; wherein the tailing factor associated with the stationary phase is about 0.80-2.0.

A superficially porous material having the Formula 1:

$$[X](W)a(Q)b(T)c \quad \text{Formula 1}$$

wherein:

X is a superficially porous silica material, a superficially porous inorganic/organic hybrid material, or a superficially porous particulate material comprising a substantially nonporous core and one or more layers of a porous shell material surrounding the core;

W is absent and/or includes hydrogen and/or includes hydroxyl on the surface of X;

Q is bound directly to X and comprises a first hydrophilic, polar, ionizable, and/or charged functional group that chromatographically interacts with the analyte;

T is bound directly to X and comprises a second hydrophilic, polar, ionizable, and/or charged functional group that chromatographically interacts with the analyte;

a is >0, b is >0, c is >0, wherein b=0 and c>0, or c=0 and b>0 and

Q and T essentially eliminate chromatographic interaction between the analyte, and X and W, thereby minimizing retention variation over time (drift) under chromatographic conditions utilizing low water concentrations.

A superficially porous material having the Formula 2:

$$[X](W)_a(Q)_b(T)_c \quad \text{Formula 2}$$

wherein:

X is a superficially porous material;

W is absent and/or includes hydrogen and/or includes hydroxyl on the surface of X;

Q is a functional group that minimizes retention variation over time (drift) under chromatographic conditions utilizing low water concentrations;

T comprises one or more hydrophilic, polar, ionizable, and/or charged functional groups that chromatographically interact with the analyte; and b and c are positive numbers, $0.05 \leq (b/c) \leq 100$, and $a \geq 0$.

In another aspect, the invention provides a method for performing supercritical fluid chromatography comprising the steps of
providing a sample to be separated by supercritical fluid chromatography;
loading the sample onto a stationary phase comprising superficially porous silica particles, superficially porous inorganic/organic hybrid particles, or a superficially porous particulate material comprising a substantially nonporous core and one or more layers of a porous shell material surrounding the core wherein said particles are sized less than 2 microns; and
performing supercritical fluid chromatography to separate said sample.

DETAILED DESCRIPTION OF THE INVENTION

Figure 1:
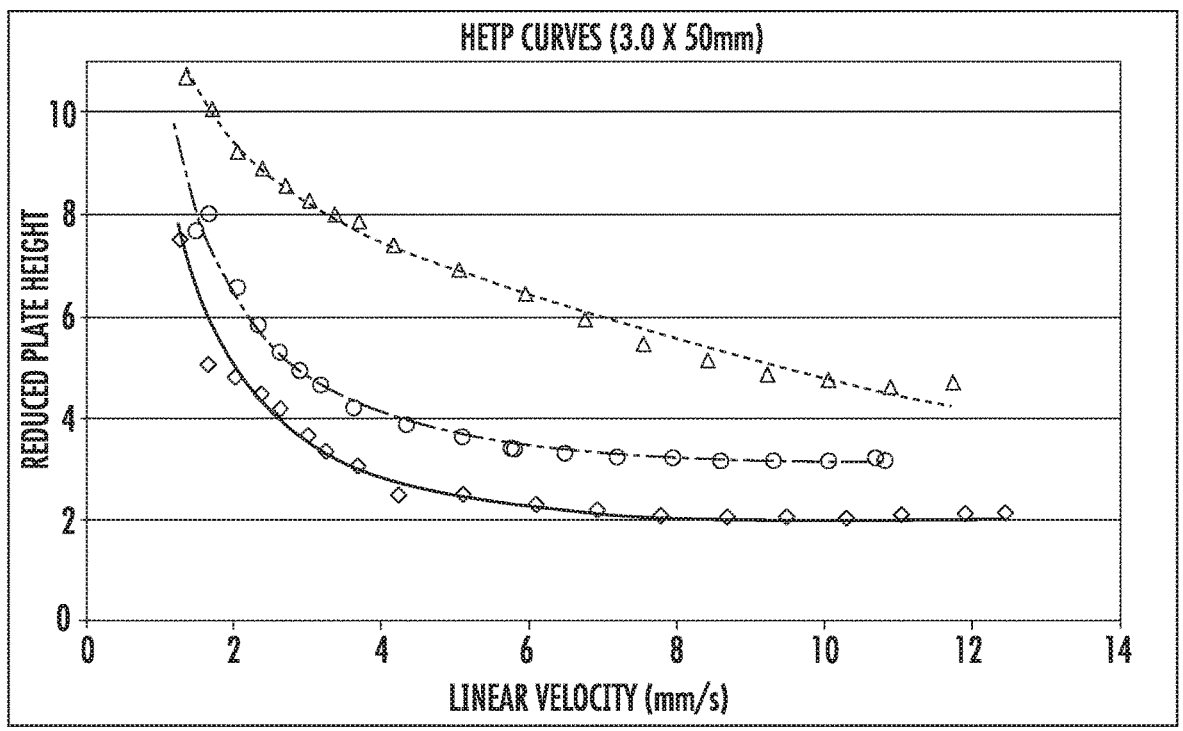
FIG. 1 shows the comparison of columns packed with superficially porous particles sized less than 2 microns as described herein as compared to fully porous particles sized less than 2 microns and superficially porous particles sized greater than 2 microns under supercritical fluid chromatography conditions. Specifically, the column was 3.0×50 mm and packed with the materials of Example 11a. Conditions: 3.0 mLm/min, 97/3 $CO_2$/MeOH, 40 C, 2175 psi ABPR, 254 nm detection, ACQUITY $UPC^2$ system.
Figure 2:
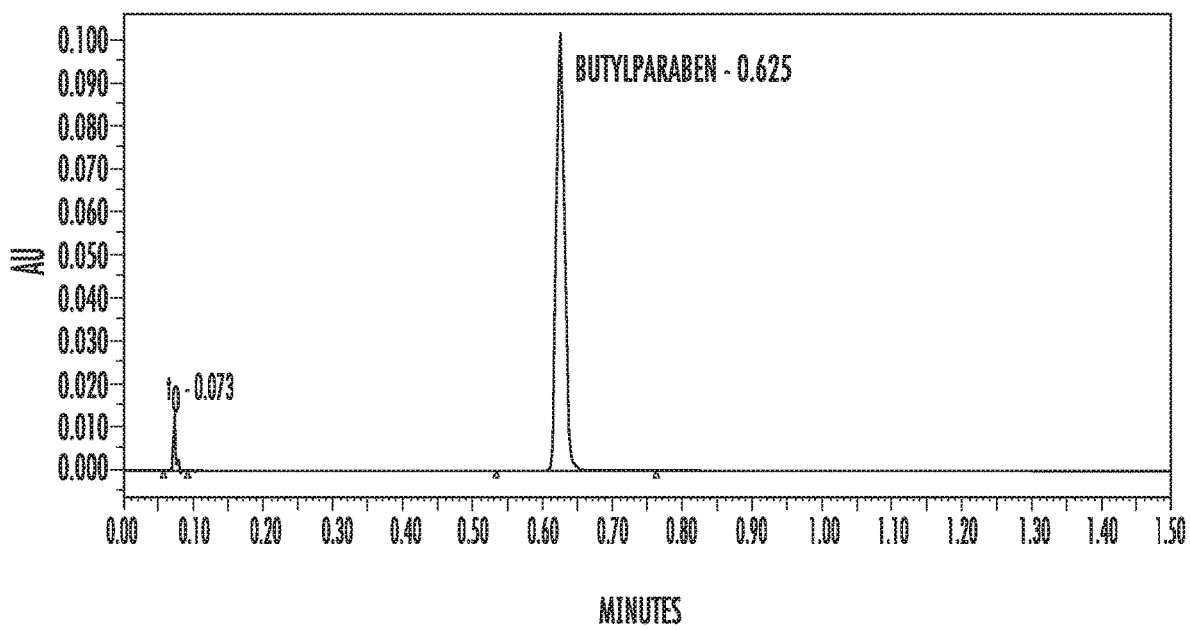
FIG. 2 shows the low tailing factor peak chromatogram obtained for butylparaben on a 3.0×50 mm column packed with the material of Example 11a (USP Tailing Factor=1.126; USP Plates=15782). Conditions: 3.0×50 mm column, 3.0 mLm/min, 97/3 $CO_2$/MeOH, 40 C, 2175 psi ABPR, 254 nm detection, ACQUITY $UPC^2$ system.

The present invention provides novel chromatographic materials, e.g., for chromatographic separations, processes for its preparation and separations devices containing the chromatographic material. The present invention will be more fully illustrated by reference to the definitions set forth below.

Definitions

"Hybrid", including "hybrid inorganic/organic material," includes inorganic-based structures wherein an organic functionality is integral to both the internal or "skeletal" inorganic structure as well as the hybrid material surface. The inorganic portion of the hybrid material may be, e.g., alumina, silica, titanium, cerium, or "Hybrid" includes inorganic-based structures wherein an organic functionality is integral to both the internal or "skeletal" inorganic structure as well as the hybrid material surface. The inorganic portion of the hybrid material may be, e.g., alumina, silica, titanium, cerium, or zirconium oxides, or ceramic material; in an advantageous embodiment, the inorganic portion of the hybrid material is silica. As noted above, exemplary hybrid materials are shown in U.S. Pat. Nos. 4,017,528, 6,528,167, 6,686,035 and 7,175,913 and International Application Publication No. WO2008/103423.

The term "alicyclic group" includes closed ring structures of three or more carbon atoms. Alicyclic groups include cycloparaffins or naphthenes which are saturated cyclic hydrocarbons, cycloolefins, which are unsaturated with two or more double bonds, and cycloacetylenes which have a triple bond. They do not include aromatic groups. Examples of cycloparaffins include cyclopropane, cyclohexane and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, $-CF_3$, $-CN$, or the like.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl and the like. As used herein, the term "nitro" means $-NO_2$; the term "halogen" designates $-F$, $-Cl$, $-Br$ or $-I$; the term "thiol" means SH; and the term "hydroxyl" means $-OH$. Thus, the term "alkylamino" as used herein means an alkyl group, as defined above, having an amino group attached thereto. Suitable alkylamino groups include groups having 1 to about 12 carbon atoms, advantageously from 1 to about 6 carbon atoms. The term "alkylthio" refers to an alkyl group, as defined above, having a sulfhydryl group attached thereto. Suitable alkylthio groups include groups having 1 to about 12 carbon atoms, advantageously from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, advantageously 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, advantageously from 1 to about 6 carbon atoms.

The term "alkyl" includes saturated aliphatic groups, including straight-chain alkyl groups, branched-chain alkyl groups, cycloalkyl(alicyclic) groups, alkyl substituted cycloalkyl groups and cycloalkyl substituted alkyl groups. In certain embodiments, a straight chain or branched chain alkyl has 30 or fewer carbon atoms in its backbone, e.g., $C_1$-$C_{30}$ for straight chain or $C_3$-$C_{30}$ for branched chain. In certain embodiments, a straight chain or branched chain alkyl has 20 or fewer carbon atoms in its backbone, e.g., $C_1$-$C_{20}$ for straight chain or $C_3$-$C_{20}$ for branched chain, and more advantageously 18 or fewer. Likewise, advantageous cycloalkyls have from 4-10 carbon atoms in their ring structure and more advantageously have 4-7 carbon atoms in the ring structure. The term "lower alkyl" refers to alkyl groups having from 1 to 6 carbons in the chain and to cycloalkyls having from 3 to 6 carbons in the ring structure.

Moreover, the term "alkyl" (including "lower alkyl") as used throughout the specification and Claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl(benzyl).

The term "amino," as used herein, refers to an unsubstituted or substituted moiety of the formula —NRaRb, in which Ra and Rb are each independently hydrogen, alkyl, aryl, or heterocyclyl, or Ra and Rb, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of Ra and Rb, is further substituted with an amino group. A "hetero-substituted amino group" refers to an amino group in which at least one of Ra and Rb, is further substituted with a group containing an additional heteroatom.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine and the like. Aryl groups also include polycyclic fused aromatic groups such as naphthyl, quinolyl, indolyl and the like. The aromatic ring can be substituted at one or more ring positions with such substituents, e.g., as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "ceramic precursor"" is intended include any compound that results in the formation of a ceramic material.

The term "chiral moiety" is intended to include any functionality that allows for chiral or stereoselective syntheses. Chiral moieties include, but are not limited to, substituent groups having at least one chiral center, natural and unnatural amino-acids, peptides and proteins, derivatized cellulose, macrocyclic antibiotics, cyclodextrins, crown ethers, and metal complexes.

The language "chromatographically-enhancing pore geometry" includes the geometry of the pore configuration of the presently-disclosed materials, which has been found to enhance the chromatographic separation ability of the material, e.g., as distinguished from other chromatographic media in the art. For example, a geometry can be formed, selected or constructed, and various properties and/or factors can be used to determine whether the chromatographic separations ability of the material has been "enhanced", e.g., as compared to a geometry known or conventionally used in the art. Examples of these factors include high separation efficiency, longer column life and high mass transfer properties (as evidenced by, e.g., reduced band spreading and good peak shape.) These properties can be measured or observed using art-recognized techniques. For example, the chromatographically-enhancing pore geometry of the present porous materials is distinguished from the prior art particles by the absence of "ink bottle" or "shell shaped" pore geometry or morphology, both of which are undesirable because they, e.g., reduce mass transfer rates, leading to lower efficiencies. Chromatographically-enhancing pore geometry is found in porous materials containing only a small population of micropores. Porous materials with such a low micropore surface area (MSA) give chromatographic enhancements including high separation efficiency and good mass transfer properties (as evidenced by, e.g., reduced band spreading and good peak shape). Micropore surface area (MSA) is defined as the surface area in pores with diameters less than or equal to 34 Å, determined by multipoint nitrogen sorption analysis from the adsorption leg of the isotherm using the BJH method. As used herein, the acronyms "MSA" and "MPA" are used interchangeably to denote "micropore surface area".

The term "functionalizing group" includes organic functional groups which impart a certain chromatographic functionality to a chromatographic stationary phase.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "metal oxide precursor" is intended include any compound that contains a metal and results in the formation of a metal oxide, e.g., alumina, silica, titanium oxide, zirconium oxide, or cerium oxide.

The term "nanoparticle" is a microscopic particle/grain or microscopic member of a powder/nanopowder with at least one dimension less than about 100 nm, e.g., a diameter or particle thickness of less than about 100 nm (0.1 mm), which may be crystalline or noncrystalline. Nanoparticles have properties different from, and often superior to those of conventional bulk materials including, for example, greater strength, hardness, ductility, sinterability, and greater reactivity among others. Considerable scientific study continues to be devoted to determining the properties of nanomaterials, small amounts of which have been synthesized (mainly as nano-size powders) by a number of processes including colloidal precipitation, mechanical grinding, and gas-phase nucleation and growth. Extensive reviews have documented recent developments in nano-phase materials, and are incorporated herein by reference thereto: Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197. In certain embodiments, the nanoparticles comprise oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. In certain embodiments, the nanoparticles of the present invention are selected from diamonds, zirconium oxide (amorphous, monoclinic, tetragonal and cubic forms), titanium oxide (amorphous, anatase, brookite and rutile forms), aluminum (amorphous, alpha, and gamma forms), and boronitride (cubic form). In particular embodiments, the nanoparticles of the present invention are selected from nano-diamonds, silicon carbide, titanium dioxide (anatase form), cubic-boronitride, and any combination thereof. Moreover, in particular embodiments, the nanoparticles may be crystalline or amorphous. In particular embodiments, the nanoparticles are less than or equal to 100 nm in diameter, e.g., less than or equal to 50 nm in diameter, e.g., less than or equal to 20 nm in diameter.

Moreover, it should be understood that the nanoparticles that are characterized as dispersed within the composites of the invention are intended to describe exogenously added nanoparticles. This is in contrast to nanoparticles, or formations containing significant similarity with putative nanoparticles, that are capable of formation in situ, wherein, for example, macromolecular structures, such as particles, may comprise an aggregation of these endogenously created.

The term "substantially disordered" refers to a lack of pore ordering based on x-ray powder diffraction analysis. Specifically, "substantially disordered" is defined by the lack of a peak at a diffraction angle that corresponds to a d value (or d-spacing) of at least 1 nm in an x-ray diffraction pattern.

"Surface modifiers" include (typically) organic functional groups which impart a certain chromatographic functionality to a chromatographic stationary phase. The porous inorganic/organic hybrid particles possess both organic groups and silanol groups which may additionally be substituted or derivatized with a surface modifier.

The language "surface modified" is used herein to describe the composite material of the present invention that possess both organic groups and silanol groups which may additionally be substituted or derivatized with a surface modifier. "Surface modifiers" include (typically) organic functional groups which impart a certain chromatographic functionality to a chromatographic stationary phase. Surface modifiers such as disclosed herein are attached to the base material, e.g., via derivatization or coating and later cross-linking, imparting the chemical character of the surface modifier to the base material. In one embodiment, the organic groups of a hybrid material, e.g., particle, react to form an organic covalent bond with a surface modifier. The modifiers can form an organic covalent bond to the material's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. A variety of synthetic transformations are well known in the literature, see, e.g., March, J. Advanced Organic Chemistry, 3rd Edition, Wiley, New York, 1985.

The term "nanoparticle" is a microscopic particle/grain or microscopic member of a powder/nanopowder with at least one dimension less than about 100 nm, e.g., a diameter or particle thickness of less than about 100 nm (0.1 µm), which may be crystalline or noncrystalline. Nanoparticles have properties different from, and often superior to those of conventional bulk materials including, for example, greater strength, hardness, ductility, sinterability, and greater reactivity among others. Considerable scientific study continues to be devoted to determining the properties of nanomaterials, small amounts of which have been synthesized (mainly as nano-size powders) by a number of processes including colloidal precipitation, mechanical grinding, and gas-phase nucleation and growth. Extensive reviews have documented recent developments in nano-phase materials, and are incorporated herein by reference thereto: Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197. In certain embodiments, the nanoparticles comprise oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. In certain embodiments, the nanoparticles of the present invention are selected from diamonds, zirconium oxide (amorphous, monoclinic, tetragonal and cubic forms), titanium oxide (amorphous, anatase, brookite and rutile forms), aluminum (amorphous, alpha, and gamma forms), and boronitride (cubic form). In particular embodiments, the nanoparticles of the present invention are selected from nano-diamonds, silicon carbide, titanium dioxide (anatase form), cubic-boronitride, and any combination thereof. Moreover, in particular embodiments, the nanoparticles may be crystalline or amorphous. In particular embodiments, the nanoparticles are less than or equal to 100 µm in diameter, e.g., less than or equal to 50 µm in diameter, e.g., less than or equal to 20 µm in diameter.

Moreover, it should be understood that the nanoparticles that are characterized as dispersed within the composites of the invention are intended to describe exogenously added nanoparticles. This is in contrast to nanoparticles, or formations containing significant similarity with putative nanoparticles, that are capable of formation in situ, wherein, for example, macromolecular structures, such as particles, may comprise an aggregation of these endogenously created.

Nanoparticles are of great scientific interest as they are effectively a bridge between bulk materials and atomic or molecular structures. A bulk material should have constant physical properties regardless of its size, but at the nanoscale this is often not the case. Size-dependent properties are observed such as quantum confinement in semiconductor particles, surface plasmon resonance in some metal particles and superparamagnetism in magnetic materials.

The properties of materials change as their size approaches the nanoscale and as the percentage of atoms at the surface of a material becomes significant. For bulk materials larger than one micrometer the percentage of atoms at the surface is minuscule relative to the total number of atoms of the material. The interesting and sometimes unexpected properties of nanoparticles are partly due to the aspects of the surface of the material dominating the properties in lieu of the bulk properties. In certain embodiments, selection of the nanoparticle affects the selectivity of the chromatographic material. For example, dispersion of $TiO_2$ or zirconium oxide could modify the surface charge, surface acidity, and therefore, the chromatographic selectivity.

The language, "composite material" and the term "composite" are used interchangeably herein to describe the engineered materials of the invention composed of one or more components described herein in combination with dispersed nanoparticles, wherein each component/nanoparticle remains separate and distinct on a macroscopic level within the finished structure. The composite material of the present invention is independent of form, and may be monolithic or particulate in nature. Moreover, a short-hand convention may be used to describe a composite material containing a dispersed nanoparticle, $Np/(A)_w(B)_x(C)_y$, and may be understood as follows: the symbolic representation to the left of the slash mark represents the dispersed nanoparticle, and the symbolic representations to the right of the slash mark represent the components that comprise the material that the nanoparticle (noted on the left of the slash mark) is dispersed within. In certain embodiments, the composite materials of the present invention may be nanocomposites, which are known to include, at least, for example, nano/nano-type, intra-type, inter-type, and intra/inter-type. (Nanocomposites Science and Technology, edited by P. M. Ajayan, L. S. Schadler, P. V. Braun, Wiley-VCH (Weinheim, Germany), 2003)

The terms "material having a high thermal conductivity", "high thermal conductivity core", and a "high thermal conductivity additive" are defined as a material, core material, or composite additive having a thermal conductivity greater than 20 W/(m·K). In various embodiments the additive has a thermal conductivity ranges from: about 20 W/(m·K) to not more than 3500 W/(m·K); about 100 W/(m·K) to not more than 3300 W/(m·K); and 400 W/(m·K) to not more than 3000 W/(m·K). High thermal conductivity cores or additives can be, for example and without limitation, a 0.1-8 μm core particle, nanoparticle additives, or a metal oxide precursor. In various embodiments the high thermal conductivity core or additive includes (but is not limited to) aluminum, copper, gold, and diamonds.

A "high thermal diffusivity" core or additive is defined as an additive used in a superficially porous materials as having a thermal diffusivity greater than 20 $mm^2/s$. In various embodiments the core or additive has a thermal diffusivity ranges from: about 20 $mm^2/s$ to not more than 2000 $mm^2/s$; about 100 $mm^2/s$ to not more than 1600 $mm^2/s$; and 150 $mm^2/s$ to not more than 1400 $mm^2/s$. This high thermal conductivity core or additive can be a 0.1-8 μm core particle, nanoparticle additives, or a metal oxide precursor. In various embodiments the high thermal conductivity core or additive includes (but is not limited to) aluminum, copper, gold, and diamonds.

A "high thermal conductivity superficially porous material (or particle)" is defined as a material that has improved thermal conductivity or improved thermal diffusivity over a porous silica particle of the same size. In various embodiments the higher thermal conductivity superficially porous material is a material that has improved thermal conductivity or thermal diffusivity over a superficially porous silica particle of the same size. In various embodiments the higher thermal conductivity superficially porous material is a material that has improved thermal conductivity over a fully porous hybrid particle of the same size. Determination of particle thermal conductivity can be made by the method of Gritti and Guiochon [J. Chromatogr. A, 2010, 1217, 5137) taking into account differences in bulk material properties, pore volume, surface modification type and coverage.

The terms "magnetic material", "magnetic cores" and "magnetic additives" are defined as a material, core material, or composite additive that has a mass magnetization (σ, magnetic moment per unit mass, magnetic saturation or saturation magnetization) at room temperature greater than 15 emu/g (A $m^2$/kg). This includes ferromagnetic and ferrimagnetic materials, including (but is not limited to): magnetite (ferrous ferric oxide); maghemite; yttrium iron garnet, cobalt, $CrO_2$; and ferrites containing iron and Al, Mg, Ni, Zn, Mn or Co). Magnetic core particles do not include other oxides of iron, including hematite and goethite, that have mass magnetization values less than 10 emu/g. Hematite (0.4 emu/g) is considered antiferromagnetic at room temperature.

As used herein, the term "fines" refers to undesired materials generated in the processes of the invention that are below the 10 vol % of the target particle size distribution. Fines can be formed from reseeding events or from particle breakage. Resulting fines can be nonporous or fully porous. Often fines are substantially smaller than the 10 vol % of the target particle size distribution. Often fines are <1 μm in size. Very small fines can cause problems in chromatography in that the percolate through the packed bed and get stuck in the outlet frit. This generates increased column pressure. Alternatively fines small enough to percolate through the packed bed and outlet frit can result in problems with detectors and can contaminate a product. Problems with detector include clogging flow channels, blocking detector windows, and anomalous detector readings. Such issues can reduce the lifetime of a detector and can require extensive cleaning protocols. Such issues can also impact the precision, accuracy, reliability, reproducibility, and robustness of analytical data generated. Fines can be removed by classification.

As used herein, the terms "aggregates" and "agglomerates" refer to undesired materials generated in the processes of the invention that are larger than the 90 vol % of the target particle size distribution. aggregates and/or agglomerates can form from imperfections of the core material, improper mixing or dispersion in the process, or excessive forces during workup. Aggregates and agglomerates can impact the efficiency, permeability, reproducibility and robustness of packed beds within chromatographic columns. It is difficult to optimally pack a chromatographic column with materials having an elevated amount of aggregates and agglomerates. Aggregates and agglomerates can break apart within a packed bed structure when exposed to high pressures and shears. This can result in a mechanical instability of the packed bed and the result of a void on the top of the column. This breaking of aggregates and agglomerates can also result in the generation of fines. Aggregates and agglomerates can be removed by classification.

Hybrid Inorganic/Organic Superficially Porous Particles.

Hybrid particle technologies are highly desirable for many chromatographic applications due to the increased chemical stability and reduced silanol activity they provide. One key advantage of hybrid particles over silica and hybrid coated silica particles in chromatographic applications is their superior column stability when used with alkaline mobile phases (pH 8-12). Silica and some hybrid coated silica packing materials have limited lifetimes under these conditions due to the dissolution of the silica and collapse of the packed bed.

Approach to the Synthesis of Hybrid Superficially Porous Particles.

In one approach spherical silica or hybrid non-porous cores are prepared following standard protocols. A superficially porous layer is formed using two or more of the following; TEOS, a thermally degradable organofunctional silane (e.g., acetoxypropyltrialkoxysilane or bromoethyltrialkoxysilane) along with a more thermally stable hybrid silanes, such as (but not limited to) phenylene bridged silanes. In this process lower temperature thermal treatment (<500° C.) is performed to degrade the thermally degradable organofunctional silane as a means to introduce porosity, while maintaining the more thermally stable hybrid group. The temperature is determined by TGA experiments performed in air. Additional steps of classification, pore modification, acid treatment and bonding are performed, as detailed herein.

In another approach, spherical hybrid non-porous cores are prepared following standard protocols. A superficially porous layer is prepared using a surfactant or a mixed surfactant approach using one or more silanes that include (but is not limited to) TEOS, a lower temperature degradable organofunctional silane (e.g., acetoxypropyltrialkoxysilane or bromoethyltrialkoxysilane), ethylene bridged alkoxysilanes, or phenylene bridged alkoxysilanes. The surfactant is removed using an acid ethanol process (e.g., hydrochloric acid in ethanol). Alternatively, the surfactant is removed by thermal treatment (<500° C.) at a temperature that preserves the hybrid group, while removing the surfactant. This temperature is determined by TGA experiments performed in air. Alternatively the surfactant is removed by oxidation (e.g., ozonolysis). Alternatively, one or more of the surfactants used in this process are selected from the group of acid labile, base labile, or other labile surfactants. These labile surfactants can be reacted and removed later by selecting the correct chemical conditions (e.g., acid hydrolysis, base hydrolysis, reduction or oxidation, hydrogenation or hydrogenolysis). Additional steps of classification, pore modification, acid treatment and bonding are performed, as detailed above. In another approach, spherical silica or hybrid non-porous cores are prepared following standard protocols. Separately a hybrid sol (<100 nm) solution is prepared using one or more silanes that include (but is not limited to) TEOS, lower temperature degradable organofunctional silane (e.g., acetoxypropyltrialkoxysilane or bromoethyltrialkoxysilane), ethylene bridged alkoxysilanes, or phenylene bridged alkoxysilanes. A uniform superficially porous layer is then prepared in a layer-by-layer approach using a suitable positively charged polyelectrolyte. Suitable polyelectrolytes include (but are not limited to) linear, branched, and block polymers containing one or more of the following groups; alkyl, cycloalkyl, aryl, ethylene oxide groups along with one or more of the following groups; primary, secondary, tertiary and quaternary amino groups, pyrrolidone, pyridine, and imidazole. The polyelectrolyte is removed by thermal treatment (<500° C.) at a temperature that preserves the hybrid group, while removing the polyelectrolyte. This temperature is determined by TGA experiments performed in air. Alternatively the polyelectrolyte is removed by ozonolysis. Additional steps of classification, pore modification, acid treatment and bonding are performed, as detailed herein.

Higher Thermal Conductivity Superficially Porous Particles.

Recent studies (Gritti, F. *Journal of Chromatography A*, 1217 (2010) 5069-5083) suggest superficially porous silica particles have significantly higher thermal conductivities when compared to fully porous particles of the same size. This higher thermal conductivity is one reason why superficially porous particles were noted to have improved chromatographic performance.

Approach to the Synthesis of Higher Thermal Conductivity Superficially Porous Particles It is well known that many materials have higher thermal conductivities than silica. Included in this is diamond. Micron and sub-micron sized diamond particles are well known, and can be prepared from natural and chemical processes. Alternatively diamond nanoparticles can be incorporated within non-porous cores (including non-porous silica) The use of a diamond core (0.5-3 µm) for a superficially porous particle may result in a measurable increase in thermal conductivity when compared to a silica based superficially porous particle of comparable size. In order to reduce undesired chromatographic interactions that may result from a diamond core, a non-porous silica or hybrid surface coating may be advantageously used. This surface coating step may be advantageously repeated or performed in a growth-process to achieve the desired thickness. Calcination and surface rehydroxylation may be advantageously used at the end of this step.

The superficially porous layer may be silica or hybrid, and can be prepared in any of the processes described herein. Additional steps of classification, calcination, pore modification, re-calcination, rehydroxylation and bonding are then performed (as required), as detailed herein.

Improved Permeability Using Superficially Porous Technologies.

The impact of particle attributes on packed bed permeability can be modeled using the Kozeny-Carman equation. One can use this equation to model pressures required to push a solvent through a column packed with particles that varies in interstitial fraction ($\varepsilon$) and particle size ($d_p$). Pressure changes with the square of particle size (based on number count), while column efficiency correlates linearly with particle size (based on volume count). As a result, decreasing particle size to improve efficiency results in a dramatic increase in column pressure. While chromatographic systems exist that can handle increased column pressures, it is desirable to obtain the lowest column pressures available for a given particle size. One means to achieve this is to decrease the difference between the number and volume average particle size. For example, using particles that are monodisperse. Monodisperse non-porous, fully porous and superficially porous particles have been reported having rough or smooth particle surfaces. For the latter the ability to prepare monodisperse particles is a function of the non-porous core as well as the uniformity of the porous layer. As described herein, the materials of the instant invention provide improved permeability as well as improved chemical stability with high pH mobile phases.

Approach to the Synthesis of Superficially Porous Particles that Form Packed Beds with Improved Permeability.

A further improvement in permeability can be achieved if the particle shape is modified. For example, a uniform micron-sized doughnut, rod, dumbbell, star, or bent-rod-shaped cores is used in place of a highly spherical core. Additional shapes include (but not limited to) spirals, discoidal, concave disks, spools, rings, helix, saddles, cross, cube, derby, helix, cylinders, and tubes. Examples of dumbbell, doughnut, rod, spiral, and gyroid particles have been reported {Doshi, N. *PNAS*, 2009, 106, 51, 21495; Alexander, L. *Chem. Commun.*, 2008, 3507; Naik, S. *J. Phys. Chem. C* 2007, 111, 11168; Pang, X. *Microporous and Mesoporous Materials* 85 (2005) 1; Kievsky, Y. *IEEE Transactions on Nanotechnology*, 2005, 4, 5, 490; Sugimoto, T. in Monodispersed Particles, (Elsevier Science BV, Amsterdam) 2001; Ozin, G. *Adv. Mater.*, 1997, 9, 662}.

Important factors for the non-spherical cores are that they be relatively uniform in dimensions, free-flowing, non-porous, and mechanically strong enough for use in HPLC and UPLC. The composition of these cores may be selected from (but is not limited to) silica, metal oxides, diamonds, heavily cross linked polymers, and hybrid materials. Improvements in core uniformity can be achieved through classification. A reduction in porosity can be achieved by pore filling with a similar or different composition (e.g., pore filling a silica material with a crosslinked polymer composition). Improvements in mechanical strength is achieved by increasing crosslinking with the same or different composition (e.g., creating a silica network within a polymer composition), or by calcination. For the latter, higher temperatures (e.g., >800° C.) may be advantageously used.

In order to reduce undesired chromatographic interactions due to the core, a non-porous surface coating with a silica, hybrid, or polymeric composition may be advantageously used. This surface coating step may need to be repeated or performed in a growth-process to achieve the desired thickness. To ensure that the core morphology is not substantially modified, this step advantageously provides a uniform surface layer. Calcination and surface rehydroxylation may be advantageously used at the end of this step.

A uniform silica or hybrid superficially porous layer may be formed from any one of the processes described above. To ensure the core morphology is not substantially modified, this step advantageously yields a highly uniform porous layer. Additional steps of classification, calcination, pore modification, re-calcination, rehydroxylation and bonding are then performed (as required) as detailed above. These non-spherical superficially porous materials can be packed in chromatographic columns individually or as mixtures with other shapes, or with spherical particles. It is important to optimize column packing conditions for these mixed systems. Considerations of maintaining similar dispersion, bulk density and settling rates between the different materials need to be made.

Improved Process to Prepare Superficially Porous Materials.

As noted herein, the AMT process and the University of Cork process both require repeated in-process workups using centrifugation followed by redispersion during the formation of the superficially porous layer. The concerns with repeated centrifugation is aggregation/agglomeration, difficulty redispersing particles, product uniformity, and long labor times required for this process. Aggregation and agglomeration are extremely detrimental for this process. It is possible for aggregates/agglomerates to be further coated in both of these processes. By its nature repeated centrifugation allows for these un-aged, 'green' materials to get close to each other. Excessive centrifugation time and g-forces can results in a tight bed structure that can be hard to redisperse. Filtration (including tangential filtration) is an alternative to centrifugation that allows for a less compact bed to be formed. Unfortunately the time period required to filter <3 µm materials that may be laden with sub-micron fines is prohibitive. These sub-micron fines can readily clog the filter material preventing complete filtration to occur.

There are also many methods available to redisperse particles, including sonication using sonic baths, in-line sonicators, in-tank sonicators, sonic horns, rotor-stator mixers, milling, low shear and high shear mixing (e.g., saw-tooth impellers). Optimization of amplitude, frequency and pulse sequences is used for optimal sonication. Adjusting the conductivity, pH and surfactant mixture can also be used to optimally redisperse particles (through solvent washes, or controlled order of addition of reagents). One concern for these redispersion methods is the potential to harm the superficially porous layer. It is expected that elevated shears may result in a fracturing of the porous layer. The resulting material may have bare-spots, or non-uniform porous layers.

A further concerns is the long reaction times required for an iterative process, such as those described by AMT and the University of Cork. While such materials can be prepared on a laboratory and batch scale, the times required for these processes can exceed those typically used for the synthesis of fully porous particles.

Another concern for uniform shell processes is the impact of reseeding. Reseeded particles (<0.5 µm) can emerge during the growth step. If they are not effectively removed, the will start to grow preferentially over the larger porous layer, solid core materials. At some point the two particle distributions can overlap. The end result of this, after further processing steps, is the overlapping mixture of superficially porous and fully porous particles. These overlapping mixture of particles are difficult to separate, quantify or understand the impact on chromatographic performance (including chromatographic reproducibility).

Approach to the Improved Synthesis of Superficially Porous Materials.

In this approach magnetic capture methods are used to collect magnetic core particles in place of centrifugation or filtration. These methods include in-tank, in-line, or off-line magnetic capture.

In-tank magnetic capture uses a removable magnetic rod (or alternatively an electromagnet) placed within a removable or permanent glass sleeve or baffle. In this approach the magnetic rod is placed within the glass sleeve during the time of capture. After the remaining reaction solution is emptied and a new wash or reaction solvent is added, the magnetic rod is removed and bound magnetic core particles are redispersed. Alternatively, an external magnet is placed on the side of the reactor allowing magnetic core particles to be captured on the reactor side-wall. After the remaining reaction solution is emptied and a new wash or reaction solvent is added, the external magnet is removed and bound magnetic core particles are redispersed.

The in-line magnetic capture method involves pumping the reaction solution in a recirculation loop through a collection container. This collection container is placed within a magnetic holding block. Magnetic core particles are collected in this container. After the remaining reaction solution is emptied and a new wash or reaction solvent is added, the collection container is removed from the magnetic holding block and the bound magnetic core particles are redispersed as they are pumped back into the reaction vessel. By using the appropriate sized collection container (advantageously containing one or more flat surfaces) this approach has an advantage in that it allows for good control of the surface area exposed to the magnetic field.

The off-line magnetic capture method is similar to filtration in that the reaction solution is transferred to a secondary vessel. In this secondary vessel, a magnetic field is applied to allow for the controlled collection of magnetic core particles. Reaction solution or wash solvents are removed by filtration, decanting, or by siphon. Magnetic core particles are redispersed in the appropriate solvent and transferred back to the reaction vessel.

During the magnetic capture step for all of these approaches, a loose collection of magnetic core particles is formed. These collections of core particles are less dense than the cake formed by excessive centrifugation. As a result these particles are easier to redisperse. The manner of redispersing magnetic core particles is similar to the approaches described above.

In this approach a non-porous magnetic core is used in place of a non-porous silica or hybrid core. This magnetic core can contain (but is not limited to) magnetic forms of iron oxides, iron, metals, metal oxides, chromium dioxide, ferrites, or cobalt. Advantageously the magnetic core contains magnetite, maghemite. The magnetic core can exist as a pure metal or metal oxide or exist in combination with a second material that includes (but is not limited to) silica, hybrid, polymer, or non-magnetic materials. For example, a magnetic core can be formed by incorporating <100 nm magnetite or cobalt nanoparticles within non-porous silica or polymer particles. The magnetic nanoparticles can be homogeneously dispersed nanoparticles or dispersed clusters of nanoparticles within this material, adsorbed only to the surface, or contained only in the interior of the non-porous core particles. Alternatively 0.3-1.5 µm magnetite or cobalt particles can be used as the non-porous core. Magnetic capture methods are used in this process in place of centrifugation or filtration.

In order to reduce undesired chromatographic interactions due to the core, a non-porous surface coating with a silica, hybrid, or polymeric composition may be advantageously used. This surface coating step may be repeated or performed in a growth-process to achieve the desired thickness. Magnetic capture methods are used in this process in place of centrifugation or filtration. To ensure that the core morphology is not substantially modified, this step advantageously provides a uniform surface layer. Calcination and surface rehydroxylation may be advantageously used at the end of this step.

A uniform silica or hybrid superficially porous layer may be formed from any one of the processes described above. To ensure the core morphology is not substantially modified, this step advantageously yields a highly uniform porous layer. Magnetic capture methods are used in this process in place of centrifugation or filtration. Additional steps of classification, calcination, pore modification, re-calcination, rehydroxylation and bonding are then performed (as needed) as detailed above.

Considering the problem associated with reseeded particles for uniform layer processes such as the novel one described above or the University of Cork process, a magnetic core particle allows for a unique means to separate the porous layer materials from reseeded particles. This can be utilized in-process or during product workup.

The use of magnetic core particles as well as magnetic capture methods allows for a unique process of automating the synthesis of superficially porous particles. The use of in-tank magnetic capture (e.g., using electromagnets) allows for full automation of particle collection. Automated bottom valves and solvent addition valves, are used to fully automate synthesis conditions. In-tank or in-line particle size measurements are used to monitor reaction performance and determined reaction completion.

Core and Shell Materials.

The invention provides superficially porous materials, particles and/or monoliths comprising a substantially non-porous inorganic/organic hybrid core and one or more layers of a porous shell material surrounding the core.

In certain embodiments, the superficially porous material of the invention has chromatographically enhancing pore geometry. That is, in some embodiments, the superficially porous material of the invention has only a small population of micropores.

In certain aspects, the superficially porous material of the invention comprises a porous shell layer on a superficially porous core. In certain embodiments, the material comprises a porous hybrid shell layer on a superficially porous silica core.

Hybrid Core

The novel inorganic/organic hybrid materials of the invention comprise a substantially nonporous inorganic/organic hybrid core. That is, the inorganic/organic hybrid core of the invention has a pore volume of less than 0.10 cc/g. The hybrid core may possess or not possess a copolymeric structure. In certain embodiments, the hybrid core may or may not contain nanoparticles of a composite material.

Thus, in one aspect, the invention comprises an inorganic/organic hybrid core, wherein the inorganic portion of the hybrid core is present in an amount ranging from about 0 molar % to not more than about 100 molar %, wherein the pores of the core are substantially disordered. In other embodiments, the inorganic portion of the hybrid core is present in an amount from about 0 molar % to not more than about 75 molar %. In still other embodiments, the inorganic portion of the hybrid core is present in an amount from about 0 molar % to not more than about 50 molar %. In yet other embodiments, the inorganic portion of the hybrid core is present in an amount from about 0 molar % to not more than about 25 molar %.

In various embodiments of the aforementioned aspect of the invention, the amount of the inorganic portion of the hybrid core ranges from: about 0 molar % to not more than about 1 molar %; about 0 molar % to not more than about 2 molar %; about 0 molar % to not more than about 3 molar %; about 0 molar % to not more than about 4 molar %; about 0 molar % to not more than about 5 molar %; about 0 molar % to not more than about 6 molar %; about 0 molar % to not more than about 7 molar %; about 0 molar % to not more than about 8 molar %; about 0 molar % to not more than about 9 molar %; about 0 molar % to not more than about 10 molar %; about 0 molar % to not more than about 11 molar %; about 0 molar % to not more than about 12 molar %; about 0 molar % to not more than about 13 molar %; about 0 molar % to not more than about 14 molar %; about 0 molar % to not more than about 15 molar %; about 0 molar % to not more than about 16 molar %; about 0 molar % to not more than about 17 molar %; about 0 molar % to not more than about 18 molar %; about 0 molar % to not more than about 19 molar %; about 0 molar % to not more than about 20 molar %; about 0 molar % to not more than about 21 molar %; about 0 molar % to not more than about 22 molar %; about 0 molar % to not more than about 23 molar %; about 0 molar % to not more than about 24 molar %; and about 0 molar % to not more than about 25 molar; about 0 molar % to not more than about 26 molar %; about 0 molar % to not more than about 27 molar %; about 0 molar % to not more than about 28 molar %; about 0 molar % to not more than about 29 molar %; about 0 molar % to not more than about 30 molar %; about 0 molar % to not more than about 31 molar %; about 0 molar % to not more than about 32 molar %; about 0 molar % to not more than about 33 molar %; about 0 molar % to not more than about 34 molar %; about 0 molar % to not more than about 35 molar %; about 0 molar % to not more than about 36 molar %; about 0 molar % to not more than about 37 molar %; about 0 molar % to not more than about 38 molar %; about 0 molar % to not more than about 39 molar %; about 0 molar % to not more than about 40 molar %; about 0 molar % to not more than about 41 molar %; about 0 molar % to not more than about 42 molar %; about 0 molar % to not more than about 43 molar %; about 0 molar % to not more than about 44 molar %; about 0 molar % to not more than about 45 molar %; about 0 molar % to not more than about 46 molar %; about 0 molar % to not more than about 47 molar %; about 0 molar % to not more than about 48 molar %; about 0 molar % to not more than about 49 molar %; about 0 molar % to not more than about 50 molar %; about 0 molar % to not more than about 100 molar %; about 50 molar % to not more than about 99 molar %; and about 75 molar % to not more than about 99 molar %.

The inorganic portion of the hybrid core may be alumina, silica ($SiO_2$), titanium oxide, zirconium oxide, or ceramic materials. The hybrid material of the invention in which the inorganic portion is $SiO_2$ is particularly advantageous.

In one embodiment, the organic content is from about 1 to about 40% carbon. In another embodiment, the organic content is from about 5 to about 35% carbon. In yet another embodiment, the invention provides a porous inorganic/organic hybrid particle, wherein the organic content is from about 25 to about 40% carbon. In a further embodiment, the organic content is from about 25 to about 35% carbon. In a further embodiment, the organic content is from about 5 to about 15% carbon.

In one embodiment, the hybrid material of the invention comprises a hybrid core of formula I:

$$(SiO_2)_d/[R^2((R)_p(R^1)_q SiO_t)_m] \quad (I)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

p and q are each independently 0.0 to 3.0, t is 0.5, 1.0, or 1.5;

d is 0 to about 30;

m is an integer from 1-20; wherein R, $R^1$ and $R^2$ are optionally substituted;

provided that: (1) when $R^2$ is absent, m=1 and $$t = \frac{(4-(p+q))}{2},$$

when $0<p+q\leq 3$; and (2) when $R^2$ is present, m=2-20 and $$t = \frac{(3-(p+q))}{2},$$

when $p+q\leq 2$.

In certain embodiments, $R^2$ is absent, t=1.5 when p+q=1; or t=1 when p+q=2. In other embodiments, $R^2$ is present, p=0, q is 0 or 1 and t=1.5 when q=0; or t=1 when q=1.

In certain embodiments, $R^2$ is absent. In other embodiments, $R^2$ is present. In embodiments of formula I in which $R^2$ is present, the invention comprises a hybrid core of formula I, wherein p is 0, q is 0, t is 1.5, m is 2, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; wherein each $R^2$ is attached to two or more silicon atoms. In a further embodiment, d is 0. In another embodiment, d is 0.11. In still another embodiment, d is 0.33. In certain embodiments, d is 0.83.

In other embodiments of formula I in which $R^2$ is present, the invention comprises a hybrid core of formula I, wherein d is 0, q is 0, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; and wherein each $R^2$ is attached to two or more silicon atoms. In a further embodiment, p is 0, 1, or 2. In another further embodiment, t is 1.0 or 1.5. In another embodiment, m is 1 or 2.

Certain advantageous embodiments of hybrid cores of formula I in which $R^2$ is present are set forth in the following table (product numbers refer to the numbers used in the examples set forth below):

| Reference | Product In reference | Formula | d | p | q | t | m |
|---|---|---|---|---|---|---|---|
| U.S. Pat. No. 6,686,035 B2 | 3i | $(SiO2)_{0.96}(O_{1.5}SiCH_2CH_2SiO_{1.5})_{0.04}$ | 27 | 0 | 0 | 1.5 | 2 |
| U.S. Pat. No. 6,686,035 B2 | 3j | $(SiO2)_{0.89}(O_{1.5}SiCH_2CH_2SiO_{1.5})_{0.11}$ | 8 | 0 | 0 | 1.5 | 2 |
| U.S. Pat. No. 6,686,035 B2 | 3k | $(SiO2)_{0.85}(O_{1.5}SiCH_2CH_2SiO_{1.5})_{0.2}$ | 4 | 0 | 0 | 1.5 | 2 |
| U.S. Pat. No. 6,686,035 B2 | 3l | $(SiO2)_{0.66}(O_{1.5}SiCH_2CH_2SiO_{1.5})_{0.33}$ | 2 | 0 | 0 | 1.5 | 2 |
| U.S. Pat. No. 6,686,035 B2 | 3n | $(SiO2)_{0.5}(O_{1.5}SiCH_2CH_2SiO_{1.5})_{0.5}$ | 1 | 0 | 0 | 1.5 | 2 |
| WO 2008/103423 A1 | 13a | $(SiO2)_{0.45}(O_{1.5}SiCH_2CH_2SiO_{1.5})_{0.55}$ | 0.83 | 0 | 0 | 1.5 | 2 |
| WO 2008/103423 A1 | 13b, 13d-13g | $(SiO2)_{0.25}(O_{1.5}SiCH_2CH_2SiO_{1.5})_{0.75}$ | 0.33 | 0 | 0 | 1.5 | 2 |
| WO 2008/103423 A1 | 13c | $(SiO2)_{0.1}(O_{1.5}SiCH_2CH_2SiO_{1.5})_{0.9}$ | 0.11 | 0 | 0 | 1.5 | 2 |
| WO 2008/103423 A1 | 5h | $(O_{1.5}SiCH_2CH_2SiO_{1.5})$ | 0 | 0 | 0 | 1.5 | 2 |
| WO 2008/103423 A1 | 11a-i, 1-q, t | $(O_{1.5}SiCH_2CH_2SiO_{1.5})_x(YSiO_{1.5})_{1-x}$ | 0 | 0, 1 | 0 | 1.5, 1.5 | 2, 1 |
| WO 2008/103423 A1 | 11j | $(O_{1.5}SiCH_2CH_2SiO_{1.5})_x(YSiO_{1.5})_w(ZSiO_{1.5})_{1-x-w}$ | 0 | 0, 1, 1 | 0, 0, 0 | 1.5, 1.5, 1.5 | 2, 1, 1 |
| WO 2008/103423 A1 | 11k, s | $(O_{1.5}SiCH_2CH_2SiO_{1.5})_x(O_{1.5}Si-Y-SiO_{1.5})_{1-x}$ | 0 | 0, 0 | 0, 0 | 1.5, 1.5 | 2, 2 |
| WO 2008/103423 A1 | 11e | $(O_{1.5}SiCH_2CH_2SiO_{1.5})_x(Y_2SiO_1)_{1-x}$ | 0 | 0, 2 | 0, 0 | 1,5, 1.0 | 2, 1 |
| WO 2008/103423 A1 | 11r | $(O_{1.5}SiCH_2CH_2SiO_{1.5})_x(FSiO_{1.5})_{1-x}$ | 0 | 0, 0 | 0, 0 | 1.5, 1.5 | 2, 1 |

In another embodiment, the hybrid material of the invention comprises a hybrid core of formula II:

$$(SiO_2)_d/[R)_p(R^1)_q SiO_t] \quad (II)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 30;

p and q are each independently 0.0 to 3.0, provided that when p+q=1 then t=1.5; when p+q=2 then t=1; or when p+q=3 then t=0.5.

In yet another embodiment, the hybrid material of the invention comprises a hybrid core of formula III:

$$(SiO_2)_d/[R^2((R^1)_r SiO_t)_m] \quad (III)$$

wherein, $R^1$ is $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

d is 0 to about 30;

r is 0, 1 or 2, provided that when r=0 then t=1.5; when r=1 then t=1; or when r=2, then t=0.5; and m is an integer from 1-20.

In various embodiments, the invention comprises a hybrid core of formulas I and II, wherein R is $C_1$-$C_{18}$ alkoxy, $C_1$-$C_{18}$ alkyl, or $C_1$-$C_{18}$ alkyl. In various embodiments, the invention comprises a hybrid core of formulas I, II and III, wherein $R^1$ is $C_1$-$C_{18}$ alkoxy, $C_1$-$C_{18}$ alkyl, or $C_1$-$C_{18}$ alkyl. In various embodiments, the invention comprises a hybrid core of formulas I and III, wherein $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl.

In yet another embodiment, the hybrid material of the invention comprises a hybrid core of formula IV:

$$(A)_x(B)_y(C)_z \qquad (IV)$$

wherein the order of repeat units A, B, and C may be random, block, or a combination of random and block; A is an organic repeat unit which is covalently bonded to one or more repeat units A or B via an organic bond; B is an organosiloxane repeat unit which is bonded to one or more repeat units B or C via an inorganic siloxane bond and which may be further bonded to one or more repeat units A or B via an organic bond; C is an inorganic repeat unit which is bonded to one or more repeat units B or C via an inorganic bond; x and y are positive numbers, and z is a non negative number, wherein x+y+z=1. In certain embodiments, z=0, then $0.002 \leq x/y \leq 210$, and when z≠0, then $0.0003 \leq y/z \leq 500$ and $0.002 \leq x/(y+z) \leq 210$.

In a related embodiment, the hybrid material of the invention may comprise a hybrid core of formula V:

$$(A)_x(B)_y(B^*)_{y^*}(C)_z \qquad (V)$$

wherein the order of repeat units A, B, B*, and C may be random, block, or a combination of random and block; A is an organic repeat unit which is covalently bonded to one or more repeat units A or B via an organic bond; B is an organosiloxane repeat unit which is bonded to one or more repeat units B or B* or C via an inorganic siloxane bond and which may be further bonded to one or more repeat units A or B via an organic bond, B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization; C is an inorganic repeat unit which is bonded to one or more repeat units B or B* or C via an inorganic bond; x and y are positive numbers and z is a non negative number, wherein x+y+z=1. In certain embodiments, when z=0, then $0.002 \leq x/(y+y^*) \leq 210$, and when z≠0, then $0.0003 \leq (y+y^*)/z \leq 500$ and $0.002 \leq x/(y+y^*+z) \leq 210$.

Repeat unit A may be derived from a variety of organic monomer reagents possessing one or more polymerizable moieties, capable of undergoing polymerization, e.g., a free radical-mediated polymerization. A monomers may be oligomerized or polymerized by a number of processes and mechanisms including, but not limited to, chain addition and step condensation processes, radical, anionic, cationic, ring-opening, group transfer, metathesis, and photochemical mechanisms.

A may also be one of the following:

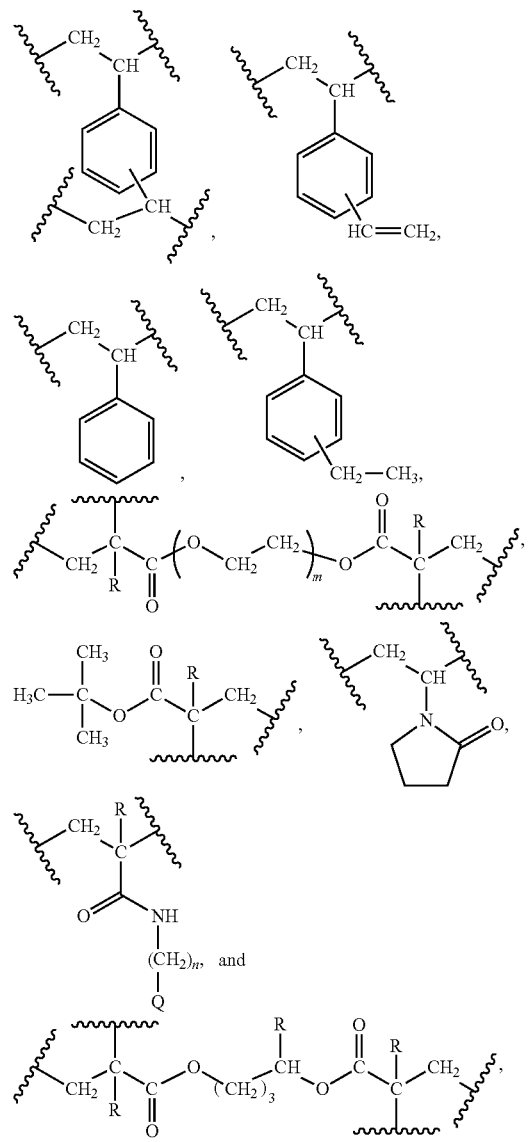

wherein each R is independently H or a $C_1$-$C_{10}$ alkyl group (e.g., methyl, ethyl, or propyl); m is an integer of from 1 to about 20; n is an integer of from 0 to 10; and Q is hydrogen, $N(C_{1-6}alkyl)_3$, $N(C_{1-6}alkyl)_2(C_{1-6}alkyl$-$SO_3)$, or $C(C_{1-6}hydroxyalkyl)_3$.

Repeat unit B may be derived from several mixed organic-inorganic monomer reagents possessing two or more different polymerizable moieties, capable of undergoing polymerization, e.g., a free radical-mediated (organic) and hydrolytic (inorganic) polymerization. B monomers may be oligomerized or polymerized by a number of processes and mechanisms including, but not limited to, chain addition and step condensation processes, radical, anionic, cationic, ring-opening, group transfer, metathesis, and photochemical mechanisms.

B may also be one of the following:

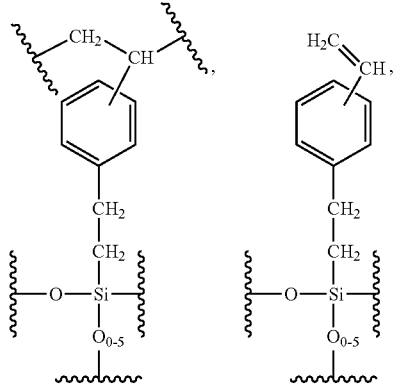

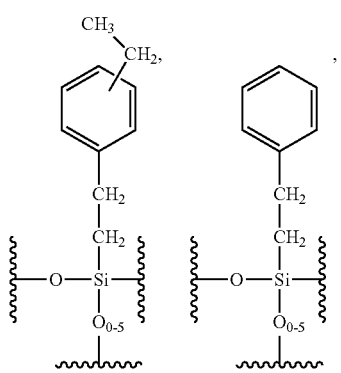

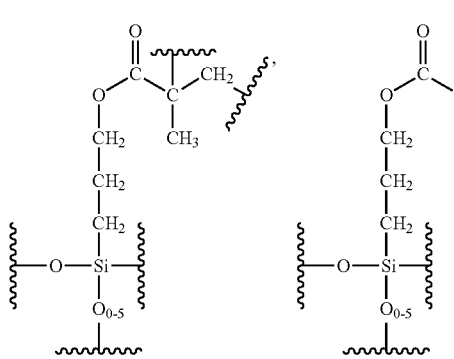

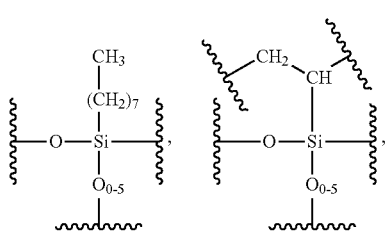

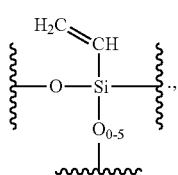

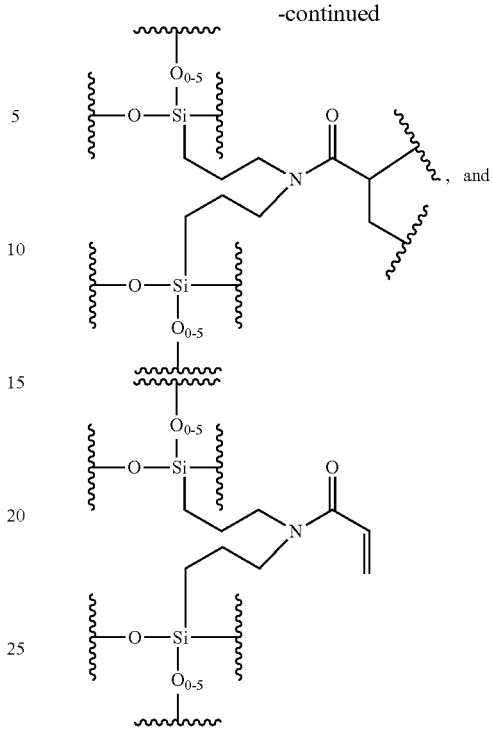

Repeat unit C may be —$SiO_2$— and may be derived from an alkoxysilane, such as tetraethoxysilane (TEOS) or tetramethoxysilane (TMOS).

In one embodiment, A is a substituted ethylene group, B is a oxysilyl-substituted alkyl group, and C is a oxysilyl group, for example the following:

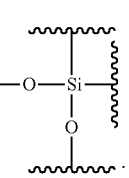

A specific embodiment of a porous hybrid core of formula IV is:

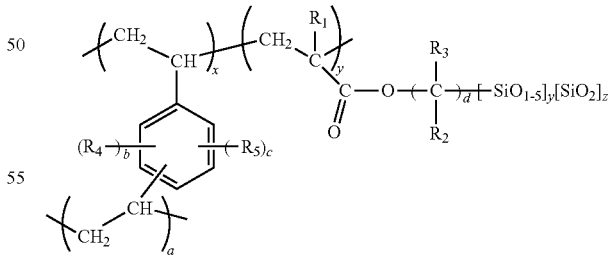

wherein $R_1$ is H, F, Cl, Br, I, lower alkyl (e.g., $CH_3$ or $CH_2CH_3$);

$R_2$ and $R_3$ are each independently H, F, Cl, Br, I, alkane, substituted alkane, alkene, substituted alkene, aryl, substituted aryl, cyano, ether, substituted ether, embedded polar group;

$R_4$ and $R_5$ are each independently H, F, Cl, Br, I, alkane, substituted alkane, alkene, substituted alkene, aryl, substituted aryl, ether, substituted ether, cyano, amino, substituted amino, diol, nitro, sulfonic acid, cation or anion exchange groups, 0≤a≤2x, 0≤b≤4, and 0≤c≤4, provided that b+c≤4 when a=1;

1≤d≤20, 0.0003≤y/z≤500 and 0.002≤x/(y+z)≤210.

In still another embodiment, the hybrid cores are spherical. In a further embodiment, the spherical core has a non-crystalline or amorphous molecular ordering. In a further embodiment, the spherical core has a non-periodic pore structure.

In another embodiment, the hybrid core has an average size of about 0.1 µm to about 300 µm. In a further embodiment, the hybrid core has an average size of about 0.1 µm to about 30 µm. In a further embodiment, the hybrid core has an average size of about 0.5 µm to about 30 µm. In a further embodiment, the hybrid core has an average size of about 0.9 µm to about 10 µm. In a further embodiment, the hybrid core has an average size of about 1.0 µm to about 3.0 µm.

In certain embodiments, the hybrid core material of the invention a substantially narrow particle size distribution. In certain other embodiments, the 90/10 ratio of particle sizes is from 1.00-1.55. In specific embodiments, the 90/10 ratio of particle sizes is from 1.00-1.10 or from 1.05-1.10. In other specific embodiments, the 90/10 ratio of particle sizes is from 1.10-1.55; from 1.10-1.50; or from 1.30-1.45.

In certain embodiments, the hybrid core is hydrolytically stable at a pH of about 1 to about 14. In one embodiment, the hybrid core is hydrolytically stable at a pH of about 10 to about 14. In another embodiment, the hybrid core is hydrolytically stable at a pH of about 1 to about 5.

In one embodiment, the invention comprises an inorganic/organic hybrid core as described herein, wherein the core is formed by hydrolytic condensation of one or more monomers selected from the group consisting of:

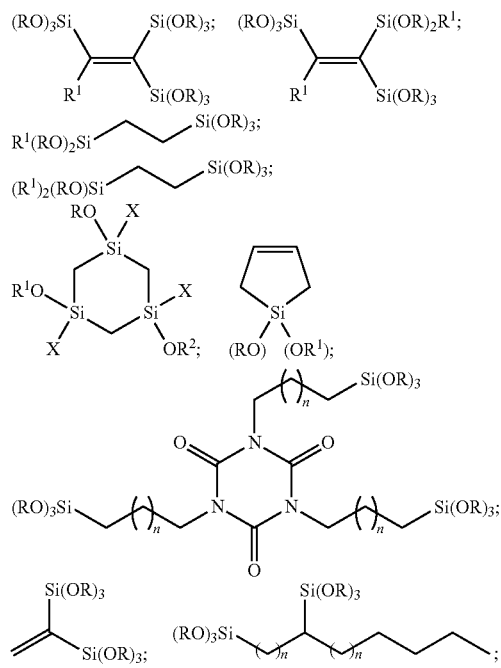

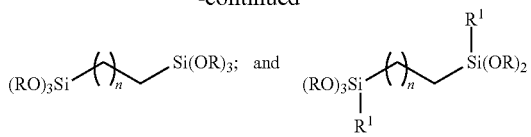

wherein R, $R^1$ and $R^2$ are as defined previously; X is $C_1$-$C_{18}$ alkoxy or $C_1$-$C_{18}$ alkyl; and n is 1-8.

In a further embodiment, the monomer is 1,2-bis(triethoxysilyl)ethane:

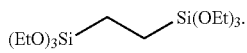

In another further embodiment, the monomer is 1,2-bis(methyldiethoxy silyl)ethane:

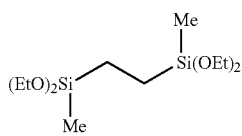

or 1,8-bis(triethoxysilyl)octane:

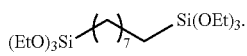

In certain embodiments, the momomer is phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane diethyldiethoxysilane; diethyldimethoxysilane 1,4-bis(triethoxysilyl)benzene; 1,4-bis(trimethoxysilyl) benzene; 1,3-bis(triethoxysilyl)benzene; 1,3-bis(trimethoxysilyl)benzene; 1,8-bis(triethoxysilyl)octane; 1,8-bis(trimethoxysilyl)octane; 1,2-bis(trimethoxysilyl)ethane; 1,2-bis(triethoxysilyl)ethane; 1,2-bis(methyldiethoxysilyl) ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis (triethoxysilyl)ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; 1,3-bis(trimethoxysilylethyl)benzene; hexyltriethoxysilane; hexyltrimethoxysilane; chloropropyltriethoxysilane; chloropropyltrimethoxysilane; octadecyltrimethoxysilane; octadecyltriethoxysilane; octyltrimethoxysilane; octyltriethoxysilane; 3,3,3-trifluoropropyltrimethoxysilane; 3,3,3-trifluoropropyltriethoxysilane; 3-cyanobutyltriethoxysilane; and 3-cyanobutyltrimethoxysilane alone or in a mixture with tetraethoxysilane or tetramethoxysilane.

In another embodiment, the monomer is a substituted benzene, including (but not limited to) 1,4-bis(triethoxysilyl)benzene, 1,4-bis(trimethoxysilyl)benzene, 1,3-bis(triethoxysilyl)benzene, 1,3-bis(trimethoxysilyl)benzene, 1,3,5-tris(triethoxysilyl)benzene, 1,3,5-tris(trimethoxysilyl) benzene, and bis(4-triethoxysilylphenyl)diethoxysilane.

In other embodiment, the porous inorganic/organic hybrid core as described herein has been surface modified with a surface modifier having the formula $Z_a(R')_b Si—R''$, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R" is a functionalizing group.

In another embodiment, the hybrid cores have been surface modified by coating with a polymer.

In certain embodiments, R' is selected from the group consisting of methyl, ethyl, propyl, isopropyl, butyl, t-butyl, sec-butyl, pentyl, isopentyl, hexyl and cyclohexyl. In other embodiments, R is selected from the group consisting of alkyl, alkenyl, alkynyl, aryl, cyano, amino, diol, nitro, ester, a cation or anion exchange group, an alkyl or aryl group containing an embedded polar functionality and a chiral moiety.

In one embodiment, R" is a $C_1$-$C_{30}$ alkyl group. In a further embodiment, R" comprises a chiral moiety. In another further embodiment, R" is a $C_1$-$C_{20}$ alkyl group.

In certain embodiments, the surface modifier is selected from the group consisting of octyltrichlorosilane, octadecyltrichlorosilane, octyldimethylchlorosilane and octadecyldimethylchlorosilane. Advantageously, the surface modifier is selected from the group consisting of octyltrichlorosilane and octadecyltrichlorosilane.

In another embodiment, the hybrid core has been surface modified by a combination of organic group and silanol group modification.

In still another embodiment, the hybrid core has been surface modified by a combination of organic group modification and coating with a polymer. In a further embodiment, the organic group comprises a chiral moiety.

In yet another embodiment, the hybrid core has been surface modified by a combination of silanol group modification and coating with a polymer.

In other embodiments, the hybrid core has been surface modified via formation of an organic covalent bond between the particle's organic group and the modifying reagent.

In still other embodiments, the hybrid core has been surface modified by a combination of organic group modification, silanol group modification and coating with a polymer.

In another embodiment, the hybrid core has been surface modified by silanol group modification.

In certain embodiments, the porous inorganic/organic hybrid core is a monolith.

In another aspect, the invention provides materials as described herein wherein the hybrid core further comprises a nanoparticle or a mixture of more than one nanoparticles dispersed within the hybrid core.

In certain embodiments, the nanoparticle is present in <20% by weight of the nanocomposite, <10% by weight of the nanocomposite, or <5% by weight of the nanocomposite.

In other embodiments, the nanoparticle is crystalline or amorphous and may be silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, oxides thereof, or a nitride thereof. In particular embodiments, the nanoparticle is a substance which comprises one or more moieties selected from the group consisting of nano-diamonds, silicon carbide, titanium dioxide, cubic-boronitride. In certain embodiments the nanoparticle comprises a composite material, a magnetic material, a high thermal conductivity additive or a nanoparticle having a layered structure of additives.

In other embodiments, the nanoparticles may be less than or equal to 200 nm in diameter, less than or equal to 100 nm in diameter, less than or equal to 50 nm in diameter, or less than or equal to 20 nm in diameter.

Non-Hybrid Core Materials

In certain embodiments, the substantially nonporous core material is silica; silica coated with an inorganic/organic hybrid surrounding material; a magnetic core material; a magnetic core material coated with silica; a high thermal conductivity core material; a high thermal conductivity core material coated with silica; a composite material; an inorganic/organic hybrid surrounding material; a composite material coated with silica; a magnetic core material coated with an inorganic/organic hybrid surrounding material; or a high thermal conductivity core material coated with an inorganic/organic hybrid surrounding material.

In certain embodiments, the core materials are composite materials. Composite materials describe the engineered materials of the invention composed of one or more components described herein in combination with dispersed nanoparticles, wherein each component/nanoparticle remains separate and distinct on a macroscopic level within the finished structure. The composite material of the present invention is independent of form, and may be monolithic or particulate in nature. Moreover, the short-hand convention used herein to describe a composite material containing a dispersed nanoparticle, $Np/(A)_w(B)_x(C)_y$, may be understood as follows: the symbolic representation to the left of the slash mark represents the dispersed nanoparticle, and the symbolic representations to the right of the slash mark represent the components that comprise the material that the nanoparticle (noted on the left of the slash mark) is dispersed within. In certain embodiments, the composite materials of the present invention may be nanocomposites, which are known to include, at least, for example, nano/nano-type, intra-type, inter-type, and intra/inter-type. (Nanocomposites Science and Technology, edited by P. M. Ajayan, L. S. Schadler, P. V. Braun, Wiley-VCH (Weinheim, Germany), 2003) The term "nanoparticle" is a microscopic particle/grain or microscopic member of a powder/nanopowder with at least one dimension less than about 100 nm, e.g., a diameter or particle thickness of less than about 100 nm (0.1 μm), which may be crystalline or noncrystalline.

Nanoparticles have properties different from, and often superior to those of conventional bulk materials including, for example, greater strength, hardness, ductility, sinterability, and greater reactivity among others. Considerable scientific study continues to be devoted to determining the properties of nanomaterials, small amounts of which have been synthesized (mainly as nano-size powders) by a number of processes including colloidal precipitation, mechanical grinding, and gas-phase nucleation and growth. Extensive reviews have documented recent developments in nano-phase materials, and are incorporated herein by reference thereto: Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197. In certain embodiments, the nanoparticles comprise oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. In certain embodiments, the nanoparticles of the present invention are selected from diamonds, zirconium oxide (amorphous, monoclinic, tetragonal and cubic forms), titanium oxide (amorphous, anatase, brookite and rutile forms), aluminum (amorphous, alpha, and gamma forms), and boronitride (cubic form). In particular embodiments, the nanoparticles of the present invention are selected from nano-diamonds, silicon carbide, titanium dioxide (anatase form), cubic-boronitride, and any combination thereof. Moreover, in particular embodiments, the nanoparticles may be crystalline or amorphous. In particular embodiments, the nanoparticles are less than or equal to 100 μm in diameter, e.g., less than or equal to 50 μm in diameter, e.g., less than or equal to 20 μm in diameter.

Moreover, it should be understood that the nanoparticles that are characterized as dispersed within the composites of the invention are intended to describe exogenously added nanoparticles. This is in contrast to nanoparticles, or formations containing significant similarity with putative nanoparticles, that are capable of formation in situ, wherein, for example, macromolecular structures, such as particles, may comprise an aggregation of these endogenously created.

Nanoparticles are of great scientific interest as they are effectively a bridge between bulk materials and atomic or molecular structures. A bulk material should have constant physical properties regardless of its size, but at the nanoscale this is often not the case. Size-dependent properties are observed such as quantum confinement in semiconductor particles, surface plasmon resonance in some metal particles and superparamagnetism in magnetic materials.

In certain embodiments, the composite materials include magnetic materials, materials having a high thermal conductivity, or mixtures thereof. Similarly, in certain embodiments, the cores themselves are magnetic materials, materials having a high thermal conductivity or mixtures thereof.

Materials having a high thermal conductivity, high thermal conductivity cores or a high thermal conductivity additives are defined as materials having a thermal conductivity greater than 20 W/(m·K). In various embodiments the additive has a thermal conductivity ranges from: about 20 W/(m·K) to not more than 3500 W/(m·K); about 100 W/(m·K) to not more than 3300 W/(m·K); and 400 W/(m·K) to not more than 3000 W/(m·K). This high thermal conductivity additive can be a 0.1-8 μm core particle, nanoparticle additives, or a metal oxide precursor. In various embodiments the high thermal conductivity additive includes (but is not limited to) aluminum, copper, gold, and diamonds.

A high thermal diffusivity additive is defined as an additive used in a superficially porous particle having a thermal diffusivity greater than 20 mm$^2$/s. In various embodiments the additive has a thermal diffusivity ranges from: about 20 mm$^2$/s to not more than 2000 mm$^2$/s; about 100 mm$^2$/s to not more than 1600 mm$^2$/s; and 150 mm$^2$/s to not more than 1400 mm$^2$/s. This high thermal conductivity additive can be a 0.1-8 μm core particle, nanoparticle additives, or a metal oxide precursor. In various embodiments the high thermal conductivity additive includes (but is not limited to) aluminum, copper, gold, and diamonds.

A magnetic material include materials that have a mass magnetization (σ, magnetic moment per unit mass, magnetic saturation or saturation magnetization) at room temperature greater than 15 emu/g (A m$^2$/kg). This includes ferromagnetic and ferrimagnetic materials, including (but is not limited to): magnetite (ferrous ferric oxide); maghemite; yttrium iron garnet, cobalt, $CrO_2$; and ferrites containing iron and Al, Mg, Ni, Zn, Mn or Co). Magnetic core particles do not include other oxides of iron, including hematite and goethite, that have mass magnetization values less than 10 emu/g. Hematite (0.4 emu/g) is considered antiferromagnetic at room temperature.

In one embodiment, the cores are spherical. In a further embodiment, the spherical core has a non-crystalline or amorphous molecular ordering. In a further embodiment, the spherical core has a non-periodic pore structure.

In certain embodiments, the core is hydrolytically stable at a pH of about 1 to about 14. In one embodiment, the core is hydrolytically stable at a pH of about 10 to about 14. In another embodiment, the core is hydrolytically stable at a pH of about 1 to about 5.

Porous Shell Layer Material

The materials of the invention have one or more layers of a porous shell material applied to the substantially non-porous core. In certain embodiments, one or more layers of porous shell material are a porous inorganic/organic hybrid material; a porous silica or a porous composite material.

In certain aspects, the materials of the invention have a rough surface. In still other aspects, the materials of the invention have a smooth surface. As used herein, In certain embodiments, each porous layer is independently from 0.02 μm to 5 μm. in thickness as measured perpendicular to the surface of the nonporous core.

In other embodiments, each porous layer is independently from 0.06 μm to 1 μm. in thickness as measured perpendicular to the surface of the nonporous core.

In still other embodiments, each porous layer is independently from 0.20 μm to 0.70 μm. in thickness as measured perpendicular to the surface of the nonporous core.

In certain embodiments, the materials of the invention have between 1 and 15 layers of porous shell material. In other embodiments between 2 and 5 layers of porous shell material. In still others 1 or 2 layers of porous shell materials.

Porous Hybrids

In certain embodiments, the porous hybrid layer material or shell material which may layered onto the hybrid core may be independently derived from condensation of one or more polymeric organofunctional metal precursors, and/or polymeric metal oxide precursors on the surface of the hybrid core, or application of partially condensed polymeric organofunctional metal precursors, a mixture of two or more polymeric organofunctional metal precursors, or a mixture of one or more polymeric organofunctional metal precursors with a polymeric metal oxide precursors on the surface of the hybrid core.

In certain aspects, the inorganic portion of the surrounding material is independently selected from the group consisting of alumina, silica, titania, cerium oxide, or zirconium oxides, and ceramic materials.

Alternatively, the hybrid layer material may independently derived from condensation of one or more organofunctional silanes and/or tetraalkoxysilane on the surface of the hybrid core, or application of partially condensed organofunctional silane, a mixture of two or more organofunctional silanes, or a mixture of one or more organofunctional silanes with a tetraalkoxysilane (i.e., tetraethoxysilane, tetramethoxysilane) on the surface of the hybrid core.

In other aspects, the hybrid layer material may independently comprise from about 0-100 mol % hybrid material. The inorganic portion of the surrounding material may independently be alumina, silica, titanium oxide, cerium oxide, zirconium oxide or ceramic materials or a mixture thereof.

In specific aspects, the inorganic portion of the hybrid layer material may independently be present in an amount ranging from about 0 molar % to not more than about 25 molar %, wherein the pores of the surrounding material are substantially disordered. Similarly, the inorganic portion of the surrounding material may independently be present in an amount ranging from about 25 molar % to not more than about 50 molar %, wherein the pores of the surrounding material are substantially disordered, and wherein the hybrid layer material may or may not independently possesses a chromatographically enhancing pore geometry (CEPG). In certain embodiments, the inorganic portion of the hybrid layer material may independently be present in an amount ranging from about 50 molar % to not more than about 75 molar %, wherein the pores of the hybrid layer material are substantially disordered, and wherein the hybrid layer material independently possesses a chromatographically enhancing pore geometry (CEPG). In still other embodiments, the inorganic portion of the hybrid layer material may independently be present in an amount ranging from about 75 molar % to not more than about 100 molar %, wherein the pores of the hybrid layer material are substantially disordered, and wherein the hybrid layer material may or may not independently possesses a chromatographically enhancing pore geometry (CEPG).

In still other aspects, the inorganic portion of the hybrid layer material may independently be present in an amount ranging from about 0 molar % to not more than about 100 molar %; specifically, 0%-10%, 0%-5%, 0%-4%, 0%-3%, 0%-2%, 0%-1%, 1%-10%, 1%-5%, 1%-4%, 1%-3%, 1%-2%, 5%-100%, 10%-100%, 15%-100%, 20%-100%, 25%-100%, 30%-100%, 35%-100%, 40%-100%, 45%-100%, 55%-100%, 60%-100%, 65%-100%, 70%-100%, 75%-100%, 80%-100%, 81%-100%, 82%-100%, 83%-100%, 84%-100%, 85%-100%, 86%-100%, 87%-100%, 88%-100%, 89%-100%, 90%-100%, 91%-100%, 92%-100%, 93%-100%, 94%-100%, 95%-100%, 96%-100%, 97%-100%, 98%-100%, or 99%-100%.

In some aspects, the hybrid layer material may comprise a material of formula I:

  (I)

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

p and q are each independently 0.0 to 3.0;

t is 0.5, 1.0, or 1.5;

d is 0 to about 30;

m is an integer from 1-20; wherein R, $R^1$ and $R^2$ are optionally substituted;

provided that:

(1) when $R^2$ is absent, m=1 and

when 0<p+q≤2; and (2) when $R^2$ is present, m=2-20 and $$t = \frac{(3-(p+q))}{2},$$

when p+q≤2.

In other aspects, the hybrid layer material may comprise a material of formula II:

  (II);

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 30;

p and q are each independently 0.0 to 3.0, provided that when p+q=1 then t=1.5; when p+q=2 then t=1; or when p+q=3 then t=0.5.

In still other aspects, the hybrid layer material may comprise a material of formula III:

  (III)

wherein, $R^1$ is $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

d is 0 to about 30;

r is 0, 1 or 2, provided that when r=0 then t=1.5; or when r=1 then t=1; or when r=2 then t=0.5; and m is an integer from 1-20.

In yet aspects, the hybrid layer material may comprise a material of formula IV:

$$(A)x(B)y(C)z \qquad (IV),$$

wherein the order of repeat units A, B, and C may be random, block, or a combination of random and block;

A is an organic repeat unit which is covalently bonded to one or more repeat units A or B via an organic bond;

B is an organosiloxane repeat unit which is bonded to one or more repeat units B or C via an inorganic siloxane bond and which may be further bonded to one or more repeat units A or B via an organic bond;

C is an inorganic repeat unit which is bonded to one or more repeat units B or C via an inorganic bond; and x and y are positive numbers and z is a non negative number, wherein x+y+z=1. In certain embodiments, when z=0, then 0.002≤x/y≤210, and when z≠0, then 0.0003≤y/z≤500 and 0.002≤x/(y+z)≤210.

In still yet other aspects, the hybrid layer material may comprise a material of formula V:

$$(A)x(B)y(B^*)y^*(C)z \qquad (V),$$

wherein the order of repeat units A, B, B*, and C may be random, block, or a combination of random and block;

A is an organic repeat unit which is covalently bonded to one or more repeat units A or B via an organic bond;

B is an organosiloxane repeat units which is bonded to one or more repeat units B or B* or C via an inorganic siloxane bond and which may be further bonded to one or more repeat units A or B via an organic bond;

B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization;

C is an inorganic repeat unit which is bonded to one or more repeat units B or B* or C via an inorganic bond; and x and y are positive numbers and z is a non negative number, wherein $x+y+y^*+z=1$. In certain embodiments, when $z=0$, then $0.002 \leq x/(y+y^*) \leq 210$, and when $z \neq 0$, then $0.0003 \leq (y+y^*)/z \leq 500$ and $0.002 \leq x/(y+y^*+z) \leq 210$.

In certain aspects, $R^2$ in the formulas presented above may be present or absent.

In certain aspects, $R^1$ in the formulas presented above is $C_1$-$C_{18}$ alkyl group substituted by hydroxyl. In still other aspects, $R^1$ in the formulas presented above is hydroxypropyl. In still other aspects, the hydroxy substituted alkyl group is further functionalized by an isocyanate. In yet other aspects, the isocyanate is octadecyl isocyanate, dodecyl isocyanate, pentafluorophenyl isocyanate, 4-cyanophenyl isocyanate, 3-cyanophenyl isocyanate, 2-cyanophenyl isocyanate, phenyl isocyate, benzyl isocyanate, phenethyl isocyanate or diphenylethyl isocyante.

In certain embodiments, the organosiloxane is, without limitation, phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane diethyldiethoxysilane; diethyldimethoxysilane 1,4-bis(triethoxysilyl)benzene; 1,4-bis(trimethoxysilyl)benzene; 1,3-bis(triethoxysilyl)benzene; 1,3-bis(trimethoxysilyl)benzene; 1,8-bis(triethoxysilyl)octane; 1,8-bis(trimethoxysilyl)octane; 1,2-bis(trimethoxysilyl)ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl)ethene; 1,2-bis(trimethoxysilyl)ethene; 1,1-bis(triethoxysilyl)ethane; 1,1-bis(trimethoxysilyl)ethane; 1,4-bis(triethoxysilylethyl) benzene; 1,4-bis(trimethoxysilylethyl)benzene; 1,3-bis(triethoxysilylethyl)benzene; 1,3-bis(trimethoxysilylethyl)benzene; hexyltriethoxysilane; hexyltrimethoxysilane; chloropropyltriethoxysilane; chloropropyltrimethoxysilane; octadecyltrimethoxysilane; octadecyltriethoxysilane; octyltrimethoxysilane; octyltriethoxysilane; 3,3,3-trifluoropropyltrimethoxysilane; 3,3,3-trifluoropropyltriethoxysilane; 3-cyanobutyltriethoxysilane; and 3-cyanobutyltrimethoxysilane alone or in a mixture with tetraethoxysilane or tetramethoxysilane.

In another embodiment, the organosiloxane is, without limitation, a substituted benzene, including (but not limited to) 1,4-bis(triethoxysilyl)benzene, 1,4-bis(trimethoxysilyl)benzene, 1,3-bis(triethoxysilyl)benzene, 1,3-bis(trimethoxysilyl)benzene, 1,3,5-tris(triethoxysilyl)benzene, 1,3,5-tris(trimethoxysilyl)benzene, and bis(4-triethoxysilylphenyl) diethoxysilane.

In another aspect, the invention provides materials as described herein wherein the hybrid layer material further comprises a nanoparticle or a mixture of more than one nanoparticles dispersed within the hybrid core.

In certain embodiments, the nanoparticle is present in <20% by weight of the nanocomposite, <10% by weight of the nanocomposite, or <5% by weight of the nanocomposite.

In other embodiments, the nanoparticle is crystalline or amorphous and may be silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, oxides thereof, or a nitride thereof. In particular embodiments, the nanoparticle is a substance which comprises one or more moieties selected from the group consisting of nano-diamonds, silicon carbide, titanium dioxide, cubic-boronitride.

In other embodiments, the nanoparticles may be less than or equal to 200 μm in diameter, less than or equal to 100 μm in diameter, less than or equal to 50 μm in diameter, or less than or equal to 20 μm in diameter.

Porous Silica

In certain embodiments, the porous shell layer materials are porous silica. In other embodiments, the porous silica comprises 1.03-1.8 μm particles, 1.35-1.7 μm or, 1.4-1.6 μm. In other embodiments, the porous silica comprises a silica porous layer on silica core. Alternatively, thin hybrid surface layer on a silica porous layer on a silica core may be used. In each instance, the pore volume is generally between 0.15-0.40 cm3/g, between 0.2-0.35 cm3/g, or between 0.22-0.33 cm3/g. Similarly, pore diameters are generally between 40-500 Angstroms, between 50-300 Angstroms, or between 70-160 Angstroms.

In embodiments having a hybrid coating, the coating may be $(O_{1.5}Si_xCH_2CH_2SiO_{1.5})1-x(SiO_2)x$ wherein x is 0-0.9, or 0-0.8. X is $(CH_2)_n$; $(CH_2)_nC_6H_4(CH_2)_n$; or $(CH_2)_nY(CH_2)_n$ wherein n is 0-30, 0-8, or 0-2 and Y is an embedded polar group such as a ethylene glycol, O, NH, N(alkyl), N(methyl), polyethylene glycol, urea, amide, ester, carbamate, or carbonate.

Porous Composites.

In certain embodiments, the porous shell layer materials are composite materials. Composite materials describe the engineered materials of the invention composed of one or more components described herein in combination with dispersed nanoparticles, wherein each component/nanoparticle remains separate and distinct on a macroscopic level within the finished structure. The composite material of the present invention is independent of form, and may be monolithic or particulate in nature. Moreover, the short-hand convention used herein to describe a composite material containing a dispersed nanoparticle, $Np/(A)_w(B)_x(C)_y$, may be understood as follows: the symbolic representation to the left of the slash mark represents the dispersed nanoparticle, and the symbolic representations to the right of the slash mark represent the components that comprise the material that the nanoparticle (noted on the left of the slash mark) is dispersed within. In certain embodiments, the composite materials of the present invention may be nanocomposites, which are known to include, at least, for example, nano/nano-type, intra-type, inter-type, and intra/inter-type. (Nanocomposites Science and Technology, edited by P. M. Ajayan, L. S. Schadler, P. V. Braun, Wiley-VCH (Weinheim, Germany), 2003) The term "nanoparticle" is a microscopic particle/grain or microscopic member of a powder/nanopowder with at least one dimension less than about 100 nm, e.g., a diameter or particle thickness of less than about 100 nm (0.1 μm), which may be crystalline or noncrystalline.

Nanoparticles have properties different from, and often superior to those of conventional bulk materials including, for example, greater strength, hardness, ductility, sinterability, and greater reactivity among others. Considerable scientific study continues to be devoted to determining the properties of nanomaterials, small amounts of which have been synthesized (mainly as nano-size powders) by a number of processes including colloidal precipitation, mechanical grinding, and gas-phase nucleation and growth. Extensive reviews have documented recent developments in nano-phase materials, and are incorporated herein by reference thereto: Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197. In certain embodiments, the nanoparticles comprise oxides or nitrides of the following:

silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. In certain embodiments, the nanoparticles of the present invention are selected from diamonds, zirconium oxide (amorphous, monoclinic, tetragonal and cubic forms), titanium oxide (amorphous, anatase, brookite and rutile forms), aluminum (amorphous, alpha, and gamma forms), and boronitride (cubic form). In particular embodiments, the nanoparticles of the present invention are selected from nano-diamonds, silicon carbide, titanium dioxide (anatase form), cubic-boronitride, and any combination thereof. Moreover, in particular embodiments, the nanoparticles may be crystalline or amorphous. In particular embodiments, the nanoparticles are less than or equal to 100 µm in diameter, e.g., less than or equal to 50 µm in diameter, e.g., less than or equal to 20 µm in diameter.

Moreover, it should be understood that the nanoparticles that are characterized as dispersed within the composites of the invention are intended to describe exogenously added nanoparticles. This is in contrast to nanoparticles, or formations containing significant similarity with putative nanoparticles, that are capable of formation in situ, wherein, for example, macromolecular structures, such as particles, may comprise an aggregation of these endogenously created.

Nanoparticles are of great scientific interest as they are effectively a bridge between bulk materials and atomic or molecular structures. A bulk material should have constant physical properties regardless of its size, but at the nanoscale this is often not the case. Size-dependent properties are observed such as quantum confinement in semiconductor particles, surface plasmon resonance in some metal particles and superparamagnetism in magnetic materials.

In certain embodiments, the composite materials include magnetic materials, materials having a high thermal conductivity, or mixtures thereof.

Materials having a high thermal conductivity, high thermal conductivity cores or a high thermal conductivity additive is defined as a material, core or additive used in a superficially porous particle having a thermal conductivity greater than 20 W/(m·K). In various embodiments the core or additive has a thermal conductivity ranges from: about 20 W/(m·K) to not more than 3500 W/(m·K); about 100 W/(m·K) to not more than 3300 W/(m·K); and 400 W/(m·K) to not more than 3000 W/(m·K). This high thermal conductivity core or additive can be a 0.1-8 µm core particle, nanoparticle additives, or a metal oxide precursor. In various embodiments the high thermal conductivity core or additive includes (but is not limited to) aluminum, copper, gold, and diamonds.

A high thermal diffusivity additive is defined as an additive used in a superficially porous particle having a thermal diffusivity greater than 20 mm$^2$/s. In various embodiments the additive has a thermal diffusivity ranges from: about 20 mm$^2$/s to not more than 2000 mm$^2$/s; about 100 mm$^2$/s to not more than 1600 mm$^2$/s; and 150 mm$^2$/s to not more than 1400 mm$^2$/s. This high thermal conductivity additive can be a 0.1-8 µm core particle, nanoparticle additives, or a metal oxide precursor. In various embodiments the high thermal conductivity additive includes (but is not limited to) aluminum, copper, gold, and diamonds.

A magnetic material include materials that have a mass magnetization ($\sigma$, magnetic moment per unit mass, magnetic saturation or saturation magnetization) at room temperature greater than 15 emu/g (A m$^2$/kg). This includes ferromagnetic and ferrimagnetic materials, including (but is not limited to): magnetite (ferrous ferric oxide); maghemite; yttrium iron garnet, cobalt, $CrO_2$; and ferrites containing iron and Al, Mg, Ni, Zn, Mn or Co). Magnetic core particles do not include other oxides of iron, including hematite and goethite, that have mass magnetization values less than 10 emu/g. Hematite (0.4 emu/g) is considered antiferromagnetic at room temperature.

Gradient Materials

In certain embodiments, the superficially porous materials of the invention utilize core materials having an increased hybrid content near the surface of the core.

In other embodiments, the superficially porous material of the invention utilize core materials having a decreased hybrid content near the surface of the core.

In such cases, such increase or decrease generally occurs within 1-200 nm of the surface of the core; alternatively within 5-60 nm of the surface of the core.

Similarly, in certain embodiments, the superficially porous materials of the invention include superficially porous materials having an increased hybrid content near the surface of the material. In other embodiments, the superficially porous material of the invention include superficially porous materials having a decreased hybrid content near the surface of the core.

In such cases, such increase or decrease generally occurs within 1-200 nm of the surface of the superficially porous material; alternatively within 5-60 nm of the surface of the superficially porous material.

In certain embodiments, the superficially porous materials of the invention utilize core materials having an increased or decreased average pore diameter near the surface of the core.

In such embodiments, such increase or decrease generally occurs within 1-200 nm of the surface of the core; alternatively within 5-60 nm of the surface of the core.

In particular embodiments, the average pore diameter near the center of the core may be in the range of between 40-300 Angstroms, between 50-160 Angstroms, or between 70-100 Angstroms; whereas the pore diameter near the surface of the core may be in the range of between 70-500 Angstroms, between 100-300 Angstroms, or between 100-160 Angstroms.

In other embodiments, the average pore diameter near the surface of the core may be in the range of between 40-300 Angstroms, between 50-160 Angstroms, or between 70-100 Angstroms; whereas the pore diameter near the center of the core may be in the range of between 70-500 Angstroms, between 100-300 Angstroms, or between 100-160 Angstroms.

Similarly, in certain embodiments, the superficially porous materials of the invention include superficially porous materials having an increased or decreased average pore diameter near the surface of the material.

In such cases, such increase or decrease generally occurs within 1-200 nm of the surface of the superficially porous material; alternatively within 5-60 nm of the surface of the superficially porous material.

In particular embodiments, the average pore diameter near the center of the superficially porous material may be in the range of between 40-300 Angstroms, between 50-160 Angstroms, or between 70-100 Angstroms; whereas the pore diameter near the surface of the core may be in the range of between 70-500 Angstroms, between 100-300 Angstroms, or between 100-160 Angstroms.

In other embodiments, the average pore diameter near the surface of the superficially porous material may be in the range of between 40-300 Angstroms, between 50-160 Angstroms, or between 70-100 Angstroms; whereas the pore diameter near the center of the core may be in the range of between 70-500 Angstroms, between 100-300 Angstroms, or between 100-160 Angstroms.

In certain embodiments, the superficially porous materials of the invention utilize core materials having an increased or decreased average pore volume near the surface of the core.

In such cases, such increase or decrease generally occurs within 1-200 nm of the surface of the core; alternatively within 5-60 nm of the surface of the core.

Similarly, in certain embodiments, the superficially porous materials of the invention include superficially porous materials having an increased or decreased average pore diameter near the surface of the material.

In such cases, such increase or decrease generally occurs within 1-200 nm of the surface of the superficially porous material; alternatively within 5-60 nm of the surface of the superficially porous material.

In certain embodiments, the gradient materials of the invention or materials having gradient cores or gradient materials, which are particulate, The superficially porous materials (which are particles) have an average particle size of the material is between 0.8-3.0 µm. Specifically, the average particle size of the material may be between 1.1-2.9 µm or between 1.3-2.7 µm.

Core and Material Morphology

In certain embodiments, the superficially porous material of the invention has specific core morphology. In certain embodiments, such core morphology is produced by using cores having the defined shape. In certain other embodiments, the core morphology refers to the specific defined shape of the product material of the invention.

In certain embodiments, the cores or the product material has a highly spherical, rod shaped, bent-rod shaped, toroid shaped or dumbbell shaped morphology.

In certain other embodiments, the cores or the product material has a mixture of highly spherical, rod shaped, bent-rod shaped, toroid shaped or dumbbell shaped morphologies.

In certain other embodiments, the cores or the product material may have a mixture of different sizes of the same shape morphology.

In certain embodiments, the sols utilized in the production of the superficially porous material of the invention have specific sol morphologies.

In certain embodiments, the sols have a highly spherical, rod shaped, bent-rod shaped, toroid shaped or dumbbell shaped morphology.

In certain other embodiments, the sols have a mixture of highly spherical, rod shaped, bent-rod shaped, toroid shaped or dumbbell shaped morphologies.

In certain other embodiments, the sols may have a mixture of different sizes of the same shape morphology.

Core and Material Properties.

The superficially porous material of the invention have significantly higher thermal conductivity than fully porous silica particles of the same size. In certain embodiments, the superficially porous material of the invention have significantly higher thermal conductivity than superficially porous silica particles of the same size. Determination of particle thermal conductivity can be made by the method of Gritti and Guiochon [J. Chromatogr. A, 2010, 1217, 5137) taking into account differences in bulk material properties, pore volume, surface modification type and coverage.

The superficially porous material of the invention have significantly improved chemical stability when exposed to high pH mobile phases nonbonded, fully porous silica particles of the same size. In certain embodiments, the superficially porous material of the invention have significantly improved chemical stability when exposed to high pH mobile phases nonbonded, superficially porous silica particles of the same size.

The superficially porous material of the invention are capable of forming a packed beds with improved permeability as compared to fully porous silica particles of the same size. In certain embodiments, the superficially porous material of the invention are capable of forming a packed beds with improved permeability as compared to superficially porous silica particles of the same size. Improved permeability for a give particle size is observed as a decrease in column backpressure. Determination of permeability of packed beds can be made by inverse size exclusion chromatography.

The superficially porous materials (which are particles) have an average particle size of the material is between 0.8-3.0 µm. Specifically, the average particle size of the material may be between 1.1-2.9 µm or between 1.3-2.7 µm.

The superficially porous materials have pores which have an average diameter of about 25-600 Å; about 60-350 Å; about 80-300 Å; or about 90-150 Å.

The superficially porous materials have an average pore volume of about 0.11-0.50 cm$^3$/g; about 0.09-0.45 cm$^3$/g; or about 0.17-0.30 cm$^3$/g.

The superficially porous materials have a pore surface area between about 10 m$^2$/g and 400 m$^2$/g.

USP Tailing/Symmetry Factor

The superficially porous materials of the invention have been found to have superior effects on the chromatographic tailing factor (also known as the symmetry factor).

According to United States Pharmacopeia and National Formulary (USP) Chapter 621 The tailing factor of a peak is calculated by:

$$A_s = W_{0.05}/2f$$

where $W_{0.05}$ is the width of the peak at 5% height and f is the distance from the peak maximum to the leading edge of the peak, the distance being measured at a point 5% of the peak height from the baseline.

Thus, in certain embodiments, the superficially porous material of the invention has a tailing factor of about 0.80-2.00. Specifically, the superficially porous material of the invention produce a tailing factor of about bout 0.85-1.60, about 0.90-1.30, about 0.95-1.20, about 0.96-2.00, about 0.97-1.60, about 0.98-1.60, about 0.99-1.20, or about 1.00-1.0

In particular embodiments, the superficially porous materials (which are particles) which produce such a tailing factor also have an average particle size of the material is between 0.8-3.0 µm, between 1.1-2.9 µm, between 1.3-2.7 µm, or between 2.0-3.0 µm.

Surface Modification

The materials of the invention may further be surface modified.

Thus, in one embodiment, the material as described herein may be surface modified with a surface modifier having the formula $Z_a(R')_b Si-R''$, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R'' is a functionalizing group.

In another embodiment, the materials have been surface modified by coating with a polymer.

In certain embodiments, R' is selected from the group consisting of methyl, ethyl, propyl, isopropyl, butyl, t-butyl, sec-butyl, pentyl, isopentyl, hexyl and cyclohexyl. In other embodiments, R' is selected from the group consisting of alkyl, alkenyl, alkynyl, aryl, cyano, amino, diol, nitro, ester, a cation or anion exchange group, an alkyl or aryl group containing an embedded polar functionality and a chiral moiety. In certain embodiments, R' is selected from the group consisting of aromatic, phenylalkyl, fluoroaromatic, phenylhexyl, pentafluorophenylalkyl and chiral moieties.

In one embodiment, R" is a $C_1$-$C_{30}$ alkyl group. In a further embodiment, R" comprises a chiral moiety. In another further embodiment, R" is a $C_1$-$C_{20}$ alkyl group.

In certain embodiments, the surface modifier comprises an embedded polar functionality. In certain embodiments, such embedded polar functionality includes carbonate, amide, urea, ether, thioether, sulfinyl, sulfoxide, sulfonyl, thiourea, thiocarbonate, thiocarbamate, ethylene glycol, heterocyclic, or triazole functionalities. In other embodiments, such embedded polar functionality includes carbamate functionalities such as disclosed in U.S. Pat. No. 5,374,755, and chiral moieties. Such groups include those of the general formula

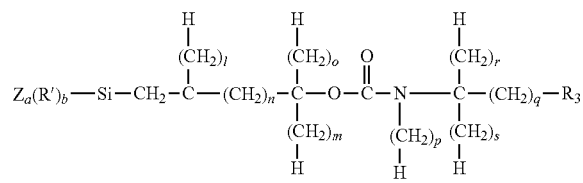

wherein 1, m, o, r and s are 0 or 1, n is 0, 1, 2 or 3 p is 0, 1, 2, 3 or 4 and q is an integer from 0 to 19; $R_3$ is selected from the group consisting of hydrogen, alkyl, cyano and phenyl; and Z, R', a and b are defined as above. Advantageously, the carbamate functionality has the general structure indicated below:

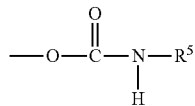

wherein $R^5$ may be, e.g., cyanoalkyl, t-butyl, butyl, octyl, dodecyl, tetradecyl, octadecyl, or benzyl. Advantageously, $R^5$ is octyl, dodecyl, or octadecyl.

In certain embodiments, the surface modifier is selected from the group consisting of phenylhexyltrichlorosilane, pentafluorophenylpropyltrichlorosilane, octyltrichlorosilane, octadecyltrichlorosilane, octyldimethylchlorosilane and octadecyldimethylchlorosilane. In some embodiments, the surface modifier is selected from the group consisting of octyltrichlorosilane and octadecyltrichlorosilane. In other embodiments, the surface modifier is selected from the group consisting of an isocyanate or 1,1'-carbonyldiimidazole (particularly when the hybrid group contains a $(CH_2)_3$ OH group).

In another embodiment, the material has been surface modified by a combination of organic group and silanol group modification.

In still another embodiment, the material has been surface modified by a combination of organic group modification and coating with a polymer. In a further embodiment, the organic group comprises a chiral moiety.

In yet another embodiment, the material has been surface modified by a combination of silanol group modification and coating with a polymer.

In other embodiments, the material has been surface modified via formation of an organic covalent bond between the particle's organic group and the modifying reagent.

In still other embodiments, the material has been surface modified by a combination of organic group modification, silanol group modification and coating with a polymer.

In another embodiment, the material has been surface modified by silanol group modification.

In another embodiments, the material of the invention has been modified as disclosed in PCT International Application Nos. WO 2013/173494 and WO 2013/173501, which are incorporated herein by reference.

In such embodiments, the material of the invention may be modified to have the Formula 1:

$$[X](W)_a(Q)_b(T)_c \qquad \text{Formula 1}$$

wherein:
X is a superficially porous material;
W is absent and/or includes hydrogen and/or includes hydroxyl on the surface of X;
Q is bound directly to X and comprises a first hydrophilic, polar, ionizable, and/or charged functional group that chromatographically interacts with the analyte;
T is bound directly to X and comprises a second hydrophilic, polar, ionizable, and/or charged functional group that chromatographically interacts with the analyte;
a is >0, b is >0, c is >0, wherein b=0 and c>0, or c=0 and b>0 and
Q and T essentially eliminate chromatographic interaction between the analyte, and X and W, thereby minimizing retention variation over time (drift) under chromatographic conditions utilizing low water concentrations.

In certain embodiments of Formula 1, Q is represented by:

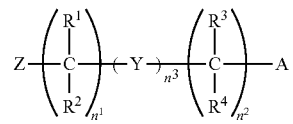

wherein:
$n^1$ an integer from 0-30;
$n^2$ an integer from 0-30;
$n^3$=0 or 1, provided that when $n^3$=0, $n^1$ is not 0;
each occurrence of $R^1$, $R^2$, $R^3$ and $R^4$ independently represents hydrogen, fluoro, methyl, ethyl, n-butyl, t-butyl, i-propyl, lower alkyl, a protected or deprotected alcohol, a zwitterion, or a group Z;
Z represents:
a) a surface attachment group having the formula $(B^1)_x(R^5)_y(R^6)_z$Si— wherein x is an integer from 1-3,
y is an integer from 0-2,
z is an integer from 0-2,
and x+y+z=3,
each occurrence of $R^5$ and $R^6$ independently represents methyl, ethyl, n-butyl, iso-butyl, tert-butyl, iso-propyl, thexyl, substituted or
unsubstituted aryl, cyclic alkyl, branched alkyl, lower alkyl, a protected or deprotected alcohol, or a zwitterion group, and
$B^1$ represents a siloxane bond;
b) an attachment to a surface organofunctional hybrid group through a direct carbon-carbon bond formation or through a heteroatom, ester, ether, thioether, amine, amide, imide, urea, carbonate, carbamate, heterocycle, triazole, or urethane linkage; or c) an adsorbed, surface group that is not covalently attached to the surface of the material;

Y is an embedded polar functionality; and

A represents i.) a hydrophilic terminal group;

ii.) hydrogen, fluoro, methyl, ethyl, n-butyl, t-butyl, propyl, lower alkyl, or group Z; or iii.) a functionalizable group.

In still other such embodiments of Formula 1, T is represented by:

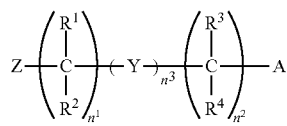

wherein:

$n^1$ an integer from 0-5;

$n^2$ an integer from 0-5;

$n^3$=0 or 1, provided that when $n^3$=0, $n^1$ is not 0;

each occurrence of $R^1$, $R^2$, $R^3$ and $R^4$ independently represents hydrogen, fluoro, methyl, ethyl, n-butyl, t-butyl, i-propyl, lower alkyl, a protected or deprotected alcohol, a zwitterion, or a group Z;

Z represents:

a) a surface attachment group having the formula $(B^1)_x(R^5)_y(R^6)_z Si$— wherein x is an integer from 1-3, y is an integer from 0-2, z is an integer from 0-2, and x+y+z=3 each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwitterion group;

$B^1$ represents a siloxane bond b) an attachment to a surface organofunctional hybrid group through a direct carbon-carbon bond formation or through a heteroatom, ester, ether, thioether, amine, amide, imide, urea, carbonate, carbamate, heterocycle, triazole, or urethane linkage;

c) an adsorbed, surface group that is not covalently attached to the surface of the material; or d) a silyl ether bond Y is an embedded polar functionality; and A represents i.) a hydrophilic or ionizable terminal group; or ii.) hydrogen, fluoro, methyl, ethyl, n-butyl, t-butyl, propyl, lower alkyl, or group Z.

In specific embodiments of Formula 1, T comprises one of the following structures:

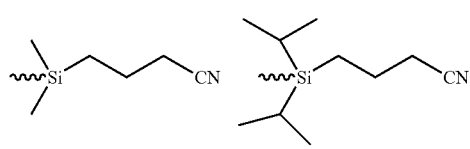

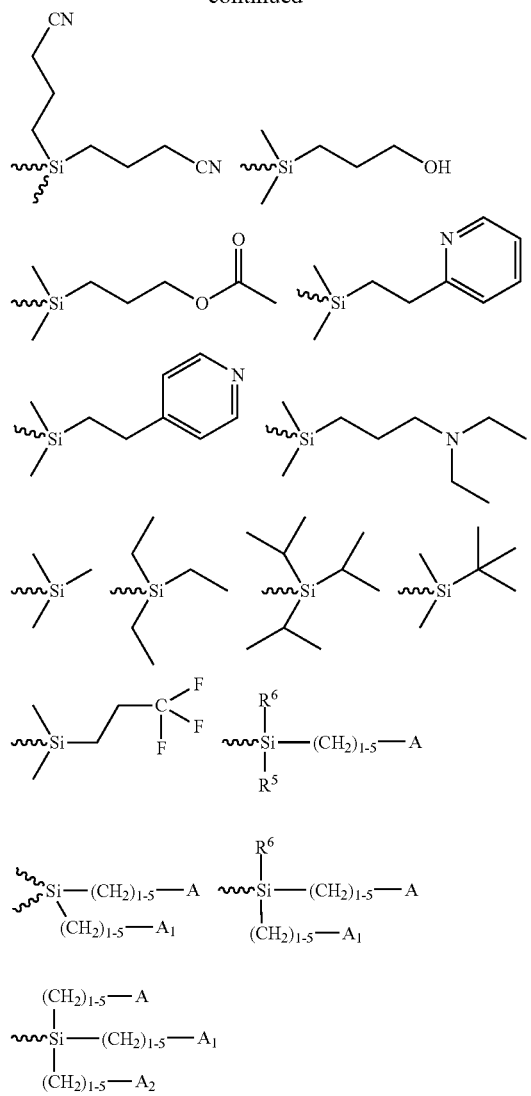

wherein $R^5$ and $R^6$ independently represent methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwitterion group, and wherein A, Ai, and $A_2$ are (1) independently selected from one of the following groups hydrophilic/ionizable groups, including cyano, hydroxyl, fluoro, trifluoro, substituted aryl, ester, ether, amide, carbamate, urea, sulfoxide, nitro, nitroso, boronic acid, boronic ester, urea, thioether, sulfinyl, sulfonyl, thiourea, thiocarbonate, thiocarbamate, ethylene glycol, heterocyclic, methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwitterion group, or triazole functionalities, (2) independently selected from non-polar groups—including methyl, ethyl, n-butyl, iso-butyl, tert-butyl, iso-propyl, thexyl, substituted or unsubstituted aryl, cyclic alkyl, branched alkyl, or lower alkyl, and/or (3) independently selected from a hydrophilic/ionizable group, and Ai is independently selected from a non-polar group and $A_2$ is independently selected from either a hydrophilic/ionizable group or from a non-polar group.

In still other specific embodiments of Formula 1, Q comprises one of the following structures:
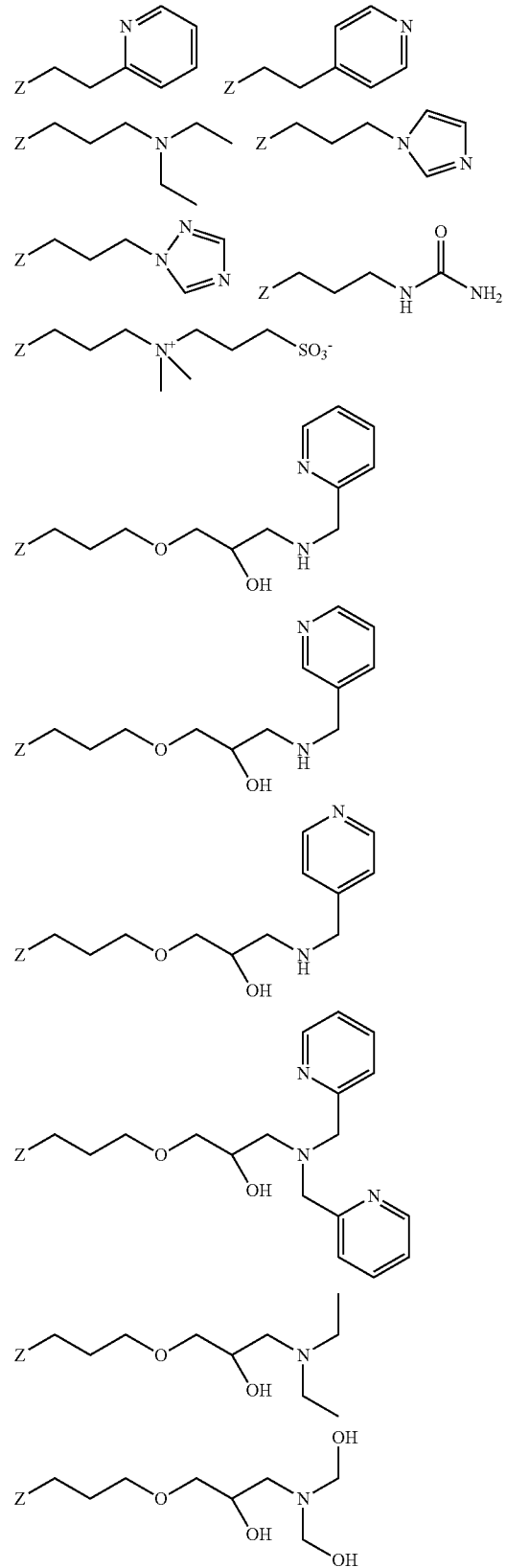
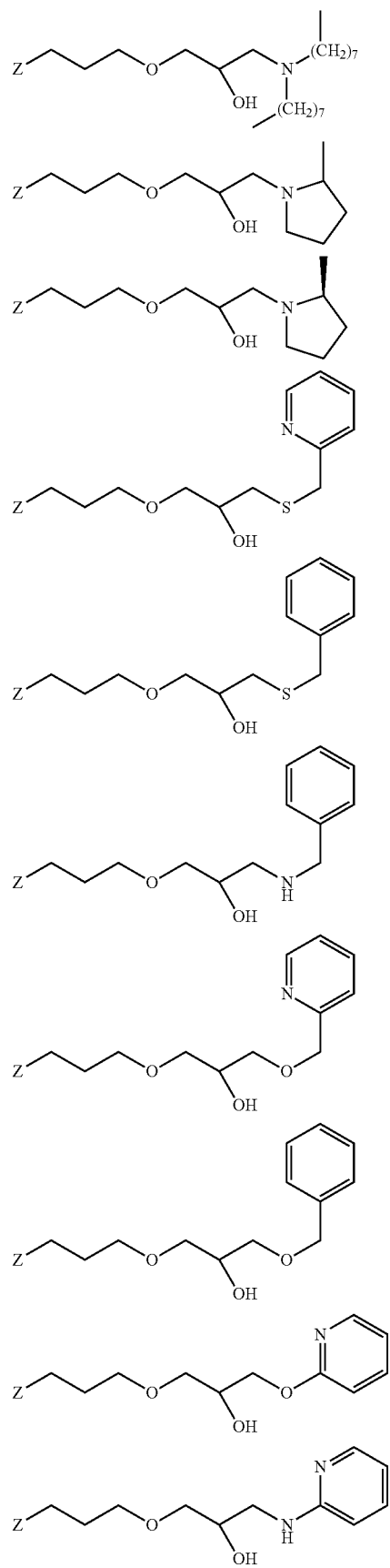

45
-continued

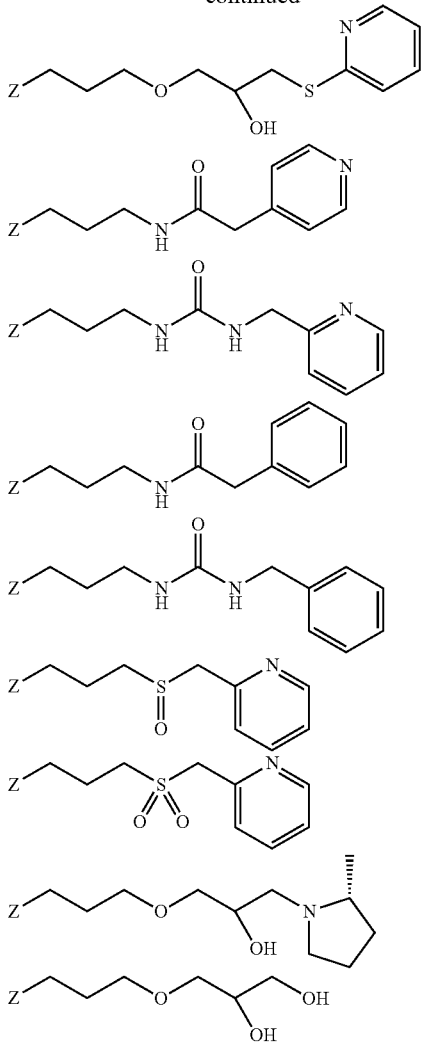

In such embodiments, the material of the invention may be modified to have the Formula 2:

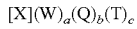  Formula 2 wherein:

X is a superficially porous material;

W is absent and/or includes hydrogen and/or includes hydroxyl on the surface of X;

Q is a functional group that minimizes retention variation over time (drift) under chromatographic conditions utilizing low water concentrations;

T comprises one or more hydrophilic, polar, ionizable, and/or charged functional groups that chromatographically interact with the analyte; and b and c are positive numbers, $0.05 \leq (b/c) \leq 100$, and $a \geq 0$.

In certain embodiments of Formula 2, Q is represented by:

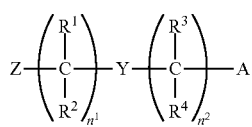

46 wherein:

$n^1$ an integer from 0-30;

$n^2$ an integer from 0-30;

each occurrence of $R^1$, $R^2$, $R^3$ and $R^4$ independently represents hydrogen, fluoro, methyl, ethyl, n-butyl, t-butyl, propyl, lower alkyl, a protected or deprotected alcohol, a zwitterion, or a group Z; wherein group Z comprises:

a) a surface attachment group having the formula

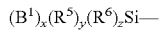

wherein x is an integer from 1-3, y is an integer from 0-2, z is an integer from 0-2, and x+y+z=3 each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwitterion group; and $B^1$ represents a siloxane bond;

b) an attachment to a surface organofunctional hybrid group through a direct carbon-carbon bond formation or through a heteroatom, ester, ether, thioether, amine, amide, imide, urea, carbonate, carbamate, heterocycle, triazole, or urethane linkage; or c) an adsorbed, surface group that is not covalently attached to the surface of the material;

Y is an embedded polar functionality; and

A represents i.) a hydrophilic terminal group;

ii.) hydrogen, fluoro, methyl, ethyl, n-butyl, t-butyl, i-propyl, lower alkyl, or group Z; or iii.) a functionalizable group.

In certain other embodiments of Formula 2, T is represented by one of:

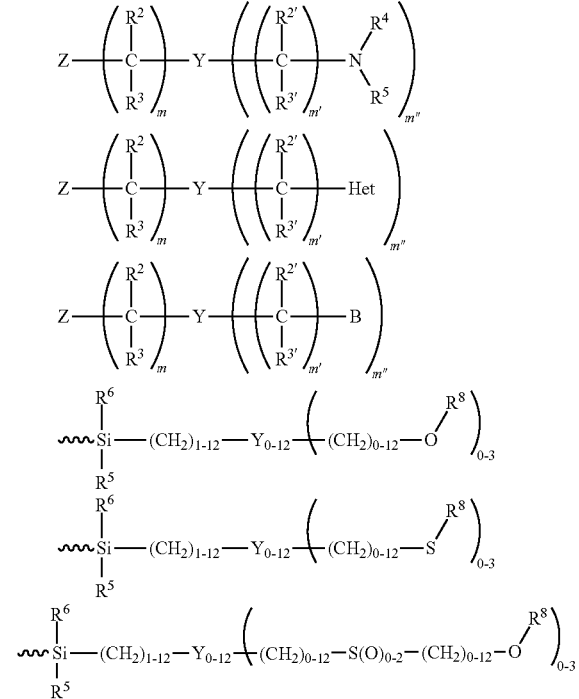

-continued $$\text{\textasciitilde\textasciitilde\textasciitilde}\underset{R^5}{\overset{R^6}{Si}}-(CH_2)_{1-12}-Y_{0-12}-\left((CH_2)_{0-12}-S(O)_{0-2}-(CH_2)_{0-12}-S\right)_{0-3}^{R^8},$$

or a combination thereof
wherein
m is an integer from 0-30;
m' is an integer from 0-30;
m" is an integer from 0-3;
Z represents:
a) a surface attachment group having the formula $$(B^1)_x(R^5)_y(R^6)_zSi-$$

wherein x is an integer from 1-3,
y is an integer from 0-2,
z is an integer from 0-2,
and x+y+z=3
each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwitterion group;
$B^1$ represents a siloxane bond; where each of $R^{7'}$ $R^{7'}$ and $R^{7''}$ represents hydrogen, methyl, ethyl, n-butyl, iso-butyl, tert-butyl, iso-propyl, thexyl, phenyl, branched alkyl or lower alkyl;
b) an attachment to a surface organofunctional hybrid group through a direct carbon-carbon bond formation or through a heteroatom, ester, ether, thioether, amine, amide, imide, urea, carbonate, carbamate, heterocycle, triazole, or urethane linkage; or
c) an adsorbed, surface group that is not covalently attached to the surface of the material.
Y is an embedded polar functionality; and
B represents a bond, N, O, S,

—(CH$_2$)$_{0-12}$—N—R$^{11}$R$^{12}$,

—(CH$_2$)$_{0-12}$—O—R$^{11}$,

—(CH$_2$)$_{0-12}$—S—R$^{11}$,

—(CH$_2$)$_{0-12}$—N—(CH$_2$)$_{0-12}$—R$^{11}$R$^{12}$,

—(CH$_2$)$_{0-12}$—O—(CH$_2$)$_{0-12}$—R$^{11}$,

—(CH$_2$)$_{0-12}$—S—(CH$_2$)$_{0-12}$—R$^{11}$,

—(CH$_2$)$_{0-12}$—S(O)$_{1-2}$—(CH$_2$)$_{0-12}$—N—R$^{11}$R$^{12}$,

—(CH$_2$)$_{0-12}$—S(O)$_{1-2}$—(CH$_2$)$_{0-12}$—O—R$^{11}$,

—(CH$_2$)$_{0-12}$—S(O)$_{1-2}$—(CH$_2$)$_{0-12}$—S—R$^{11}$;

—(CH$_2$)$_{0-12}$—S(O)$_{1-2}$—(CH$_2$)$_{0-12}$—N—(CH$_2$)$_{0-12}$—
R$^{11}$R$^{12}$,

—(CH$_2$)$_{0-12}$—S(O)$_{1-2}$—(CH$_2$)$_{0-12}$—O—(CH$_2$)$_{0-12}$—
R$^{11}$, or

—(CH$_2$)$_{0-12}$—S(O)$_{1-2}$—(CH$_2$)$_{0-12}$—S—(CH$_2$)$_{0-12}$—
R$^{11}$;

$R^{11}$ is a first mono-aromatic, polyaromatic, heterocyclic aromatic, or polyheterocyclic aromatic groups; and
$R^{12}$ is a hydrogen, an aliphatic group or a second mono-aromatic, polyaromatic, heterocyclic aromatic, or polyheterocyclic aromatic groups, wherein $R^{11}$ and $R^{12}$ are optionally substituted with an aliphatic group.

In certain specific embodiments of Formula 2, Q is represented by one of:

[Chemical structures showing Z-substituted compounds]

wherein Z comprises:
a) a surface attachment group having the formula $$(B^1)_x(R^5)_y(R^6)_zSi-$$

wherein x is an integer from 1-3,
y is an integer from 0-2,
z is an integer from 0-2,
and x+y+z=3
each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwitterion group; and
$B^1$ represents a siloxane bond;
b) an attachment to a surface organofunctional hybrid group through a direct carbon-carbon bond formation or through a heteroatom, ester, ether, thioether, amine, amide, imide, urea, carbonate, carbamate, heterocycle, triazole, or urethane linkage; or
c) an adsorbed, surface group that is not covalently attached to the surface of the material.

In certain other specific embodiments of Formula 2, T is represented by one of:
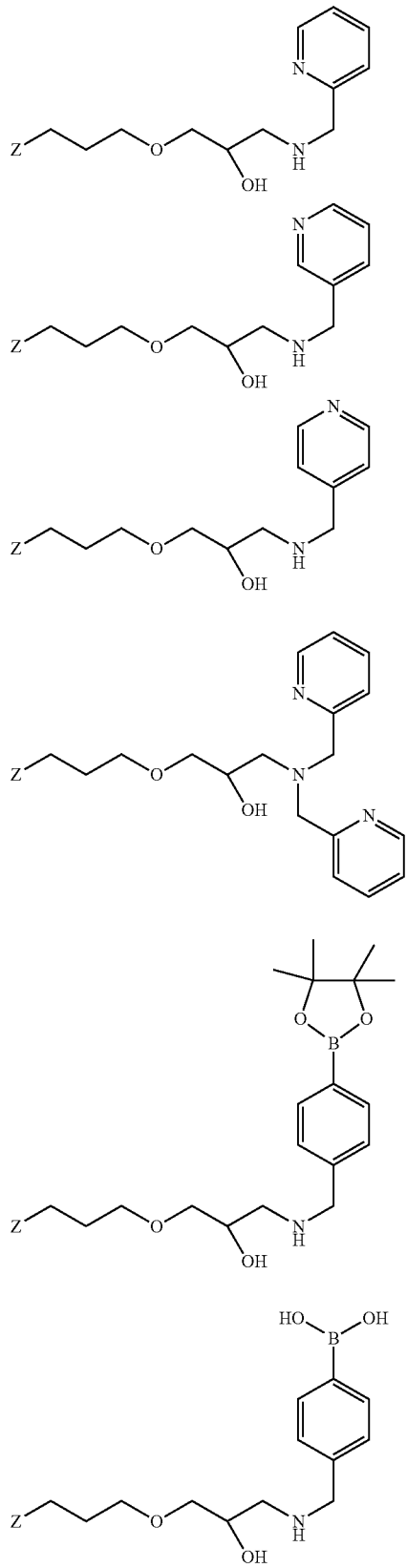
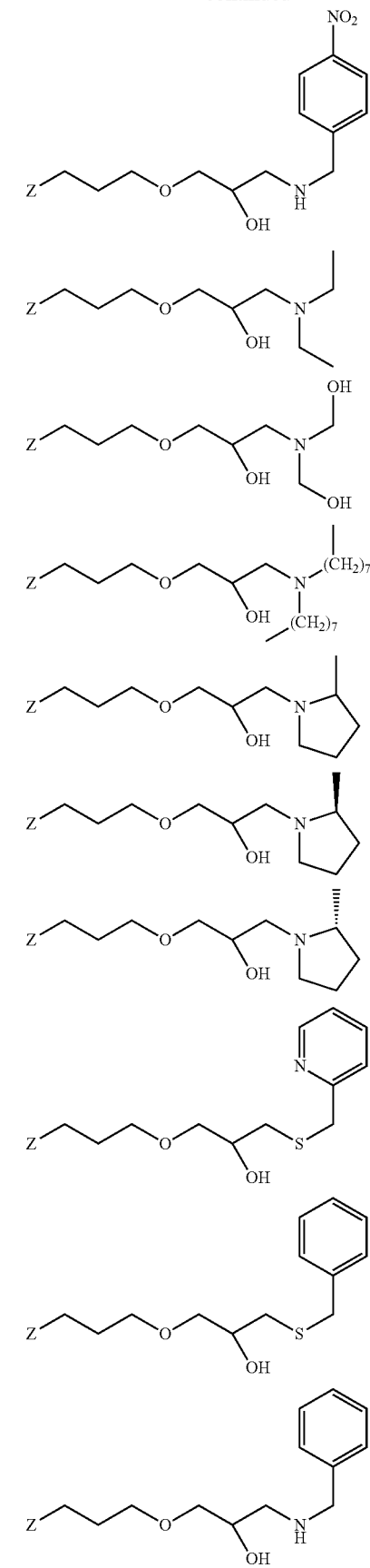

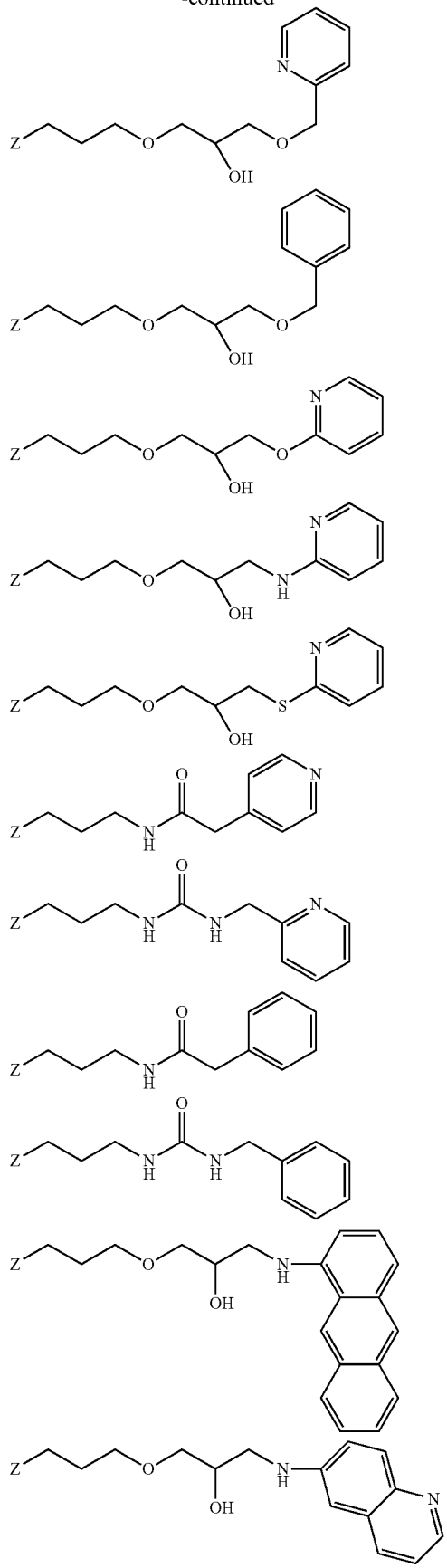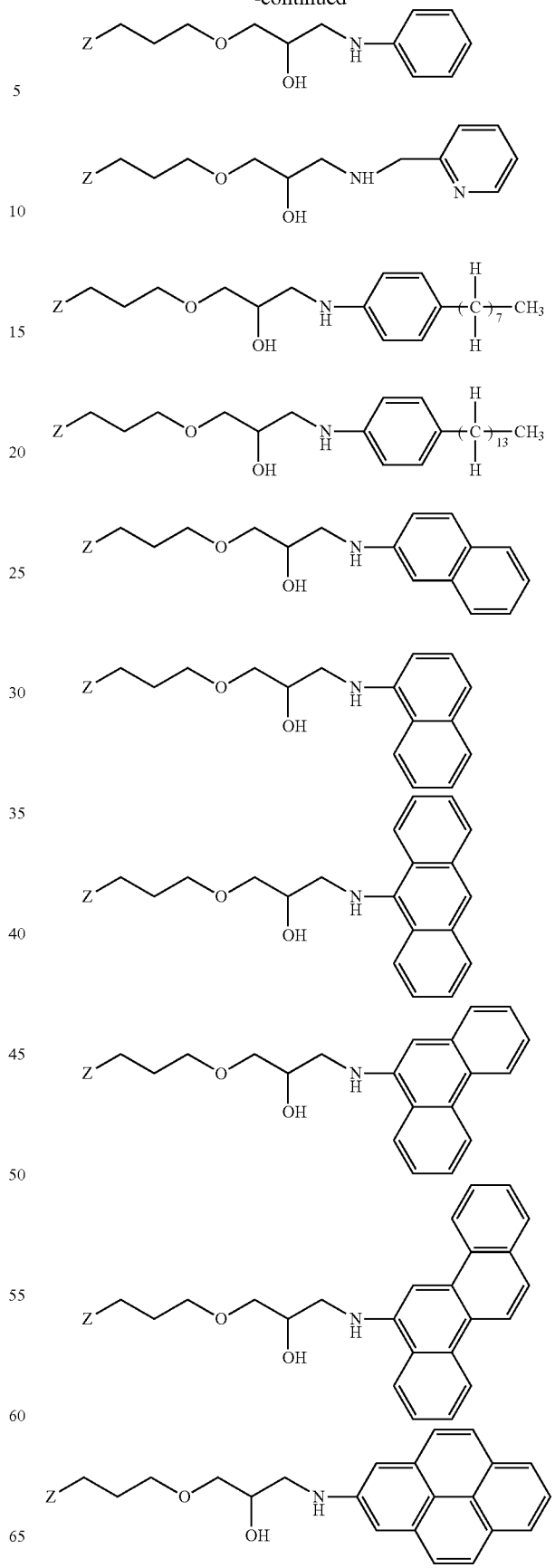

-continued

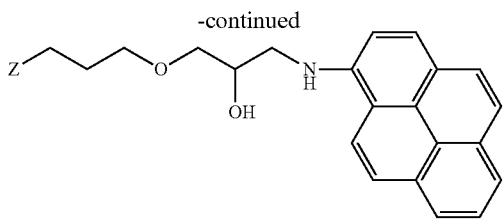

wherein Z comprises:
a) a surface attachment group having the formula

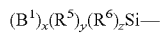

wherein x is an integer from 1-3,
y is an integer from 0-2,
z is an integer from 0-2,
and x+y+z=3
each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwitterion group; and
$B^1$ represents a siloxane bond;
b) an attachment to a surface organofunctional hybrid group through a direct carbon-carbon bond formation or through a heteroatom, ester, ether, thioether, amine, amide, imide, urea, carbonate, carbamate, heterocycle, triazole, or urethane linkage; or
c) an adsorbed, surface group that is not covalently attached to the surface of the material.

In certain embodiments utilizing Formula 1 or Formula 2, Q and T are different or are the same. In other embodiments utilizing Formula 1 or Formula 2, Q comprises two or more different moieties. In still other embodiments utilizing Formula 1 or Formula 2, T comprises two or more different moieties.

Approaches to Synthesis
The invention provides a method for preparing a superficially porous material comprising:
a.) providing a substantially nonporous core material; and
b.) applying to said core material one or more layers of porous shell material to form a superficially porous material In certain embodiments, the method further provides the step of:
c.) optimizing one or more properties of the superficially porous material.

The approaches described herein allows for the synthesis of narrow particle size distribution fully porous, spherical particles as well as narrow particle size distribution superficially porous (defined as a porous shell layer on a nonporous core particle) particles having a chromatographically enhanced pore geometry. The processes involves the condensation of a tetraalkoxysilane (e.g., tetraethoxysilane or tetramethoxysilane) alone or co-condensed with a second organosilane through modification of a traditional Stöber-growth process. Listed below are non-limiting descriptions of this process.

Method A:
Step 1) Condensation of a tetraalkoxysilane with or without $(R^1)_a(R^2)_b(R^3)_c Si(OR^4)_d$ to form seed particles (0.2-10 µm) in the presence or absence of surfactants or pore structuring agents (including pore expanding molecules and polymers).
Step 2) Grow seed particles by condensation of a tetraalkoxysilane with or without $(R^1)_a(R^2)_b(R^3)_c Si(OR^4)_d$ to form larger core particles (0.3-20 µm) in the presence or absence of surfactants or pore structuring agents (including pore expanding molecules and polymers).
Step 3) Further grow particles by co-condensation of a tetraalkoxysilane with $(R^1)_a(R^2)_b(R^3)_c Si(OR^4)_d$ to yield non-porous particles (0.4-20 µm) in the presence or absence of surfactants or pore structuring agents (including pore expanding molecules and polymers).
Step 4) Improve particle size distribution through particle classification techniques
Step 5) Produce a porous silica particle by removal of organic group and or surfactants by thermal treatment.
Step 6) Pore structure modification using fluorine containing chemical techniques, including ammonium bifluoride and hydrofluoric acid.
Step 7) Pore structure modification by hydrothermal processing in the presence or absence of surfactants or pore structuring agents (including pore expanding molecules and polymers).
Step 8) Improve particle size distribution through particle classification techniques.
Step 9) Use of elevated temperature treatment (>600° C.) to improve particle mechanical stability.
Step 10) Prepare the particle surface for modification by acid treatment (e.g., hydrochloric acid or hydrofluoric acid).
Step 11) Chemical modification of the particle surface Method B:
Step 1) Condensation of a tetraalkoxysilane with or without $(R^1)_a(R^2)_b(R^3)_c Si(OR^4)_d$ to form seed particles (0.2-10 µm) in the presence or absence of surfactants or pore structuring agents.
Step 2) Grow seed particles by condensation of a tetraalkoxysilane with or without $(R^1)_a(R^2)_b(R^3)_c Si(OR^4)_d$ to form larger core particles (0.3-20 µm) in the presence or absence of surfactants or pore structuring agents.
Step 3) Further grow particles by co-condensation of a tetraalkoxysilane with $(R^1)_a(R^2)_b(R^3)_c Si(OR^4)_d$ to yield non-porous particles (0.4-20 µm) in the presence or absence of surfactants or pore structuring agents (including pore expanding molecules and polymers).
Step 4) Improve particle size distribution through particle classification techniques
Step 5) Produce a porous silica particle by removal of organic group and/or surfactants by thermal treatment or extraction techniques.
Step 6) Pore structure modification using fluorine containing chemical techniques, including ammonium bifluoride and hydrofluoric acid.
Step 7) Pore structure modification by pseudomorphic transformation in the presence of surfactants and/or pore structuring agents (including pore expanding molecules and polymers).
Step 8) Surfactant removal by extraction techniques or by calcination.
Step 9) Pore structure modification by hydrothermal processing in the presence or absence of surfactants or pore structuring agents (including pore expanding molecules and polymers).
Step 10) Improve particle size distribution through particle classification techniques
Step 11) Use of elevated temperature treatment (>600° C.) to improve particle mechanical stability.
Step 12) Prepare the particle surface for modification by acid treatment (e.g., hydrochloric acid or hydrofluoric acid).
Step 13) Chemical modification of the particle surface
Method C (Specific Version of Method A):
Step 1) Condensation of $Si(OCH_2CH_3)_4$ to form seed particles (0.2-2 µm)

Step 2) Grow seed particles by condensation of Si(OCH$_2$CH$_3$)$_4$ to form a larger core particle (0.3-7 μm).

Step 3) Further grow particles by co-condensation of Si(OCH$_2$CH$_3$)$_4$ with RSi(OR)$_3$ (R=octyl or octadecyl and R' is methyl or ethyl) to yield non-porous particle (0.4-10 μm) in the presence or absence of a pore structuring agent (e.g., mesitylene or an alkane). Here R=octyl or octadecyl and R' is methyl or ethyl.

Step 4) Improve particle size distribution through particle classification techniques Step 5) Produce a porous silica particle by removal of organic group by thermal treatment (500-600° C. in air).

Step 6) Pore structure modification using ammonium bifluoride (4-20 hours, 25-60° C.).

Step 7) Pore structure modification by hydrothermal processing (7-20 hours, pH 5-7, 90-150° C.).

Step 8) Improve particle size distribution through particle classification techniques Step 9) Use of elevated temperature treatment (800-1,000° C.) to improve particle mechanical stability.

Step 10) Prepare the particle surface for modification using hydrofluoric acid treatment.

Step 11) Chemical modification of the particle surface using chlorosilanes coupling and endcapping protocols.

Method D (Modified Core Particle):

Step 1) <10 μm particles (e.g., diamonds, zirconia, titania, iron oxides, cerium, cobalt, cobalt oxides, carbon, silica, silica carbide) are surface activated through treatment with acid, base, chemical reduction, chemical oxidation, or through attachment of a surface modifying group (e.g., adsorption of an amine, surfactant, silane bond).

Step 2) Particles are grown by condensation of a tetraalkoxysilane with or without (R$^1$)$_a$(R$^2$)$_b$(R$^3$)$_c$Si(OR$^4$)$_d$ in the presence or absence of surfactants or pore structuring agents (including pore expanding molecules and polymers).

Step 3) Particle are further grown by co-condensation of a tetraalkoxysilane with (R$^1$)$_a$(R$^2$)$_b$(R$^3$)$_c$Si(OR$^4$)$_d$ to yield a non-porous particles in the presence or absence of surfactants or pore structuring agents (including pore expanding molecules and polymers).

Step 4) Improve particle size distribution through particle classification techniques Step 5) Produce a porous silica particle by removal of organic group and/or surfactants by thermal treatment or extraction techniques.

Step 6) Pore structure modification using fluorine containing chemical techniques, including ammonium bifluoride and hydrofluoric acid.

Step 7) Pore structure modification by pseudomorphic transformation in the presence of surfactants and/or pore structuring agents (including pore expanding molecules and polymers).

Step 8) Surfactant removal by extraction techniques or by calcination.

Step 9) Pore structure modification by hydrothermal processing in the presence or absence of surfactants or pore structuring agents (including pore expanding molecules and polymers).

Step 10) Improve particle size distribution through particle classification techniques Step 11) Use of elevated temperature treatment (>600° C.) to improve particle mechanical stability.

Step 12) Prepare the particle surface for modification by acid treatment (e.g., hydrochloric acid or hydrofluoric acid).

Step 13) Chemical modification of the particle surface Alternatives

Many alternatives within a Method A-D can be explored. For example, if particle are substantially uniform in size after growth, further sizing steps may not be required. Other steps that may be avoided are the use of fluorine containing chemical modification step before pseudomorphic transformation, or the use of a higher temperature treatment to improve particle mechanical stability if the particles already have sufficient mechanical strength without the use of this step.

Method D may be useful for preparing superficially porous magnetic particles.

Other approaches which will be useful in the methods of the invention are as follows.

In one aspect, the invention provides a method for preparing a superficially porous material comprising:
a.) providing a substantially nonporous hybrid core material; and
b.) applying to said core material one or more layers of porous shell material to form a superficially porous material In certain embodiments, the method for preparing a superficially porous material further comprises the step of:
c.) optimizing one or more properties of the superficially porous material.

In other embodiments, each layer of porous shell material wherein each layer is independently selected from is a porous inorganic/organic hybrid material, a porous silica, a porous composite material or mixtures thereof.

In still other embodiments, each layer of porous shell material is applied using sols, a polyelectrolyte or a chemically degradable polymer, wherein:
a) the sols are inorganic sols, hybrid sols, nanoparticles, or mixtures thereof; and
b) the polyelectrolyte or chemically degradable polymer is removed from the material using chemical extraction, degradation, or thermal treatment at temperatures less than 500° C., or combinations thereof.

In certain other embodiments, the sols used in the formation of the materials may have a different average size in each layer. In particular embodiments, the sols used for inner layers (i.e. layers closer to the center of the material of the invention) have larger average sizes than the pores used for outer layers (i.e. layers closer to the surface of the material of the invention.) In other embodiments, the sols used for inner layers (i.e. layers closer to the center of the material of the invention) have smaller average sizes than the pores used for outer layers (i.e. layers closer to the surface of the material of the invention.)

In certain embodiments, each layer of porous shell material is applied by formation through an electrostatic or acid/base interaction of an ionizable group comprising the steps of:
a) pretreating or prebonding the substantially nonporous core with an alkoxysilane that has an ionizable group,
b) treating the substantially nonporous core to sols that are inorganic, hybrid, nanoparticle, or mixtures thereof, that have been prebonded with an alkoxysilane that has an ionizable group of the opposite charge to the ionizable group on the surface of the core; and
c) forming additional layers on the material with sols that are inorganic, hybrid, nanoparticle, or mixtures thereof that have been prebonded with an alkoxysilane that has an ionizable group of opposite charge to the ionizable group of prior layer.

In particular embodiments, the pretreatment of the substantially nonporous core or sols includes washing with and acid or base, or a charged polyelectrolyte. In other embodiments, the pretreatment of the substantially nonporous core or sols includes chemical transformation of an accessible hybrid organic group.

In still other embodiments the accessible hybrid organic group is an aromatic group that can undergo sulfonation, nitration, amination, or chloromethylation followed by oxidation or nucleophillic displacement with amine containing groups to form ionizable groups. In yet other embodiments, the accessible hybrid organic group is an alkene group that can undergo oxidation, cross-metathesis, or polymerization to form ionizable groups. In specific embodiments, the accessible hybrid organic group is an thiol group that can undergo oxidation, radical addition, nucleophillic displacement, or polymerization to form ionizable groups.

In yet other embodiments, the prebonding of the substantially nonporous core or sols includes bonding with an alkoxysilane that has an ionizable group of equation 1, $$R(CH_2)_n Si(Y)_{3-x}(R')_x \quad \text{(equation 1)}$$

where n=1-30, advantageously 2-3;
x is 0-3; advantageously 0;
Y represents chlorine, dimethylamino, triflate, methoxy, ethoxy, or a longer chain alkoxy group;
R represent a basic group, including (but not limited to) $-NH_2$, $-N(R')H$, $-N(R')_2$, $-N(R')_3^+$, $-NH(CH_2)_m NH_2$, $-NH(CH_2)_m N(R')H$, $-NH(CH_2)_m N(R')_2$, $-NH(CH_2)_m N(R')_3^+$, pyridyl, imidizoyl, polyamine
R' independently represents an alkyl, branched alkyl, aryl, or cycloalkyl group;
m is 2-6.

In still yet other embodiments, the prebonding of the substantially nonporous core or sols includes bonding with an alkoxysilane that has an ionizable group of equation 2, $$A(CH_2)_n Si(Y)_{3-x}(R')_x \quad \text{(equation 2)}$$

where n=1-30, advantageously 2-3;
x is 0-3; advantageously 0;
Y represents chlorine, dimethylamino, triflate, methoxy, ethoxy, or a longer chain alkoxy group;
A represent an acidic group, including (but not limited to) a sulfonic acid, carboxylic acid, phosphoric acid, boronic acid, arylsulfonic acid, arylcarboxylic acid, arylphosphonic acid, and arylboronic acid.
R' independently represents an alkyl, branched alkyl, aryl, or cycloalkyl group.

In particular embodiments, each layer of porous shell material is applied using a polyelectrolyte or a chemically degradable polymer.

In other embodiments, the polyelectrolyte or a chemically degradable is removed from the material by chemical extraction, degradation, or thermal treatment at temperatures less than 500° C., or combinations thereof.

In certain embodiments, each layer of porous shell material is applied using alkoxysilanes, organoalkoxysilanes, nanoparticles, polyorganoalkoxysiloxanes, or combinations thereof, comprising the steps of:
a) condensing siloxane precursors on the substantially nonporous core in a reaction mixture comprising ethanol, water and ammonium hydroxide and optionally containing a non-ionic surfactant, an ionic surfactant, a polyelectrolyte or a polymer to form the porous shell material; and
b) introducing porosity is introduced through extraction, degradation, oxidation, hydrolysis, deprotection, or transformation of the hybrid group, ionic surfactant or non-ionic surfactant or a combination thereof.

In particular embodiments, the alkoxysilanes, organoalkoxysilanes, nanoparticles, polyorganoalkoxysiloxanes, or combinations thereof, are condensed on the substantially nonporous core in a solution comprising ethanol, water, ammonium hydroxide, an ionic surfactant; and an non-ionic surfactant.

In other embodiments, the ionic surfactant is $C_{10}$-$C_{30}N(R)_3^+X^-$, where R is methyl, ethyl, propyl, alkyl, fluoroalkyl; X is a halogen, hydroxide, or of the form $R'SO_3^-$ or $R'CO_2^-$ where R' is methyl, ethyl, butyl, propyl, isopropyl, tert-butyl, aryl, tolyl, a haloalkyl or a fluoroalkyl group.

In yet other embodiments, the ionic surfactant is octadecyltrimethylammonium bromide, octadecyltrimethylammonium chloride, hexadecyltrimethylammonium bromide, hexadecyltrimethylammonium chloride, dodecyltrimethylammonium bromide, or dodecyltrimethylammonium chloride.

In particular embodiments, the concentration of ionic surfactant is maintained in the reaction solution between 5-17 mM; or in certain embodiments between 8-14 mM.

In other embodiments, the non-ionic surfactant is a diblock or triblock copolymer. In certain embodiments, the copolymer is (PEO)x(PPO)y(PEO)x, wherein
PEO is a polyethylene oxide repeat unit,
PPO is a polypropylene oxide repeat unit,
x is an integer between 5-106,
y is an integer between 30-85.

In particular embodiments the triblock copolymer is Pluronic® P123, having $(PEO)_{20}(PPO)_{70}(PEO)_{20}$. In still other embodiments, the alkoxysilanes, organoalkoxysilanes, or combinations thereof, are condensed on the substantially nonporous core in a solution comprising:
ethanol, water, ammonium hydroxide or combinations thereof;
octadecyltrimethylammonium bromide; and
Pluronic® P123.

In certain embodiments, the alkoxysilane used is selected from the group of tetramethoxsilane or tetraethoxysilane.

In still other embodiments, the organosiloxane is selected from the group of phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane, diethyldiethoxysilane; diethyldimethoxysilane 1,4-bis(triethoxysilyl)benzene; 1,4-bis(trimethoxysilyl)benzene; 1,3-bis(triethoxysilyl)benzene; 1,3-bis(trimethoxysilyl)benzene; 1,8-bis(triethoxysilyl)octane; 1,8-bis(trimethoxysilyl)octane; 1,2-bis(trimethoxysilyl)ethane; 2-bis(triethoxysilyl)ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl)ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; or 1,3-bis(trimethoxysilylethyl)benzene.

In yet other embodiments, the alkoxysilane used is tetraethoxysilane and the organoalkoxysilane used is 1,2-bis(triethoxysilyl)ethane.

In certain other embodiments, the concentration of octadecyltrimethylammonium bromide is maintained between 8-14 mM.

In certain other embodiments, the molar ratio of octadecyltrimethylammonium bromide and Pluronic® P123 is maintained at or above 1.30.

In still other embodiments, the molar ratio of alkoxysilane to organoalkoxysilane ranges between 30:1 to 1:30.

In certain embodiments, alkoxysilane, organoalkoxysilane, or combinations thereof are prediluted in ethanol. In certain such embodiments, prediluted ethanol solutions of alkoxysilane, organoalkoxysilane, or combinations thereof are added at a slow and constant rate to prevent fines generation, aggregation and agglomeration. In other such embodiments, prediluted ethanol solutions of alkoxysilane, organoalkoxysilane, or combinations thereof are added a rate between 5-500 µL/min.

In other embodiments, a secondary solution comprising ethanol, water, ammonium hydroxide, ionic surfactant and non-ionic surfactant is added at a slow and constant rate to prevent fines generation, aggregation and agglomeration. In certain such embodiments the secondary solution comprising ethanol, water, ammonium hydroxide, ionic surfactant and non-ionic surfactant is added within a range between the rate required to maintain a uniform ratio of particle surface area ($m^2$) to reaction volume, to the rate required to maintain a uniform ratio of particle volume ($m^3$) to reaction volume.

In certain embodiments, the surfactant mixture is removed through one or more of the following; extractions with acid, water, or organic solvent; ozonolysis treatments, thermal treatments <500° C., or thermal treatments between 500-1000° C.

In still other embodiments, the surfactant mixture is removed through combination of acid extractions and ozonolysis treatments.

In certain embodiments, each layer of porous shell material is applied using alkoxysilanes, organoalkoxysilanes, nanoparticles, polyorganoalkoxysiloxanes, or combinations thereof, comprising the steps of:
  a) condensing siloxane precursors on the substantially nonporous core in a reaction mixture comprising ethanol, water or ammonium hydroxide to form a non-porous hybrid inorganic/organic shell material; and
  b) introducing porosity is introduced through extraction, degradation, oxidation, hydrolysis, deprotection, or transformation of the hybrid group or a combination thereof.

In some such embodiments, the alkoxysilane used is selected from the group of tetramethoxsilane or tetraethoxysilane.

In other such embodiments, the organosiloxane is selected as one or more of the following from the group of phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane, diethyldiethoxysilane; diethyldimethoxysilane 1,4-bis(triethoxysilyl)benzene; 1,4-bis(trimethoxysilyl)benzene; 1,3-bis(triethoxysilyl)benzene; 1,3-bis(trimethoxysilyl)benzene; 1,8-bis(triethoxysilyl)octane; 1,8-bis(trimethoxysilyl)octane; 1,2-bis(trimethoxysilyl)ethane; 1,2-bis(triethoxysilyl)ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl)ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; or 1,3-bis(trimethoxysilylethyl)benzene, octadecyltrimethoxysilane, octadecyltriethoxysilane, octyltrimethoxysilane, octyltriethoxysilane, dodecyltrimethoxysilane, and dodecyltriethoxysilane.

In still other such embodiments, the alkoxysilane used is tetraethoxysilane and the organoalkoxysilane used is octadecyltrimethoxysilane.

In certain such embodiments, the alkoxysilane, one or more organoalkoxysilanes, or combinations thereof are prediluted in ethanol.

In some such embodiments, the prediluted ethanol solutions of alkoxysilane, one or more organoalkoxysilanse, or combinations thereof are added a slow and constant rate to prevent fines generation, aggregation and agglomeration.

In other such embodiments, prediluted ethanol solutions of alkoxysilane, one or more organoalkoxysilanes, or combinations thereof are added a rate between 5-500 µL/min.

In certain embodiments, a secondary solution comprising ethanol, water, and ammonium hydroxide is added at a slow and constant rate to prevent fines generation, aggregation and agglomeration.

In certain other embodiments, a secondary solution comprising ethanol, water, and ammonium hydroxide is added within a range between the rate required to maintain a uniform ratio of particle surface area ($m^2$) to reaction volume, to the rate required to maintain a uniform ratio of particle volume ($m^3$) to reaction volume.

In certain embodiments, porosity is introduced through extraction, degradation, hydrolysis, deprotection, or transformation of the hybrid group through one or more of the following; extractions with acid, water, or organic solvent; ozonolysis treatments, thermal treatments <500° C., or thermal treatments between 500-1000° C.

In still other embodiments, porosity is introduced through extraction, degradation, hydrolysis, deprotection, or transformation of the hybrid group through combination of acid extractions, ozonolysis treatments and/or thermal treatments <500° C.

In certain embodiments, each layer is applied using a mixture of formula XX.

$$(D)_d(E)_e(F)_f \quad \text{(Formula XX)}$$

wherein,
  a) d+e+f=1
  b) D is one or more inorganic components upon initial condensation.
  c) E is one or more hybrid components upon initial condensation.
  d) F is one or more hybrid components upon initial condensation that can be further reacted to increase the porosity of the superficially porous layer In certain such embodiments, the precursor for the inorganic component upon initial condensation (D) is selected from oxide, hydroxide, ethoxide, methoxide, propoxide, isopropoxide, butoxide, sec-butoxide, tert-butoxide, iso-butoxide, phenoxide, ethylhexyloxide, 2-methyl-2-butoxide, nonyloxide, isooctyloxide, glycolates, carboxylate, nitrate, chlorides, and mixtures thereof of silicon, titanium, zirconium, or aluminum.

In other such embodiments, the precursor for the inorganic component upon initial condensation (D) is selected from tetraethoxysilane, tetramethoxysilane, methyl titanium triisopropoxide, methyl titanium triphenoxide, titanium allylacetoacetatetriisopropoxide, titanium methacrylate triisopropoxide, titanium methacryloxyethylacetoacetate triisopropoxide, pentamethylcyclopentadienyl titanium trimethoxide, pentamethylcyclopentadienyl titanium trichloride, and zirconium methacryloxyethylacetoacetate tri-n-propoxide.

In still other such embodiments, the precursor for the hybrid component upon initial condensation (E) is selected from 1,2-bis(triethoxysilyl)ethane, 1,2-bis(trimethoxysilyl) ethane, 1,4-bis(triethoxysilyl)benzene, 1,4-bis(trimethoxysilyl)benzene, 1,3-bis(triethoxysilyl)benzene, 1,3-bis(trimethoxysilyl)benzene, 1,3,5-tris(triethoxysilyl)benzene, 1,3,5-tris(trimethoxysilyl)benzene, and bis(4-triethoxysilylphenyl)diethoxysilane.

In yet other such embodiments, the precursor for the hybrid component upon initial condensation that can be further reacted to increase the porosity of the superficially porous layer (F) is selected from phenyltrimethoxysilane, phenyltriethoxysilane, acetyloxyethyltrimethoxysilane; acetyloxyethyltriethoxysilane; chloroethyltriethoxysilane; chloroethyltrimethoxysilane; methacryloxypropyltrimethoxysilane; methacryloxypropyltriethoxysilane; bromoethyltrimethoxysilane; bromoethyltriethoxysilane; fluorotriethoxysilane; fluorotrimethoxysilane; and alkoxysilanes of the type:

$(CH_3CH_2O)_{4-v}Si(OR^*)_v$  (Formula XXb)

wherein
R* was the corresponding octadecyl, dodecyl, octyl, 2-ethoxyethyl, or 3-ethyl-3-pentyl group,
v was an integer equal to 1-4, In such embodiments, porosity is introduced by reaction of hybrid group F through protodesilylation, hydrolysis, deprotection, acid extraction, thermal treatment <500° C., oxidation, ozonolysis or decomposition.

Another aspect of the invention provides, a method to produce a hybrid core with increased hybrid content near the surface of the core by modifying a nonporous silica core with one more or more layers formed using an organosiloxane, a mixture of organosiloxane and alkoxysilane, polyorganoalkoxysilanes, a hybrid inorganic/organic surrounding material, or combination thereof.

Still another aspect of the invention provides, a method to produce a superficially porous hybrid material that has increased hybrid content near the external surface of the material by modifying a superficially porous material with one more or more layers formed using an organosiloxane, a mixture of organosiloxane and alkoxysilane, polyorganoalkoxysilanes, a hybrid inorganic/organic surrounding material, or combination thereof.

Yet another aspect of the invention provides, a method to produce a superficially porous hybrid particle that has increased hybrid content near the external surface of the particle by modifying a superficially porous particle with one more or more layers formed using an organosiloxane, a mixture of organosiloxane and alkoxysilane, polyorganoalkoxysilanes, a hybrid inorganic/organic surrounding material, or combination thereof.

Still another aspect of the invention provides, a method to produce a superficially porous hybrid particle that has increased hybrid content near the external surface of the particle by modifying a superficially porous particle that is substantially silica (>90 molar %) with one more or more layers formed using an organosiloxane, a mixture of organosiloxane and alkoxysilane, polyorganoalkoxysilanes, a hybrid inorganic/organic surrounding material, or combination thereof.

Still yet another aspect of the invention provides, a method to produce a superficially porous hybrid particle that has increased hybrid content near the external surface of the particle comprising the steps of
a.) forming a superficially porous particle that is substantially silica (>90 molar %) and has a pore volume between 0.18-0.50 cm³/g; and b.) reducing the porosity of this particle by 0.01-0.20 cm³/g by modify this particle with one more or more layers formed using an organosiloxane, a mixture of organosiloxane and alkoxysilane, polyorganoalkoxysilanes, a hybrid inorganic/organic surrounding material, or combination thereof.

In certain embodiments of the invention, the methods provide materials in which 1-15 layers are formed in the process. In other aspects, 2-5 layers are formed. In still other 1-2 layers are formed.

In certain embodiments of the invention the superficially porous material is optimized by acid extraction, classification, ozonolysis treatment, hydrothermal treatment, acid treatment or combinations thereof.

In yet other embodiments of the invention, the superficially porous material is further surface modified. In some aspects by: coating with a polymer; coating with a polymer by a combination of organic group and silanol group modification; a combination of organic group modification and coating with a polymer; a combination of silanol group modification and coating with a polymer; formation of an organic covalent bond between the material's organic group and a modifying reagent; or a combination of organic group modification, silanol group modification and coating with a polymer.

In another aspect, the invention provides a method for increasing the porosity of a substantially nonporous material comprising:
a.) providing a substantially nonporous core material; and
b.) applying to said core material one or more layers of porous shell material to form a superficially porous material.

In such methods of increasing the porosity of a substantially nonporous material, the methods of applying to said core material one or more layers of porous shell material will be understood to be substantially the same as those described above for preparing a superficially porous material and should be considered as such.

Separation Devices and Kits

Another aspect provides a variety of separations devices having a stationary phase comprising the materials as described herein. Particularly, the separations devices include, e.g., chromatographic columns, thin layer plates, filtration membranes, sample cleanup devices and microtiter plates; packings for HPLC columns; solid phase extraction (SPE); ion-exchange chromatography; magnetic bead applications; affinity chromatographic and SPE sorbents; sequestering reagents; solid supports for combinatorial chemistry; solid supports for oligosaccharide, polypeptides, and/or oligonucleotide synthesis; solid supported biological assays; capillary biological assay devices for mass spectrometry, templates for controlled large pore polymer films; capillary chromatography; electrokinetic pump packing materials; packing materials for microfluidic devices; polymer additives; catalysis supports; and packings materials for microchip separation devices. Similarly, materials of the invention can be packed into preparatory, microbore, capillary, and microfluidic devices.

The materials of the invention impart to these devices improved lifetimes because of their improved stability. Thus, in a particular aspect, the invention provides a chromatographic column having improved lifetime, comprising
a) a column having a cylindrical interior for accepting a packing material, and
b) a packed chromatographic bed comprising a materials as described herein.

In another particular aspect, the invention provides a chromatographic device, comprising
 a) an interior channel for accepting a packing material and
 b) a packed chromatographic bed comprising a materials as described herein.

The invention also provides for a kit comprising the materials as described herein, as described herein, and instructions for use. In one embodiment, the instructions are for use with a separations device, e.g., chromatographic columns, thin layer plates, filtration membranes, sample cleanup devices, solid phase extraction device, microfluidic device, and microtiter plates.

EXAMPLES

The present invention may be further illustrated by the following non-limiting examples describing the chromatographic materials.

Materials

All reagents were used as received unless otherwise noted. Those skilled in the art will recognize that equivalents of the following supplies and suppliers exist and, as such, the suppliers listed below are not to be construed as limiting.

Characterization

Those skilled in the art will recognize that equivalents of the following instruments and suppliers exist and, as such, the instruments listed below are not to be construed as limiting. The % C, % H, % N values were measured by combustion analysis (CE-440 Elemental Analyzer; Exeter Analytical Inc., North Chelmsford, Mass.) or % C by Coulometric Carbon Analyzer (modules CM5300, CM5014, UIC Inc., Joliet, Ill.). The specific surface areas (SSA), specific pore volumes (SPV) and the average pore diameters (APD) of these materials were measured using the multipoint $N_2$ sorption method (Micromeritics ASAP 2400; Micromeritics Instruments Inc., Norcross, Ga.). The SSA was calculated using the BET method, the SPV was the single point value determined for $P/P_0>0.98$ and the APD was calculated from the desorption leg of the isotherm using the BJH method. Scanning electron microscopic (SEM) image analyses were performed (JEOL JSM-5600 instrument, Tokyo, Japan) at 7 kV. Focused ion beam scanning electron microscopic (FEB/SEM) image analyses were performed by Analytical Answers Inc. (Woburn, Mass.) on an FEI Model 200 Focused Ion Beam instrument, and a Hitachi S4800 Ultra-Field emission SEM. Particle sizes were measured using a Beckman Coulter Multisizer 3 analyzer (30 µm aperture, 70,000 counts; Miami, Fla.). The particle diameter (dp) was measured as the 50% cumulative diameter of the volume based particle size distribution. The width of the distribution was measured as the 90% cumulative volume diameter divided by the 10% cumulative volume diameter (denoted 90/10 ratio). Light scattering particle size measurements were measured using a Malvern Mastersizer 2000 in water. Zeta-potential measurements were made using a Malvern ZetaSizer NanoSeries (model ZEN3600). Multinuclear ($^{13}$C, $^{29}$Si) CP-MAS NMR spectra were obtained using a Bruker Instruments Avance-300 spectrometer (7 mm double broadband probe). The spinning speed was typically 5.0-6.5 kHz, recycle delay was 5 sec. and the cross-polarization contact time was 6 msec. Reported $^{13}$C and $^{29}$Si CP-MAS NMR spectral shifts were recorded relative to tetramethylsilane using the external standards adamantane ($^{13}$C CP-MAS NMR, δ 38.55) and hexamethylcyclotrisiloxane ($^{29}$Si CP-MAS NMR, δ -9.62). Populations of different silicon environments were evaluated by spectral deconvolution using DMFit software. [Massiot, D.; Fayon, F.; Capron, M.; King, I.; Le Calvé, S.; Alonso, B.; Durand, J.-O.; Bujoli, B.; Gan, Z.; Hoatson, G. Magn. Reson. Chem. 2002, 40, 70-76]. Classification techniques are described, for example, in W. Gerhartz, et al. (editors) *Ullmann's Encyclopedia of Industrial Chemistry*, 5$^{th}$ edition, Volume B2: Unit Operations I, VCH Verlagsgesellschaft mbH, (Weinheim, Fed. Rep. Germ. 1988). Magnetic measurements were made using a vibrating sample magnetometer (ADE/DMS Model 880) by ArKival Technology Corporation (Nashua, N.H.). Phase characterization were made by Wide Angle X-Ray Powder Diffraction (XRPD) analysis (H&M Analytical Services, Inc. Allentown, N.J.), using a Bruker D4 diffractometer (Cu radiation at 40 KV/30 mA). Scans were run over the angular range of 10° to 90° 2-Theta with a step size of 0.02° and a counting time of 715 seconds per step.

Example 1

Superficially porous materials are prepared by a number of different approaches. Included in this are the methods described by Unger et. al. (Adv. Mater. 10 (1998), 1036-1038), Yoon et. al. (Ad. Mater. 14, (2002) 19-21; J. Mater. Chem. 17 (2007) 1758-1761), Yano et. al. (Chem Lett, 2006, 35, 9, 1014 and JP 2006347849), Wyndham et. al. (WO 2012/018598; WO 2012/018596), US 2007/0189944, US 2008/0277346, US 2009/0297853, U.S. Pat. Nos. 7,976,812, 7,846,337, US 2010/0051877, US 2013/0004772, US 2011/0226990, WO2012/110995, and US 2009/0218276, each of which is incorporated herein in its entirety by reference.

Example 2

Superficially porous materials prepared in example 1 are surface modified by one or more of the approaches detailed in U.S. Pat. Nos. 6,686,035, 7,223,473, 7,919,177, US 2012/0141789, US 2009/0209722, US 2008/0269368, US 2011/0049056, US 2012/0055860, US 2012/0273404, WO 2012/018598 and WO 2012/018596, each of which is incorporated herein in its entirety by reference.

Or alternatively using one or methods described in one or more of the following: U.S. Pat. No. 7,563,367, US 2009/0275469, US 2009/0311533, or US 2007/0187313, each of which is incorporated herein in its entirety by reference.

Example 3

Columns packed with superficially porous particles as described herein (SPP) were tested under SFC conditions using a Waters ACQUITY™ UltraPerformance Convergence Chromatography (UPC$^2$)™ system (FIG. 1). The column efficiencies were determined by injecting a solution containing toluene, prednisolone, thymine and sulfanilamide varying the flow rate from 0.4 to 3.75 mL/min. The mobile phase composition was 91/9 $CO_2$/methanol at 50° C. and the backpressure regulator was set constantly at 1800 psi. The reduced plate heights of the columns tested were determined by dividing the column length by the product of the maximum number of chromatographic plates and the average particle diameter (determined by SEM). Reduced plate heights of ca. 2.0 have been observed for in-house prepared 1.7 µm core-shell particles and columns. For comparison, fully porous 1.7 µm BEH™ (ethylene bridged hybrid) particles packed into similar hardware produce reduced plate heights of ca. 2.7 when tested under similar conditions (93/7 $CO_2$/methanol at 50° C. and 1800 psi backpressure regulator). This represents greater than 20% increase in efficiency over fully porous particles. Core-shell technology can be an important tool for improving separation efficiency. Significantly lower longitudinal diffusion and resistance to mass transfer components of dispersion contribute to the observed efficiency gains. Furthermore, SPP may also provide additional benefits for minimizing radial thermal gradients produced by the enthalpic expansion of compressed $CO_2$. Higher thermal conductivity cores channel heat outside of the column to the radial center, reducing radial thermal gradients, which have been shown to greatly influence chromatographic performance.

Certain references of interest with regard to SFC are U.S. Pat. No. 7,399,410 Chromatographic Columns and Methods to Control Sorbent Density and U.S. Pat. No. 8,449,769 Device, Apparatus. and Method of Performing Separations.

Example 4

In a typical reaction, materials from Example 1 (10 g) is refluxed in toluene (190 mL) using a Dean-Stark trap for 1 hour. Upon cooling, the desired silane (from the table below) and toluene (90 mL) are added to the flask. The mixture is stirred at room temperature for 1 hour, and is heated to reflux for 16 hours. The reaction is cooled and the product is filtered and washed successively with toluene, acetone, 1:1 v/v acetone/water, and acetone (all solvents from Fisher Scientific). The particles are slurried in a solution of acetone/ 0.1 M $NH_4HCO_3$ (60/40, v/v, 200 mL) and stirred for 20 hrs at 50° C. After cooling to room temperature, the particles are collected by filtration, and are washed successively with 1:1 v/v acetone/water and acetone. The particles are dried overnight under vacuum at 80° C.

| Silane |
| --- |
| 2-(2-pyridylethyl)trimethoxylsilane |
| 2-(4-pyridylethyl)trimethoxylsilane |
| 2-(2-pyridylethyl)triethoxylsilane |
| 2-(4-pyridylethyl)triethoxylsilane |
| (N,N-diethyl-3-aminopropyl)trimethoxylsilane |
| dinitrophenylpropyltriethoxysilane |
| imidazolepropyltrimethoxysilane |
| glucoamidepropyltriethoxysilane |
| ureidopropyltriethoxysilane |
| amidepropyltriethoxysilane |
| hydroxypropyltriethoxysilane |
| phenethyltrimethoxysilane |
| phenylhexyltrimethoxysilane |
| phenylhexyltrimethoxysilane |
| pentafluorophenyltrimethoxysilane |
| pentafluorophenylethyltrimethoxysilane |
| pentafluorophenylpropyltrimethoxysilane |
| pentafluorophenyltrichlorosilane |
| pentafluorophenylethyltrihlorosilane |
| pentafluorophenylpropyltrihlorossilane |
| 3-methoxypropyltrimethoxysilane |
| 3-cyanopropyldiisopropylchlorosilane |
| 2-[2-[[3-(trimethoxysilyl)propyl]thio]ethyl]-pyridine |
| octadecyltrichlorosilane |
| octyltrichlorosilane |
| octadecyldimethylchlorosilane |
| octyldimethylchlorosilane |
| octadecylmethyldichlorosilane |
| octylmethyldichlorosilane |
| octadecyldiisobutylchlorosilane |
| octyldiisobutylchlorosilane |
| octadecyldiisopropylchlorosilane |
| octyldiisopropylchlorosilane |
| trimethylchlorosilane |
| triethylchlorosilane |
| hexamethyldisilazane |
| 1,2-bis(triethoxysilyl)ethane |
| 1,2-bis(tridimethylaminosilyl)ethane |
| 1,1-bis(triethoxysilyl)ethane |
| 1,1-bis(tridimethylaminosilyl)ethane |
| tert-butyldimethylchlorosilane |
| triisopropylchlorosilane |
| (3,3,3-trifluoropropyl)-dimethylchlorosilane |
| 3-cyanopropyldimethylchlorosilane |
| 3-acetoxypropyldimethylchlorosilane |
| bis(3-cyanopropyl)dichlorosilane |

Example 5

In a typical reaction, materials from Example 1 (10 g) are refluxed in toluene (190 mL) using a Dean-Stark trap for 1 hour. The slurry is cooled to room temperature and a first silane (from the table in Example 4) is added and the mixture heated to reflux for 1 hour. Upon cooling, a second silane (from the table in Example 4) and toluene (90 mL) are added to the flask. The mixture is stirred at room temperature for 1 hour, and then heated to reflux for 16 hours. The reaction is cooled and the product is filtered and washed successively with toluene, acetone, 1:1 v/v acetone/water, and acetone (all solvents from Fisher Scientific). The particles are slurried in a solution of acetone/0.1 M $NH_4HCO_3$ (60/40, v/v, 200 mL) and are stirred for 20 hrs at 50° C. After cooling to room temperature, the particles are collected by filtration, and are washed successively with 1:1 v/v acetone/water and acetone. The particles are dried overnight under vacuum at 80° C.

Example 6

In a typical example, materials from Examples 4 and 5 (10 g) are refluxed in toluene (190 mL) using a Dean-Stark trap for 1 hour. The mixture is cooled to room temperature and the desired silane (from the table in Example 4) and imidazole (Aldrich—Milwaukee, Wis., 1.2× molar excess to silane) is added. The mixture is refluxed for 4 hours, and then cooled to room temperature. The particles are collected by filtration, and are washed successively with toluene, acetone, 1:1 v/v acetone/water, and acetone and then are dried overnight under vacuum.

Example 7

In a typical reaction, materials from Example 1 are dispersed in a solution of glycidoxypropyltrimethoxysilane/ methanol (0.25 mL/g) (Aldrich, Milwaukee, Wis.,) in a 20 mM acetate buffer (pH 5.5, prepared using acetic acid and sodium acetate, J.T. Baker. 5 mL/g dilution) that is premixed at 70° C. for 60 minutes. The mixture is held at 70° C. for 20 hours. The reaction is cooled and the product is filtered and washed successively with water and methanol (J.T. Baker). Analysis of these materials by $^{13}C$ CP-MAS NMR spectroscopy indicates a mixture of epoxy and diol groups are present for these materials.

Example 8

The Same as example 7 using a specific silanes chosen from:

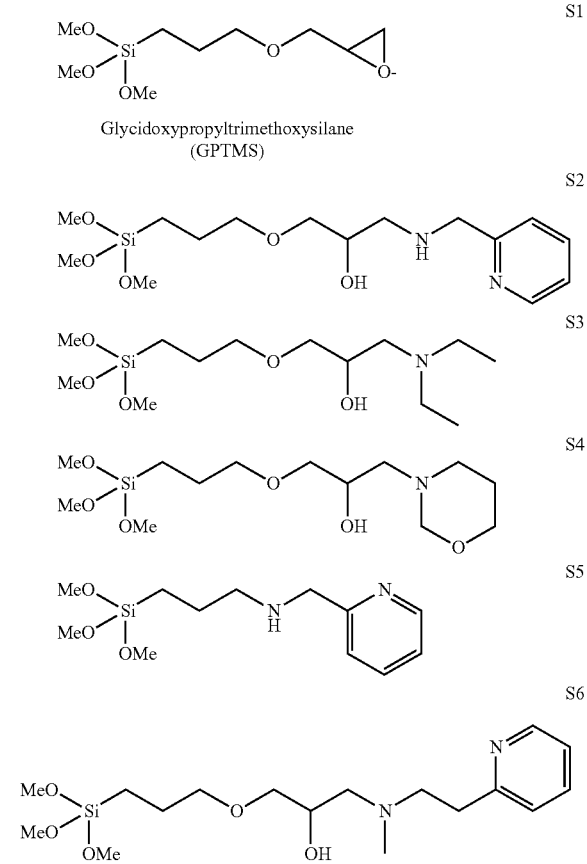

Glycidoxypropyltrimethoxysilane (GPTMS)

Example 9

Same as example 7 using an embedded polar silane. Included in this are the methods described by Neue, U.S. Pat. No. 5,374,755; Liu, U.S. Pat. Nos. 8,425,778 and 7,074,491; Chen, U.S. Pat. No. 7,534,352; Guang, U.S. Pat. No. 7,125,488; Buese U.S. Pat. No. 5,576,453, each of which is incorporated herein in its entirety by reference.

Example 10

In a typical reaction, materials from Example 1 are dispersed in a solution of glycidoxypropyltrimethoxysilane/methanol (0.25 mL/g) (Aldrich, Milwaukee, Wis.) in a 20 mM acetate buffer (pH 5.5, prepared using acetic acid and sodium acetate, J.T. Baker. 5 mL/g dilution) that is premixed at 70° C. for 60 minutes. The mixture is held at 70° C. for 20 hours. The reaction is cooled and the product is filtered and washed successively with water and methanol (J.T. Baker). The material is refluxed in a 0.1 M acetic acid solution (5 mL/g dilution, J.T. Baker) at 70° C. for 20 hours. The reaction is cooled and the product is filtered and washed successively with water and methanol (J.T. Baker). The product is dried at 80° C. under reduced pressure for 16 hours. Analysis of these materials by $^{13}$C CP-MAS NMR spectroscopy indicates no measurable amount of epoxide groups remain after hydrolysis.

Example 11

In a standard experiment, materials from Example 7 are dispersed in a solvent such as, but not limited to water, iso-propanol, or dioxane. An amount of nucleophile from the table below is added and the mixture is heated to 70° C. for 16 hours. Sulphur nucleophiles are coupled using 1 molar equivalent of an appropriate base. After reaction, the particles are washed successively with water and 0.5M acetic acid, and the materials are refluxed in a 0.1 M acetic acid solution (5 mL/g dilution, J.T. Baker) at 70° C. for 20 hours. The reaction is cooled and the product is filtered and washed successively with water and methanol (J.T. Baker). The products are dried at 80° C. under reduced pressure for 16 hours. Analysis of these materials by $^{13}$C CP-MAS NMR spectroscopy confirms the reaction of the epoxides. Coverage is calculated using % N values.

| Nucleophile |
| --- |
| 2-picolylamine |
| 3-picolylamine |
| 4-picolylamine |
| Di-2-picolylamine |
| diethylamine |
| epinephrine |
| 3-(diethylamino)propylamine |
| 2-aminopyridine |
| 2-mercaptopyridine |
| benzylamine |
| 4-nitrobenzylamine |
| dioctylamine |
| 4-(aminomethyl)phenylboronic acid pinacol ester |
| (R)-2-methylpyrrolidine |
| 1-aminoanthracene |

Example 11a

The method of Example 11 was performed using 2-picolylamine as the nucleophile in THF on 1.6 micron, spherical superficially porous silica particles which had been processed as in Example 7. Coverage of 0.69 µmol/m² was obtained.

Example 11b

The method of Example 11 was performed reaction as in example 11 using 1-aminoanthracene as the nucleophile in iso-propanol on 1.6 micron, spherical superficially porous silica particles which had been processed as in Example 7. Coverage of 0.39 µmol/m² was obtained.

Example 12

Same as Example 11 using nucleophile groups of peptides, calixaranes, heme, furans, cyclofructans, sugar-containing polymers or oligomers, functionalized sugar containing polymer or oligomers, graphene, nanoparticles, nanotubes or functionalized and or polymeric derivativizes thereof that display an accessible nucleophilic group (for example a group comprised of but not limited to one or more of the following; amino, alkylamino, arylamino, mercapto, guanidine, or hydroxyl groups.

Example 13

Same as Example 4-12 to yield chiral stationary phases (CSP) for superficially porous particle that can be used for enantiomer separations, as detailed in *Introduction to Modern Liquid Chromatography*, Third Edition, by Lloyd R. Snyder, Joseph J. Kirkland, and John W. Dolan, 2010, (John Wiley & Sons, Inc.), including but not limited to polysaccharide-based CPS, Synthetic-Polymer CSP, Protein Phases, Cyclodextrin-Based CSP, Macrocyclic Antibiotic CSP, Chiral Crown-Ether CSP, Donor-Acceptor Phases, Chiral Ion-Exchangers, and Chiral Ligan-Exchange CSP. Detailed discussion of these phases is contained in Chapter Fourteen and is incorporated herein in its entirety by reference.

Example 14

The general procedure to modify the surface of particles that is detailed in Examples 2-13 is applied to modify the surface silanol groups of different superficially porous materials. Included in this are spherical, smooth, rough granular, and irregular materials that are silica, hybrid inorganic/organic materials, hybrid inorganic/organic surface layers on hybrid inorganic/organic, silica, titania, alumina, zirconia, polymeric or carbon materials, and silica surface layers on hybrid inorganic/organic, silica, titania, alumina, zirconia or polymeric or carbon materials. Also includes are superficially porous materials in the form of a spherical, non-spherical material (e.g., including toroids, polyhedron); stationary phase materials having a highly spherical core morphology, a rod shaped core morphology, a bent-rod shaped core morphology, a toroid shaped core morphology; or a dumbbell shaped core morphology; and stationary phase materials having a mixture of highly spherical, rod shaped, bent rod shaped, toroid shaped, or dumbbell shaped morphologies. Example hybrid materials are shown in U.S. Pat. Nos. 4,017,528, 6,528,167, 6,686,035, and 7,175,913 as well as International Publication No. WO2008/103423, the contents of which are hereby incorporated by reference in their entireties. Superficially porous particle include those describe in U.S. Pub. Nos. 2013/0112605, 2007/0189944, and 2010/061367, the contents of which are hereby incorporated by reference in their entireties. The particles size for spherical, granular or irregular materials can vary from 5-500 μm; more preferably 15-100 μm; more preferably 20-80 μm; more preferably 40-60 μm. The APD for these materials can vary from 30 to 2,000 Å; more preferably 40 to 200 Å; more preferably 50 to 150 Å. The SSA for these materials can vary from 20 to 1000 m2/g; more preferably 90 to 800 m2/g; more preferably 150 to 600 m2/g; more preferably 300 to 550 m2/g. The TPV for these materials can vary from 0.15 to 1.5 cm3/g; more preferably 0.2 to 0.4 cm3/g; more preferably 0.22 to 3.3 cm3/g.

EQUIVALENTS

Those skilled in the art will recognize, or be able to ascertain using no more than routine experimentation, many equivalents to the specific embodiments of the invention described herein. Such equivalents are intended to be encompassed by this invention.

INCORPORATION BY REFERENCE

All publications, patent applications and patents identified herein are expressly incorporated herein by reference in their entireties.

What is claimed is:

1. A method for performing supercritical fluid chromatography comprising:
    loading a sample comprising an analyte to be separated by supercritical fluid chromatography onto a stationary phase comprising a spherical, monodisperse, core-shell particulate material; and
    performing supercritical fluid chromatography to separate said sample;
    wherein a tailing factor associated with the stationary phase is about 0.80-2.0;
    wherein the particulate material has a Formula 1:

$$[X](W)a(Q)b(T)c \qquad \text{Formula 1}$$

where:
    X is a superficially porous silica material, a superficially porous inorganic/organic hybrid material, or a superficially porous particulate material comprising a core having a pore volume of less than 0.10 cc/g and one or more layers of a porous shell material surrounding the core and wherein said particles are sized less than 2 microns;
    W includes hydrogen and/or includes hydroxyl on the surface of X;
    Q is bound directly to X and comprises a first hydrophilic, polar, ionizable, and/or charged functional group that chromatographically interacts with the analyte;
    T is bound directly to X and comprises a second hydrophilic, polar, ionizable, and/or charged functional group that chromatographically interacts with the analyte;
    wherein a is >0, b is >0, and c is >0, wherein a is >0, b=0 and c>0, or wherein a is >0, c=0 and b>0.

2. The method according to claim 1, wherein the tailing factor associated with the stationary phase is about 0.85-1.60.

3. The method according to claim 2, wherein the tailing factor associated with the stationary phase is about 0.90-1.30.

4. The method according to claim 3, wherein the tailing factor associated with the stationary phase is about 0.95-1.20.

5. The method of claim 1, wherein the core is a silica core.

6. The method of claim 5, wherein the porous shell material is a porous inorganic/organic hybrid material.

7. The method of claim 5, wherein the porous shell material is a porous silica material.

8. The method of claim 1, wherein the core is an inorganic/organic hybrid core.

9. The method of claim 8, wherein the porous shell material is a porous inorganic/organic hybrid material.

10. The method of claim 8, wherein the porous shell material is a porous silica material.

11. The method of claim 1, comprising more than one layer of porous shell material wherein each layer is independently selected from a porous inorganic/organic hybrid material and a porous silica.

12. The method of claim 1, wherein the pores of the particulate material have an average diameter of about 25-600 A.

13. The method of claim 1, wherein the pores of the particulate material have an average diameter of about 60-350 A.

14. The method of claim 1, wherein the pores of the particulate material have an average diameter of about 80-300 A.

15. The method of claim 1, wherein the pores of the particulate material have an average diameter of about 90-150 A.

16. The method of claim 1, wherein the porous shell material has an increased average pore diameter near the surface of the porous shell material.

17. The method of claim 1, wherein pores of the particulate material have an average pore volume of about 0.11-0.50 cm³/g.

18. The method of claim 1, wherein pores of the particulate material have an average pore volume of about 0.09-0.45 cm³/g.

19. The method of claim 1, wherein pores of the particulate material have an average pore volume of about 0.17-0.30 cm³/g.

20. The method of claim 1, wherein the particulate material has a pore surface area between about 10 m²/g and 400 m²/g.

21. The method of claim 1, wherein the particulate material has a pore surface area between about 15 m²/g and 300 m²/g.

22. The method of claim 1, wherein the particulate material has a pore surface area between about 60 m²/g and 200 m²/g.

23. The method of claim 1, wherein b>0 and wherein Q is represented by:

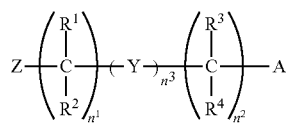

wherein:
$n^1$ an integer from 0-30;
$n^2$ an integer from 0-30;
$n^3$=0 or 1, provided that when $n^3$=0, $n^1$ is not 0;
each occurrence of $R^1$, $R^2$, $R^3$ and $R^4$ independently represents hydrogen, fluoro, methyl, ethyl, n-butyl, t-butyl, i-propyl, lower alkyl, a protected or deprotected alcohol, a zwitterion, or a group Z;
Z represents:
a) a surface attachment group having the formula $(B^1)_x(R^5)_y(R^6)_z$Si—wherein x is an integer from 1-3, y is an integer from 0-2,
z is an integer from 0-2,
and x+y+z=3,
each occurrence of $R^5$ and $R^6$ independently represents methyl, ethyl, n-butyl, iso-butyl, tert-butyl, iso-propyl, thexyl, substituted or
unsubstituted aryl, cyclic alkyl, branched alkyl, lower alkyl, a protected or deprotected alcohol, or a zwitterion group, and
$B^1$ represents a siloxane bond; or
b) an attachment to a surface organofunctional hybrid group through a direct carbon-carbon bond formation or through a heteroatom, ester, ether, thioether, amine, amide, imide, urea, carbonate, carbamate, heterocycle, triazole, or urethane linkage; or c) an adsorbed, surface group that is not covalently attached to the surface of the material;
Y is an embedded polar functionality; and
A represents
i.) a hydrophilic terminal group;
ii.) hydrogen, fluoro, methyl, ethyl, n-butyl, t-butyl, propyl, lower alkyl, or group Z; or
iii.) a functionalizable group.

24. The method of claim 1, wherein b>0 and wherein Q comprises one of the following structures:

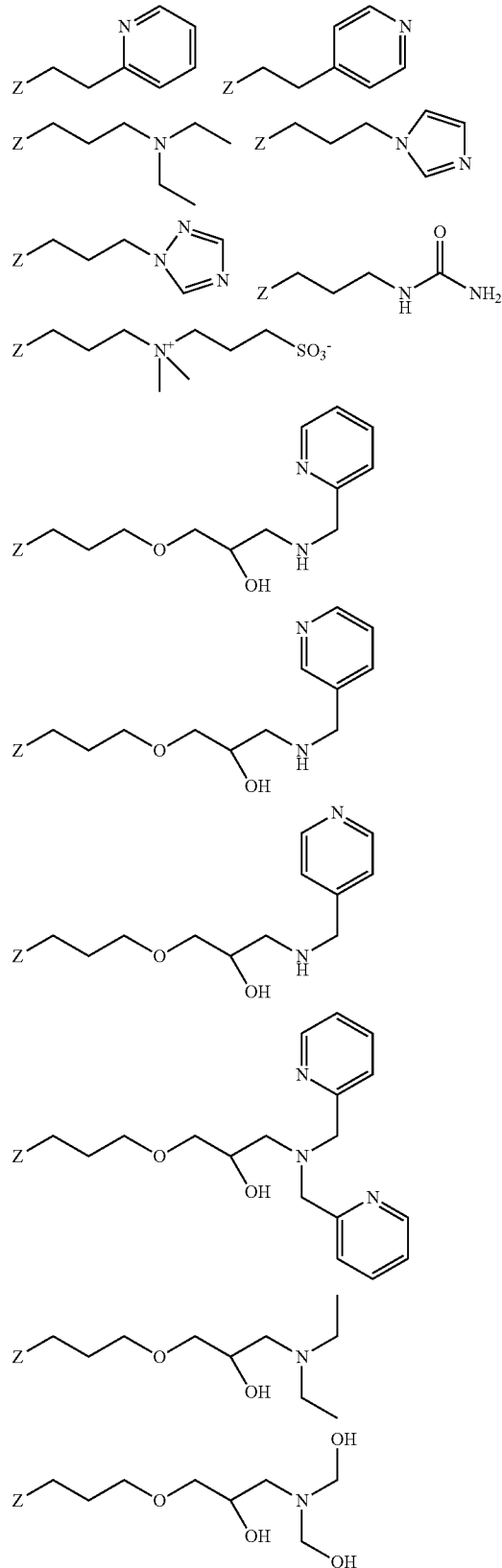

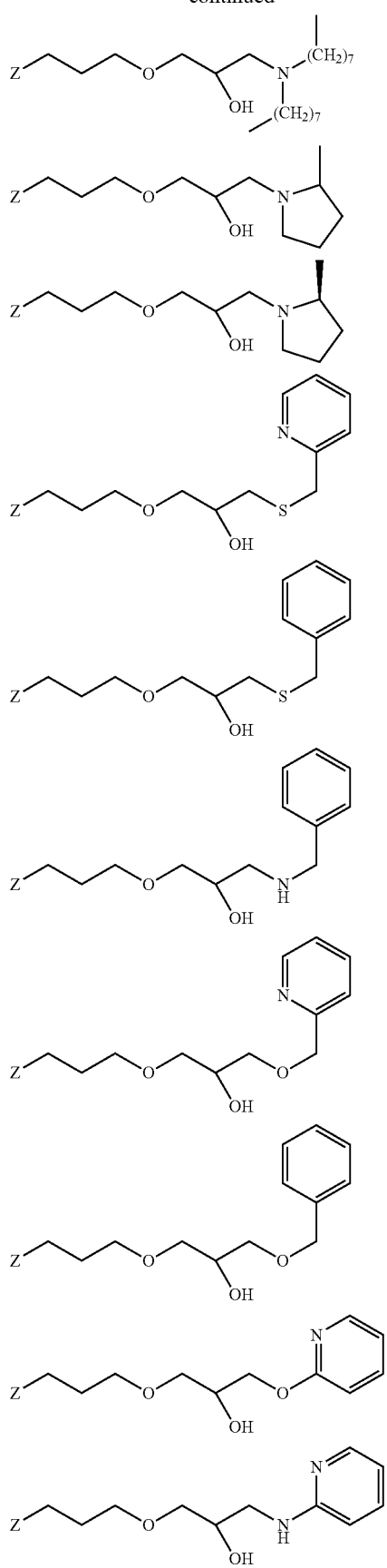
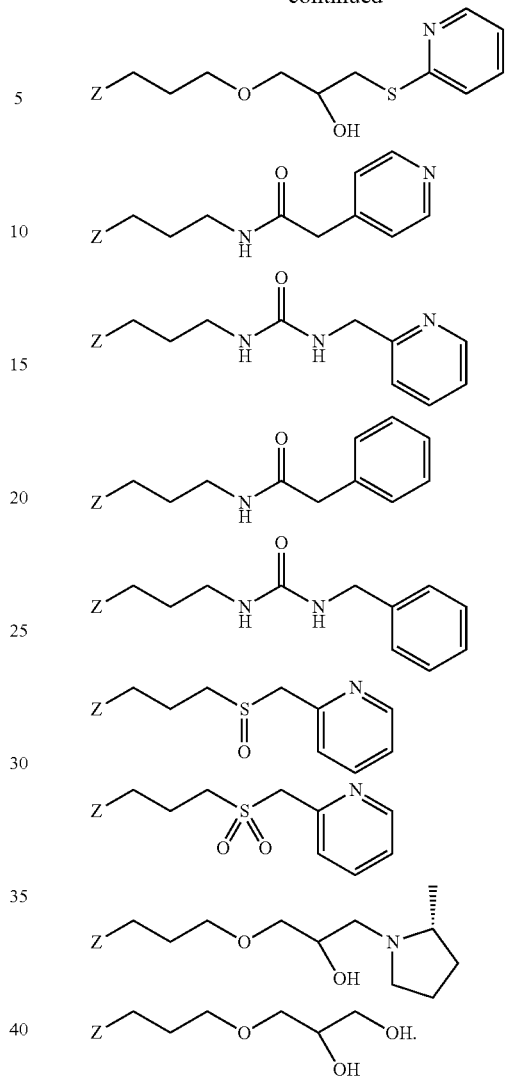

Z represents:

a) a surface attachment group having the formula $(B^1)_x(R^5)_y(R^6)_z Si-$ wherein x is an integer from 1-3, y is an integer from 0-2, z is an integer from 0-2, and x+y+z=3, each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwitterion group, and $B^1$ represents a siloxane bond; or b) an attachment to a surface organofunctional hybrid group through a direct carbon-carbon bond formation or through a heteroatom, ester, ether, thioether, amine, amide, imide, urea, carbonate, carbamate, heterocycle, triazole, or urethane linkage; or c) an adsorbed, surface group that is not covalently attached to the surface of the material.

25. The method of claim 1, wherein c is >0 and wherein T is represented by:

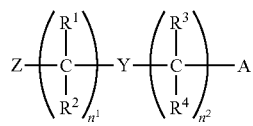

wherein:
n' an integer from 0-5;
$n^2$ an integer from 0-5;
$n^3 = 0$ or 1, provided that when $n^3 = 0$, $n^1$ is not 0;
each occurrence of $R^1$, $R^1$, $R^3$ and $R^4$ independently represents hydrogen, fluoro, methyl, ethyl, n-butyl, t-butyl, i-propyl, lower alkyl, a protected or deprotected alcohol, a zwitterion, or a group Z;
Z represents:
a) a surface attachment group having the formula $(B^1)_x(R^5)_y(R^6)_z Si$—wherein x is an integer from 1-3,
y is an integer from 0-2,
z is an integer from 0-2,
and $x+y+z=3$
each occurrence of $R^5$ and $R^6$ independently represents methyl, ethyl, n-butyl, iso-butyl, tert-butyl, iso-propyl, thexyl, substituted or
unsubstituted aryl, cyclic alkyl, branched alkyl, lower alkyl, a protected or deprotected alcohol, or a zwitterion group;
$B^1$ represents a siloxane bond
b) an attachment to a surface organofunctional hybrid group through a direct carbon-carbon bond formation or through a heteroatom, ester, ether, thioether, amine, amide, imide, urea, carbonate, carbamate, heterocycle, triazole, or urethane linkage;
c) an adsorbed, surface group that is not covalently attached to the surface of the material; or
d) a silyl ether bond
Y is an embedded polar functionality; and
A represents
i.) a hydrophilic or ionizable terminal group; or
ii.) hydrogen, fluoro, methyl, ethyl, n-butyl, t-butyl, i-propyl, lower alkyl, or group Z.

26. The method of claim 1, wherein c is >0 and wherein T is represented by one of:

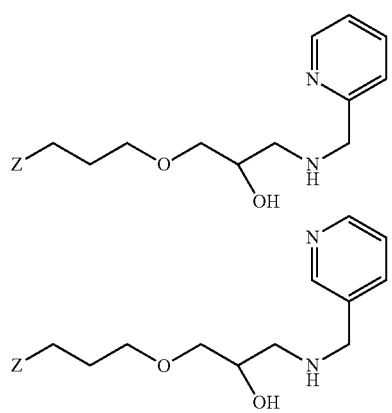

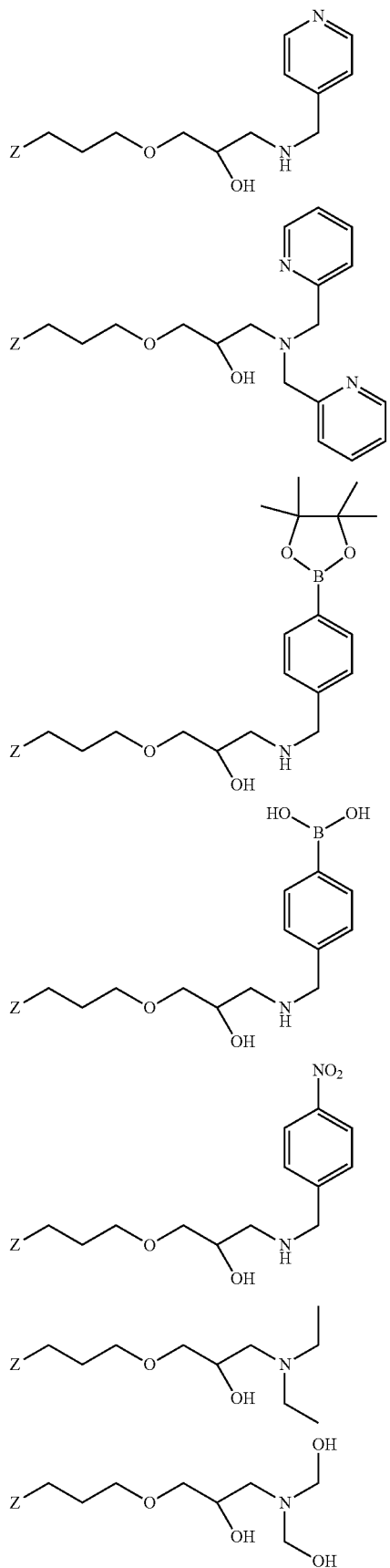

77
-continued
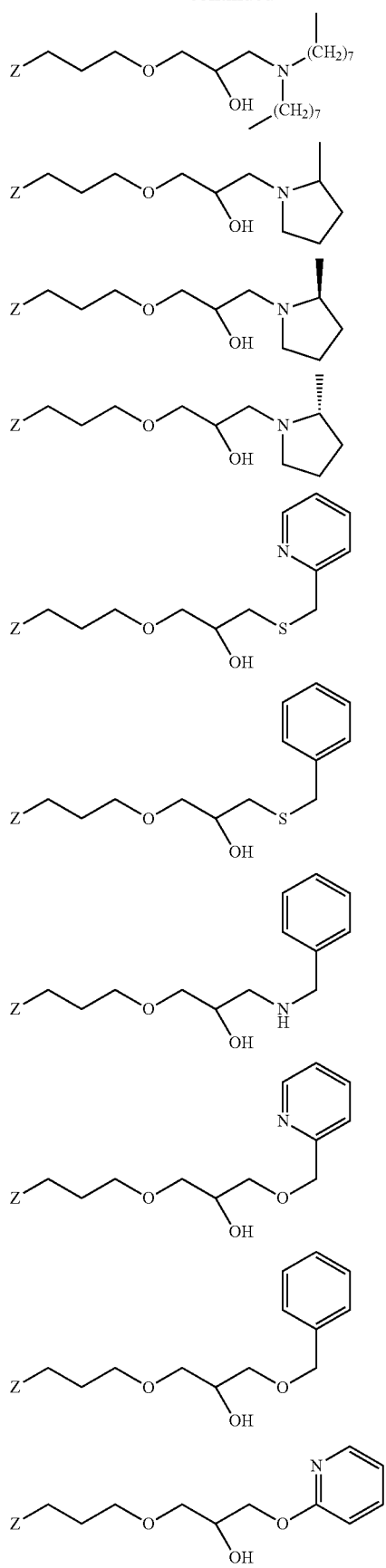
78
-continued
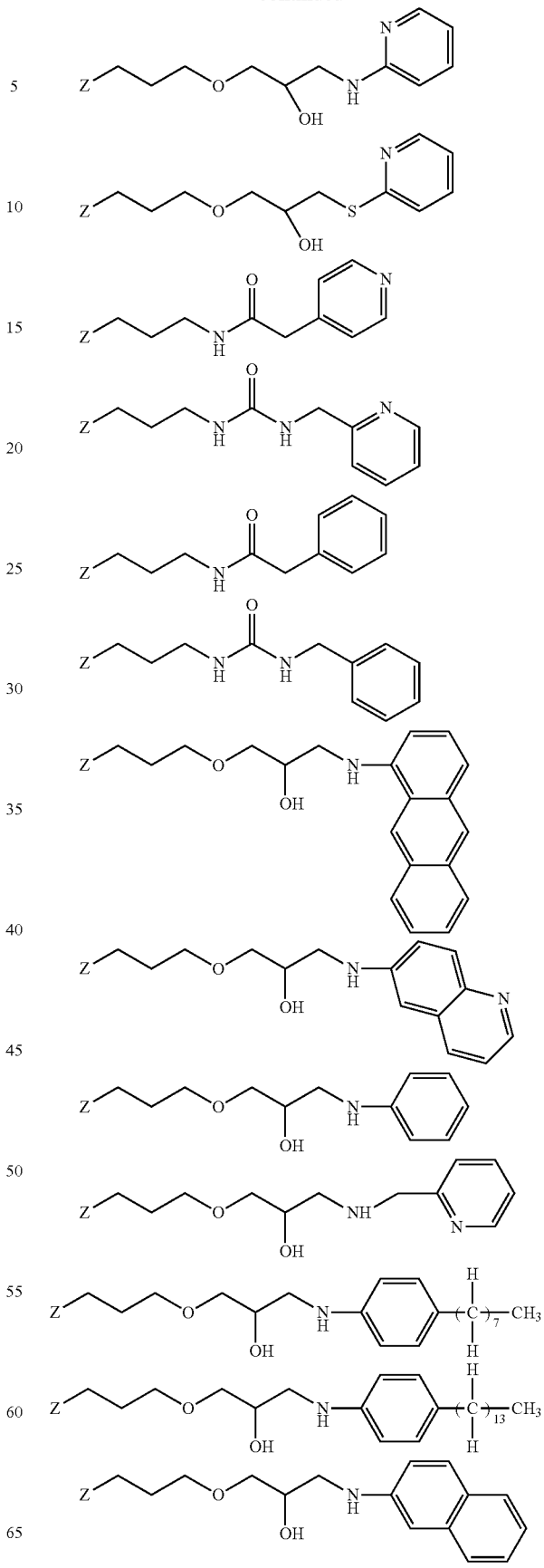

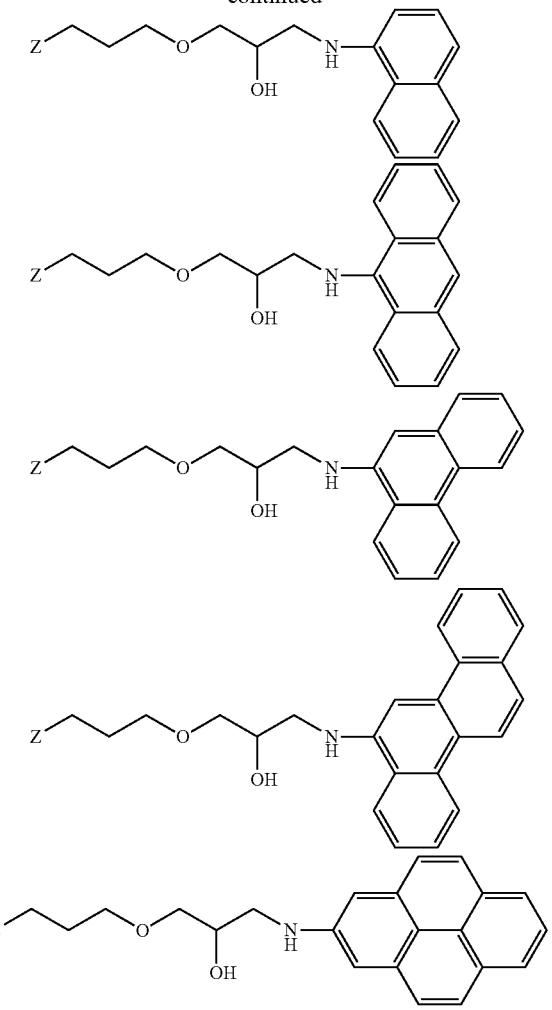

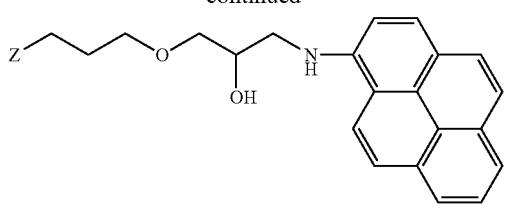

wherein Z comprises:

a) a surface attachment group having the formula

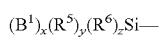

wherein x is an integer from 1-3, y is an integer from 0-2, z is an integer from 0-2, and x+y+z=3 each occurrence of $R^5$ and $R^6$ independently represents methyl, ethyl, n-butyl, iso-butyl, tert-butyl, iso-propyl, thexyl, substituted or unsubstituted aryl, cyclic alkyl, branched alkyl, lower alkyl, a protected or deprotected alcohol, or a zwitterion group; and $B^1$ represents a siloxane bond;

b) an attachment to a surface organofunctional hybrid group through a direct carbon-carbon bond formation or through a heteroatom, ester, ether, thioether, amine, amide, imide, urea, carbonate, carbamate, heterocycle, triazole, or urethane linkage; or c) an adsorbed, surface group that is not covalently attached to the surface of the material.

27. The method of claim 1, wherein a is >0, b is >0, and c is >0.

* * * * *